United States Patent
Kang et al.

(10) Patent No.: US 8,898,596 B2
(45) Date of Patent: Nov. 25, 2014

(54) MOBILE TERMINAL AND DATA EXTRACTING METHOD IN A MOBILE TERMINAL

(71) Applicant: LG Electronics Inc., Seoul (KR)

(72) Inventors: Rae Hoon Kang, Seoul (KR); Seung Hyun Woo, Seoul (KR); Min Jeong Lee, Seoul (KR); Hyun Ho Jee, Incheon-si (KR); Dong Gwan Im, Seoul (KR); Choon Jae Lee, Gwangju-si (KR); Hayang Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/931,326

(22) Filed: Jun. 28, 2013

(65) Prior Publication Data

US 2013/0285964 A1     Oct. 31, 2013

Related U.S. Application Data

(63) Continuation-in-part of application No. 12/869,682, filed on Aug. 26, 2010.

(30) Foreign Application Priority Data

Oct. 8, 2009   (KR) .................. 10-2009-0095632
Jul. 10, 2012   (KR) .................. 10-2012-0074958

(51) Int. Cl.
*G06F 3/048*     (2013.01)
*G06F 3/0481*   (2013.01)
*G06F 3/041*    (2006.01)
*G06F 3/044*    (2006.01)
*H04M 1/725*   (2006.01)
*G06F 3/01*     (2006.01)
*H04M 1/2745*  (2006.01)

(52) U.S. Cl.
CPC ......... *G06F 3/044* (2013.01); *H04M 1/274558* (2013.01); *G06F 3/0481* (2013.01); *H04M 2250/12* (2013.01); *G06F 3/041* (2013.01); *H04M 1/274583* (2013.01); *H04M 1/72552* (2013.01); *H04M 2250/22* (2013.01); *G06F 2203/04101* (2013.01)
USPC ........... 715/848; 715/810; 715/823; 715/836; 345/173

(58) Field of Classification Search
CPC .. G06F 3/0481; G06F 3/0487; G06F 3/04815
USPC .................. 715/810, 823, 836, 848; 345/173
See application file for complete search history.

(56) References Cited

U.S. PATENT DOCUMENTS 5,608,850 A * 3/1997 Robertson ...................... 345/427
6,121,969 A * 9/2000 Jain et al. ....................... 715/850

(Continued)

FOREIGN PATENT DOCUMENTS

WO     2007/083936     7/2007

OTHER PUBLICATIONS

U.S. Appl. No. 12/869,682, Office Action dated Aug. 16, 2013, 26 pages.

*Primary Examiner* — Nicholas Augustine
(74) *Attorney, Agent, or Firm* — Lee, Hong, Degerman, Kang & Waimey

(57) ABSTRACT

A mobile terminal and data extracting method therein are provided, by which specific data meeting a specific condition can be selected and extracted conveniently and quickly in the course of displaying a data list constructed with a plurality of data. The mobile terminal receives an input of a touch action for selecting specific data and a classification condition corresponding to the specific data using a displayed data list upon receiving the input of the touch action, selects at least one data including the specific data as the data including the classification condition from a plurality of data, receives an input of an extraction command signal for extracting the selected data, and extracts the selected data upon receiving the input of the extraction command signal.

14 Claims, 54 Drawing Sheets

(56) References Cited

U.S. PATENT DOCUMENTS

| | | | |
|---|---|---|---|
| 6,577,330 B1* | 6/2003 | Tsuda et al. | 715/782 |
| 6,621,508 B1* | 9/2003 | Shiraishi et al. | 715/810 |
| 6,725,427 B2* | 4/2004 | Freeman et al. | 715/273 |
| 6,987,512 B2* | 1/2006 | Robertson et al. | 345/427 |
| 7,190,365 B2* | 3/2007 | Fleury | 345/427 |
| 7,889,192 B2* | 2/2011 | Konya et al. | 345/419 |
| 8,049,748 B2* | 11/2011 | Drive et al. | 345/419 |
| 8,432,396 B2* | 4/2013 | Paquette et al. | 345/427 |
| 2002/0033848 A1* | 3/2002 | Sciammarella et al. | 345/838 |
| 2002/0163546 A1* | 11/2002 | Gallo | 345/848 |
| 2003/0112279 A1* | 6/2003 | Irimajiri | 345/810 |
| 2006/0004739 A1 | 1/2006 | Anthony et al. | |
| 2007/0033220 A1 | 2/2007 | Drucker et al. | |
| 2007/0070066 A1* | 3/2007 | Bakhash | 345/419 |
| 2007/0176898 A1 | 8/2007 | Suh | |
| 2008/0282158 A1 | 11/2008 | Aaltonen et al. | |
| 2008/0307360 A1* | 12/2008 | Chaudhri et al. | 715/835 |
| 2009/0089293 A1 | 4/2009 | Garritano et al. | |
| 2009/0222402 A1 | 9/2009 | Tysowski | |
| 2011/0008758 A1 | 1/2011 | Kortas et al. | |

* cited by examiner

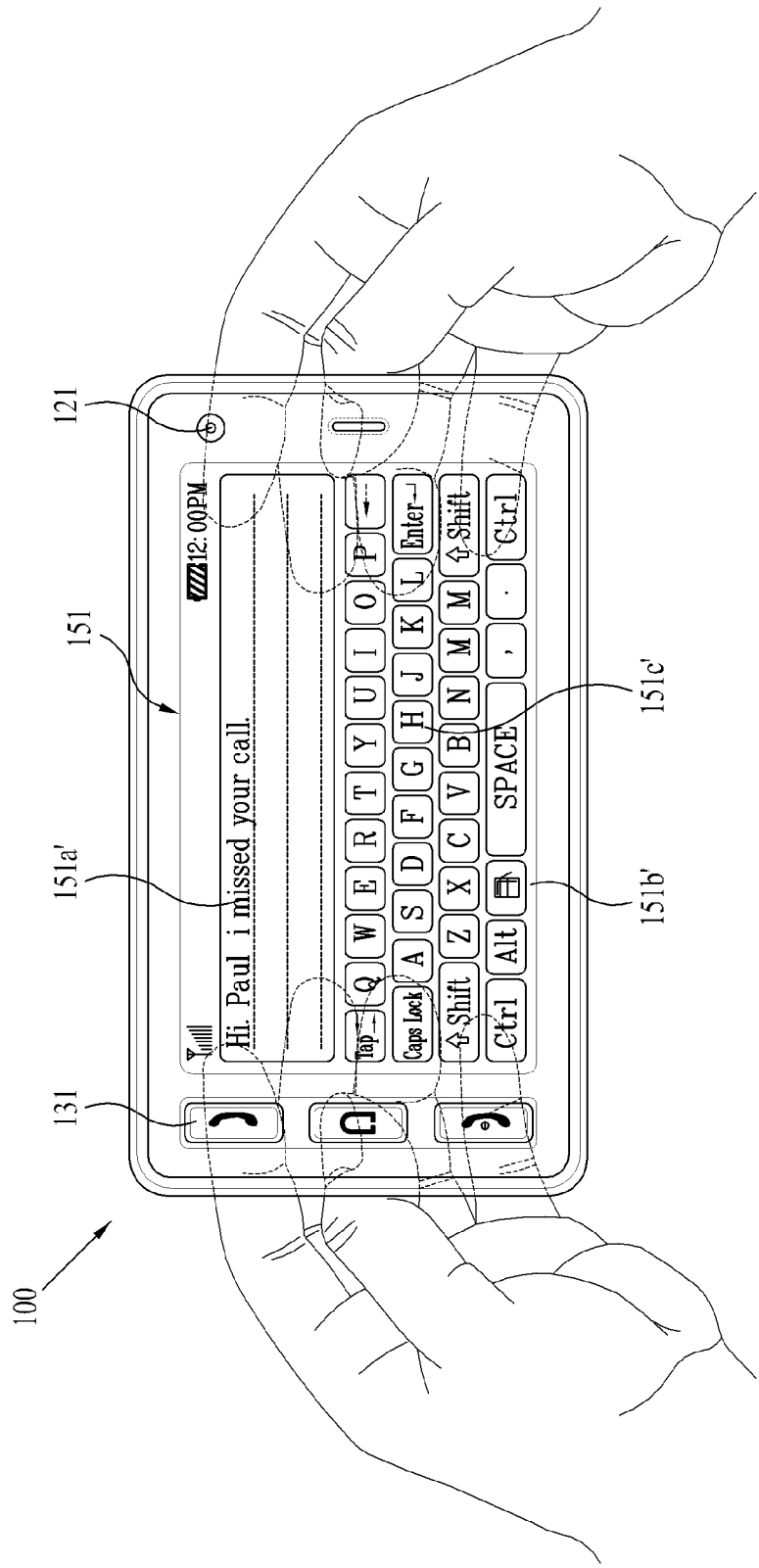

FIG. 7A

Classification condition setting
– Message

1. Recipient/Originator ☑ — 701
2. Date ☐
3. Group ☐
4. Keyword ☑ — 702

Classification condition setting
– Audio file

1. File name ☐
2. Album ☐
3. Artist ☑ — 711
4. Date ☐
5. Keyword ☑
6. Genre ☑ — 712

Classification condition setting
− Picture file

1. Date ☑ — 721
2. File name ☐
3. Object ☑ — 722
4. Location ☐

Classification condition setting
− Contact

1. Group ☑ — 731
2. Partial phone number ☐
3. Contact name ☐

OK (a)　　　　　　　　　(b)

FIG. 17A
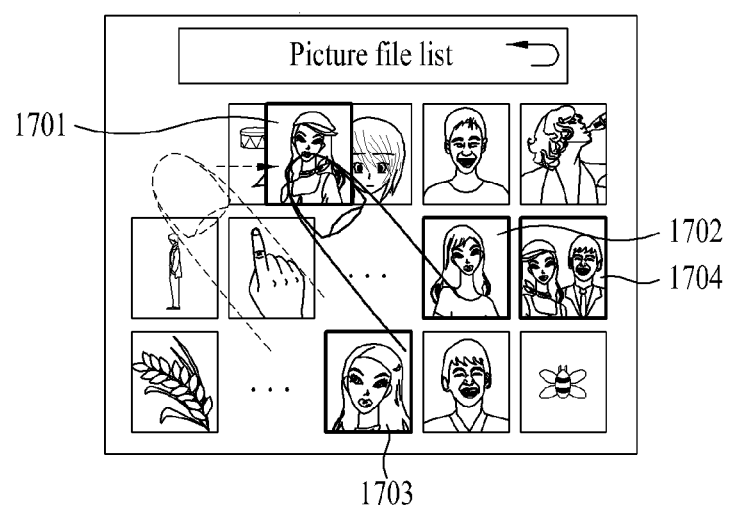
(a)
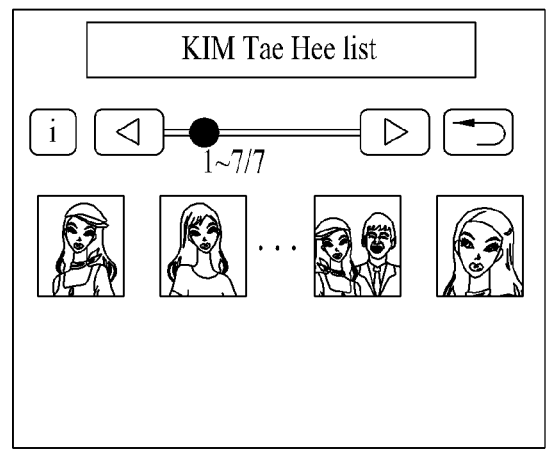
(b)

FIG. 17B
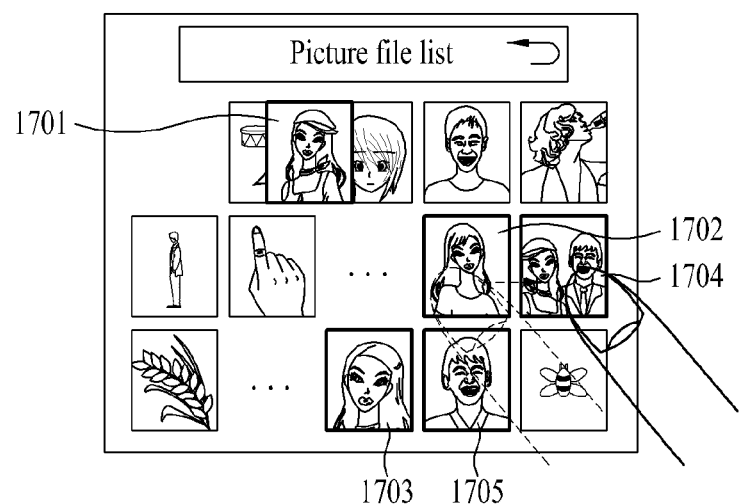
(a)
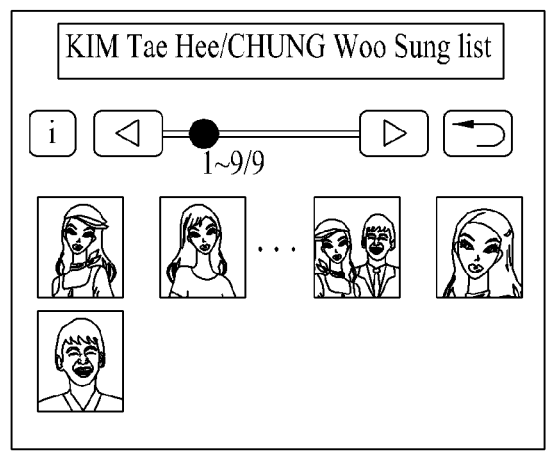
(b)

FIG. 17C
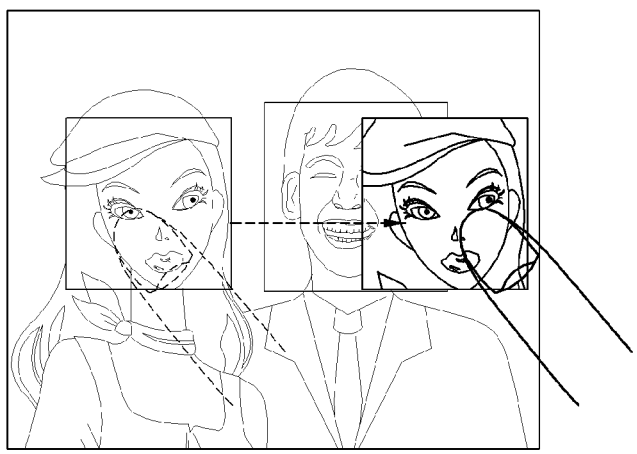
(a)
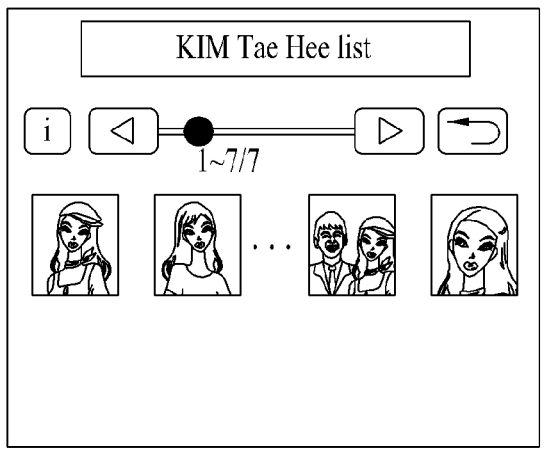
(b)

FIG. 18A
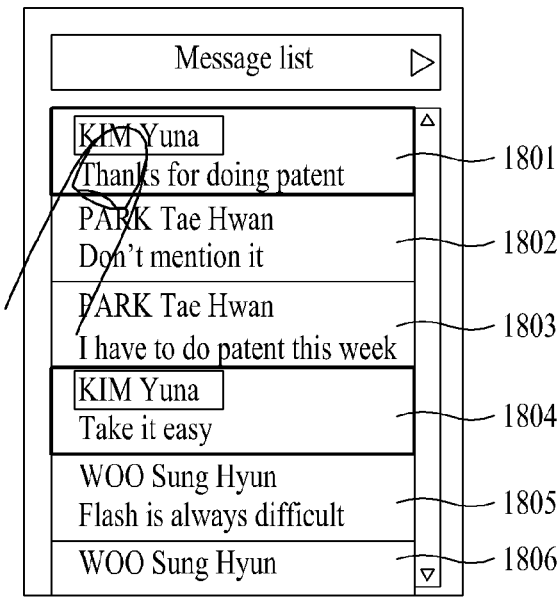
(a)
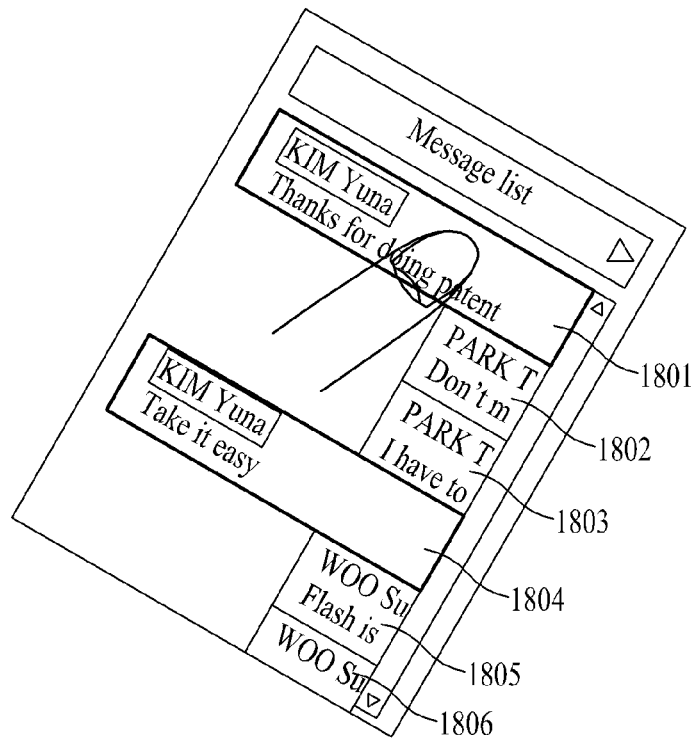
(b)

FIG. 18B
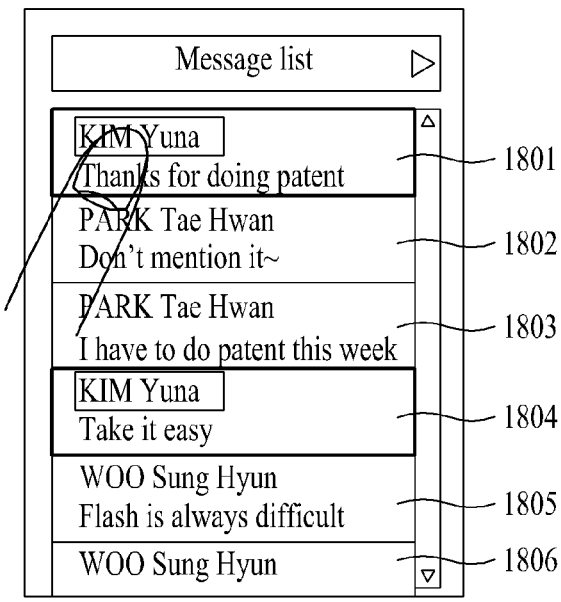
(a)
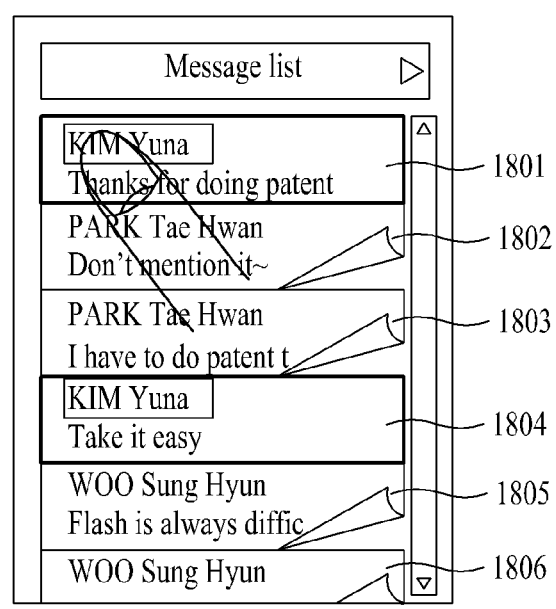
(b)

FIG. 18C
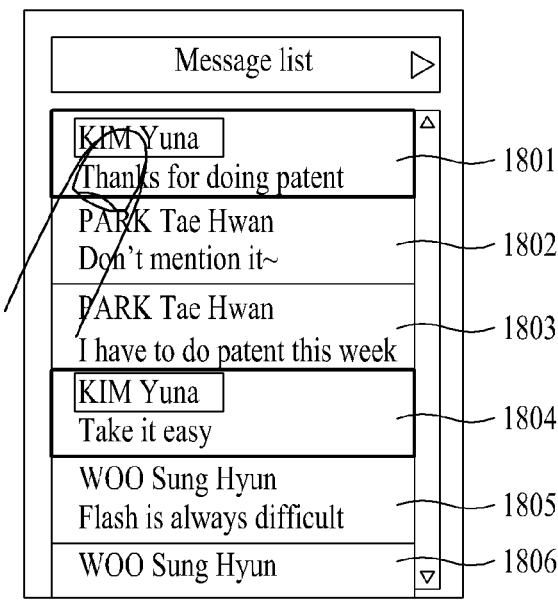
(a)
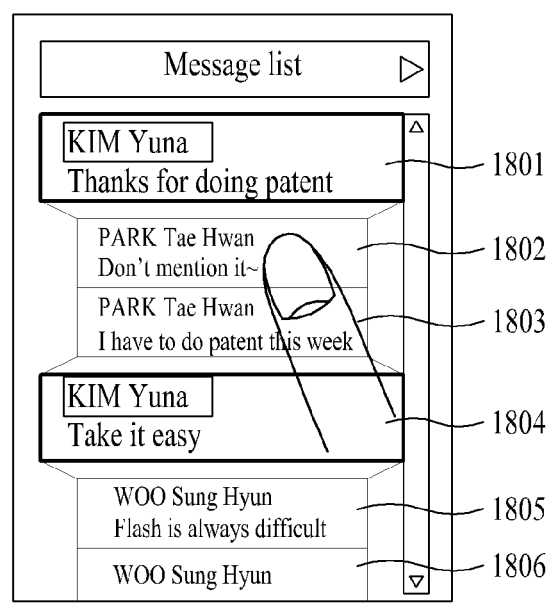
(b)

(32-1)  (32-2)

(36-1)  (36-2)

FIG. 39
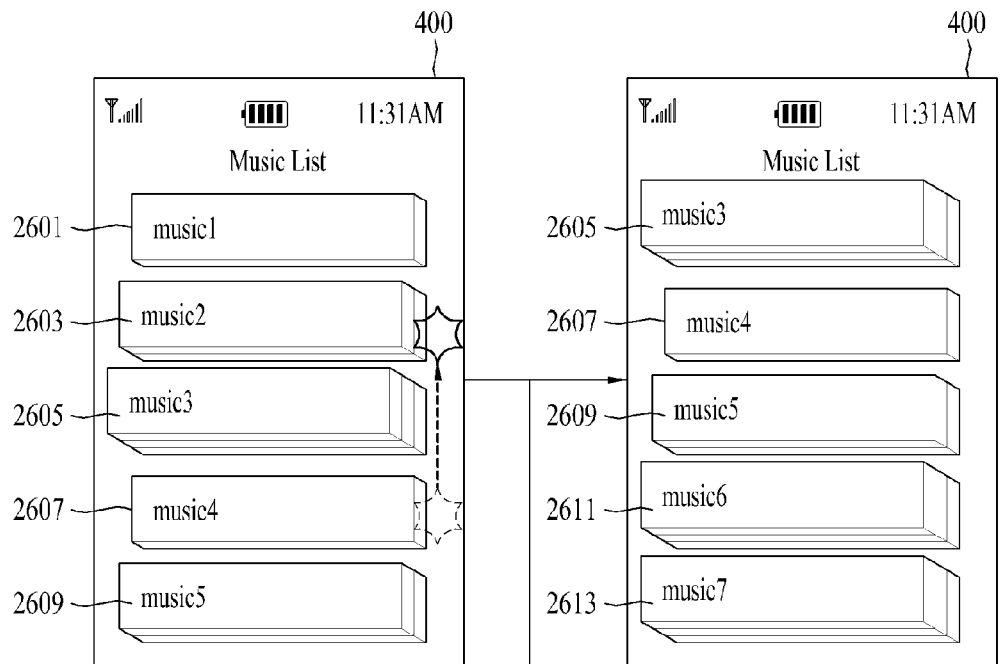
(39-1)  (39-2)
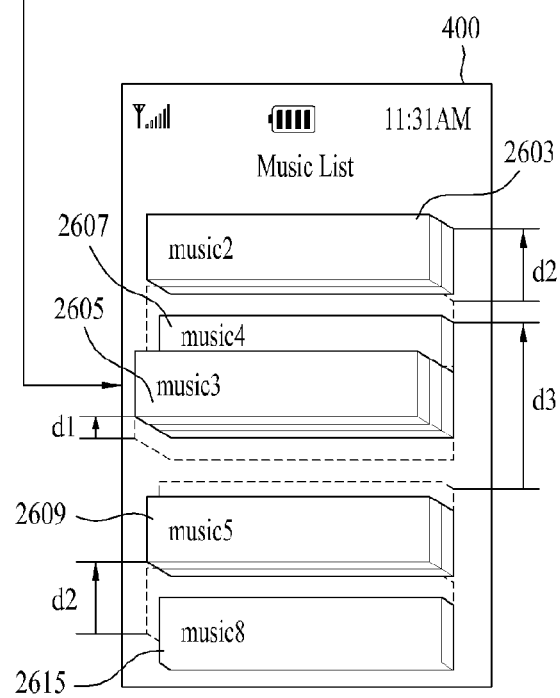
(39-3)

MOBILE TERMINAL AND DATA EXTRACTING METHOD IN A MOBILE TERMINAL

This application is a continuation in part of U.S. application Ser. No. 12/869,682 filed on Aug. 26, 2010, now U.S. Pat. No. 8,839,147, which claims the benefit of earlier filing date and right of priority to Korean Application Nos. 10-2009-0095632, filed on Oct. 8, 2009, and 10-2012-0074958, filed on Jul. 10, 2012, the contents of which are all hereby incorporated by reference herein in their entireties.

FIELD OF THE INVENTION

The present invention relates to a mobile terminal, and more particularly, to a mobile terminal and data extracting method in a mobile terminal. Although the present invention is suitable for a wide scope of applications, it is particularly suitable for a mobile terminal provided with a data display function using a touchscreen.

DISCUSSION OF THE RELATED ART

Generally, terminals can be classified into mobile/portable terminals and stationary terminals. The mobile terminals can be classified into handheld terminals and vehicle mounted terminals again according to the possibility of a user's portability.

As functions of mobile terminals are diversified, the mobile terminals are implemented as multimedia players provided with composite functions such as photographing of photos or moving pictures, playback of music or moving picture files, game play and/or broadcast reception, for example.

To support and increase functions of mobile terminals, improvements of structural parts and/or software parts are often required. In mobile terminals according to the related art, in order to extract specific data from a data list constructed with a plurality of data, it is inconvenient for a user to select the specific data to extract one by one. The related art fails to provide a method of selecting and extracting specific data directly without image switching while a data list constructed with a plurality of data is displayed. Moreover, if specific data is selected from a data list constructed with a plurality of data, the related art fails to provide a method of selecting and extracting other data associated with the selected specific data.

SUMMARY OF THE INVENTION

Accordingly, the present invention is directed to a mobile terminal and data extracting method therein that substantially obviate one or more problems due to limitations and disadvantages of the related art.

An object of the present invention is to provide a mobile terminal and data extracting method thereof, by which specific data meeting a specific condition can be selected and extracted conveniently and quickly in the course of displaying a data list having a plurality of data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one aspect a mobile terminal includes a touchscreen and a controller. The touchscreen is configured to display a data list including a plurality of data and to receive a first input for selecting specific data of the plurality of data and a second input for selecting a classification condition corresponding to the specific data. The controller is configured to select at least one data that satisfies the classification condition, including the specific data, from the plurality of data in response to the second input and to extract the selected at least one data from the data list in response to the mobile terminal receiving a third input.

In another aspect, a mobile terminal includes a touchscreen and a controller. The touchscreen is configured to display a data list including a plurality of data and to receive a first input for selecting specific data of the plurality of data and a second input for selecting a classification condition corresponding to the specific data. The controller is configured to select at least one data that satisfies the classification condition, including the specific data, from the plurality of data in response to the second input and to extract the selected at least one data from the data list in response to detection on the touchscreen of a touch and drag action upon the specific data.

In another aspect, a method of extracting data in a mobile terminal includes displaying a data list including a plurality of data on a touchscreen, receiving a first input via the touchscreen for selecting specific data of the plurality of data, receiving a second input via the touchscreen for selecting a classification condition corresponding to the specific data, selecting, via a controller, at least one data that satisfies the classification condition, including the specific data, from the plurality of data in response to the second input, receiving a third input via the mobile terminal for extracting the selected at least one data from the data list, and extracting the selected at least one data.

In another aspect, a mobile terminal includes a touchscreen, a memory configured to store a plurality of objects including at least one 3D object having 3D attribute and at least one 2D object having 2D attribute, and a controller, when a plurality of the objects are displayed on the touchscreen, controlling a 2D or 3D object to be displayed on the touchscreen by being sorted out from a plurality of the objects in response to a $1^{st}$ touch action applied to the touchscreen.

In another aspect, a mobile terminal includes a touchscreen configured to display a plurality of objects in 3D and a controller controlling a plurality of the objects to be displayed at different 3D depths in accordance with a $1^{st}$ classification criterion, respectively, the controller controlling a $1^{st}$ object having a $1^{st}$ depth to be sorted out from a plurality of the objects in response to a $1^{st}$ touch action inputted via the touchscreen.

In another aspect, a mobile terminal includes a touchscreen, a memory configured to store a $1^{st}$ folder including at least one $1^{st}$ file and a $2^{nd}$ folder including at least one $2^{nd}$ file, and a controller, when the $1^{st}$ folder and the $2^{nd}$ folder are displayed at a $1^{st}$ depth and a $2^{nd}$ depth in accordance with a $1^{st}$ classification criterion, respectively, controlling the at least one $1^{st}$ file and the at least one $2^{nd}$ file to be displayed at the $1^{st}$ depth and the $2^{nd}$ depth instead of the $1^{st}$ folder and the $2^{nd}$ folder in response to a specific touch action performed on the touchscreen, respectively.

In another aspect, a method of controlling a mobile terminal includes displaying a plurality of objects including at least one 3D object having 3D attribute and at least one 2D object having 2D attribute on a touchscreen and controlling a 2D or 3D object to be displayed on the touchscreen by being sorted out from a plurality of the objects in response to a $1^{st}$ touch action applied to the touchscreen.

In another aspect, a method of controlling a mobile terminal includes displaying a plurality of objects in 3D in a manner that a plurality of the objects are displayed at different 3D depths in accordance with a $1^{st}$ classification criterion, respectively and controlling at least one $1^{st}$ object having a $1^{st}$ depth to be sorted out from a plurality of the objects in response to a $1^{st}$ touch action inputted via the touchscreen.

In a further aspect, a method of controlling a mobile terminal includes displaying a $1^{st}$ folder including at least one $1^{st}$ file and a $2^{nd}$ folder including at least one $2^{nd}$ file at a $1^{st}$ depth and a $2^{nd}$ depth in 3D in accordance with a $1^{st}$ classification criterion on a touchscreen, respectively and controlling the at least one $1^{st}$ file and the at least one $2^{nd}$ file to be displayed at the $1^{st}$ depth and the $2^{nd}$ depth instead of the $1^{st}$ folder and the $2^{nd}$ folder in response to a specific touch action performed on the touchscreen, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A and 4B are front diagrams of a mobile terminal according to one embodiment of the present invention for explaining one operational status of the mobile terminal.

FIGS. 6A to 7E are diagrams of screen configurations displaying a process for setting a classification condition based on data according to an embodiment of the present invention.

FIGS. 17A to 17C are diagrams of screen configurations for extracting a specific picture file meeting a specific classification condition using a picture file list according to an embodiment of the present invention.

FIGS. 18A to 18C are diagrams for receiving an input of a command signal for deleting data failing to meet a specific classification condition according to an embodiment of the present invention.

FIGS. 35 to 39 are diagrams of display screen configurations of implementing a method for controlling a mobile terminal according to an embodiment of the present invention.

DETAILED DESCRIPTION OF THE INVENTION

Reference will now be made in detail to the present invention, examples of which are illustrated in the accompanying drawings. Wherever possible, the same reference numbers will be used throughout the drawings to refer to the same or like parts. As used herein, the suffixes 'module' and 'unit' are used for elements in order to facilitate the disclosure only.

Therefore, significant meanings or roles are not given to the suffixes themselves and it is understood that the 'module' and 'unit' can be used together or interchangeably.

Mobile terminals described herein can include a mobile phone, a smart phone, a laptop computer, a digital broadcast terminal, a PDA (personal digital assistant), a PMP (portable multimedia player), and a navigation system. Except for a case applicable to a mobile terminal only, it is apparent to those of ordinary skill in the art that the configurations described herein are also applicable to stationary terminals, such as digital TVs and desktop computers.

Figure 1:
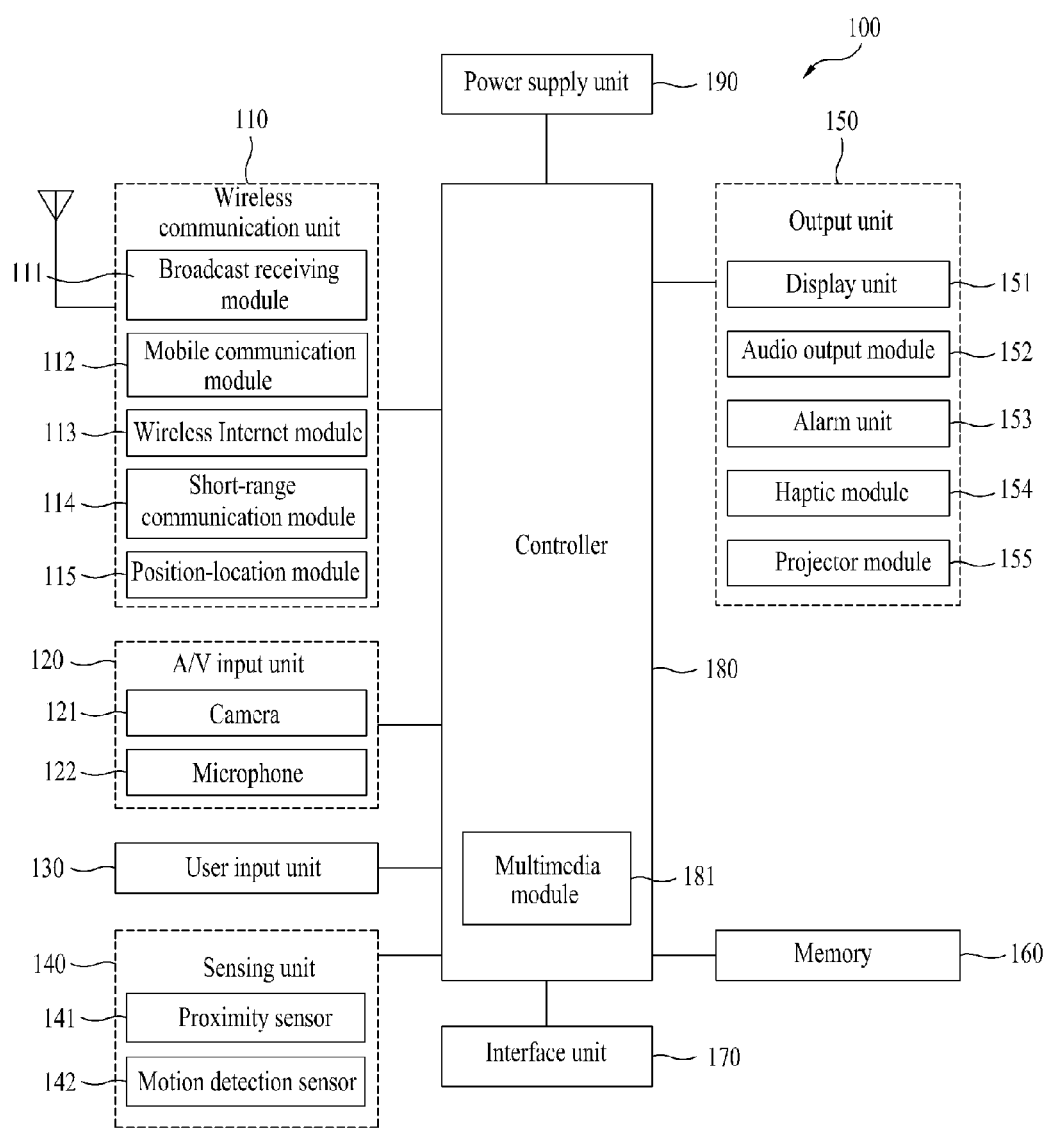
FIG. 1 is a block diagram of a mobile terminal according to one embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180 and a power supply unit 190. Although FIG. 1 shows the mobile terminal 100 having various components, it is understood that implementing all of the illustrated components is not a requirement. More or fewer components may alternatively be implemented.

The wireless communication unit 110 may include one or more components that permit wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and/or a terrestrial channel. The broadcast signal and/or broadcast associated information received by the broadcast receiving module 111 may be stored in a suitable storage device, such as in the memory 160.

The external broadcast managing server generally refers to a server that generates and transmits a broadcast signal and/or broadcast associated information or a server that is provided with a previously generated broadcast signal and/or broadcast associated information and then transmits the provided signal or information to the mobile terminal 100. The broadcast signal may be implemented as a TV broadcast signal, a radio broadcast signal, a data broadcast signal, or other known type of signal. If desired, the broadcast signal may include a broadcast signal combined with a TV or radio broadcast signal.

The broadcast associated information includes information associated with a broadcast channel, a broadcast program, or a broadcast service provider. The broadcast associated information can be provided via a mobile communication network, in which case the broadcast associated information can be received by the mobile communication module 112.

The broadcast associated information can be implemented in various forms. For example, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. For example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-explained digital broadcasting systems. The broadcast signal and/or broadcast associated information received by the broadcast receiving module 111 may be stored in a suitable storage device, such as in the memory 160.

The mobile communication module 112 transmits/receives wireless signals to/from one or more network entities (e.g., base station, external terminal, or server). Such wireless signals may represent, for example, audio, video, and data according to text/multimedia message transceivings.

The wireless Internet module 113 supports Internet access for the mobile terminal 100. The wireless Internet module 113 may be internally or externally coupled to the mobile terminal 100. The wireless Internet technology can include WLAN (Wireless LAN) (Wi-Fi), Wibro (Wireless broadband), Wimax (World Interoperability for Microwave Access), HSDPA (High Speed Downlink Packet Access), or other types of known wireless Internet technology.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth™ and ZigBee®.

The position-location module 115 identifies or otherwise obtains the location of the mobile terminal 100. If desired, the position location module 115 may be implemented with a global positioning system (GPS) module.

With continued reference to FIG. 1, the audio/video (A/V) input unit 120 may be configured to provide audio or video signal input to the mobile terminal 100. As shown, the A/V input unit 120 includes a camera 121 and a microphone 122.

The camera 121 receives and processes image frames of still pictures or video, which are obtained by an image sensor in a video call mode or a photographing mode. The processed image frames can be displayed on a display unit 151. The image frames processed by the camera 121 can be stored in the memory 160 or can be externally transmitted via the wireless communication unit 110. Optionally, at least two cameras 121 can be provided in the mobile terminal 100 according to an environment of use.

The microphone 122 receives an external audio signal while the mobile terminal 100 is in a particular mode, such as phone call mode, recording mode or voice recognition mode. The external audio signal is processed and converted into electric audio data. The processed audio data is transformed into a format transmittable to a mobile communication base station via the mobile communication module 112 when in a call mode. The microphone 122 typically includes assorted noise removing algorithms to remove noise generated in the course of receiving the external audio signal.

The user input unit 130 generates input data in response to user manipulation of an associated input device or devices. Examples of such input devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. The sensing unit 140 may include a proximity sensor 141. For example, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation of the mobile terminal 100 or acceleration/deceleration of the mobile terminal 100.

As an example, the mobile terminal 100 may be configured as a slide-type mobile terminal. In this configuration, the sensing unit 140 may sense whether a sliding portion of the mobile terminal is open or closed. Other examples include the sensing unit 140 sensing the presence or absence of power provided by the power supply 190 and the presence or absence of a coupling or other connection between the interface unit 170 and an external device. The sensing unit 140 may include a proximity sensor 141 and a motion detection sensor 142.

The output unit 150 generates outputs relevant to the senses of sight, hearing, and touch. The output unit 150 may include the display unit 151, an audio output module 152, an alarm unit 153, a haptic module 154, and a projector module 155.

The display unit 151 is typically implemented to visually display (output) information associated with the mobile terminal 100. For example, if the mobile terminal 100 is operating in a phone call mode, the display unit 151 will generally provide a user interface (UI) or graphical user interface (GUI) that includes information associated with placing, conducting, and terminating a phone call. As another example, if the mobile terminal 100 is in a video call mode or a photographing mode, the display unit 151 may additionally or alternatively display images that are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented as a transparent or optical transmittive type, hereafter referred to as a transparent display. A TOLED (transparent OLED) is a representative example of the transparent display. A rear configuration of the display unit 151 can also be implemented in the optical transmittive type. In this configuration, a user is able to see an object at the rear of the terminal body via the area occupied by the display unit 151 of the terminal body.

At least two display units 151 can be provided in the mobile terminal 100. For example, a plurality of display units 151 can be arranged on a single face of the mobile terminal 100 spaced apart from each other or built in one body. Alternatively, a plurality of display units 151 can be arranged on different faces of the mobile terminal 100.

If the display unit 151 and a sensor for detecting a touch action (hereinafter called 'touch sensor') configures a mutual layer structure (hereinafter called 'touchscreen'), the display unit 151 may be used as both an input device and an output device. In this case, the touch sensor can be configured as a touch film, a touch sheet, or a touchpad.

The touch sensor can be configured to convert a pressure applied to a specific portion of the display unit 151 or a variation of a capacitance generated from a specific portion of the display unit 151 to an electric input signal. Moreover, the touch sensor may detect a pressure of a touch as well as a touched position or magnitude of the touch.

If a touch input is made to the touch sensor, a signal(s) corresponding to the touch is transferred to a touch controller. The touch controller processes the signal(s) and then transfers the processed signal(s) to the controller 180. Therefore, the controller 180 may determine whether a prescribed portion of the display unit 151 is touched.

Referring again to FIG. 1, a proximity sensor 141 can be provided on an internal area of the mobile terminal 100 enclosed by the touchscreen or around the touchscreen. The proximity sensor 141 is a sensor that detects a presence or non-presence of an object approaching a prescribed detecting surface or an object existing around the proximity sensor using an electromagnetic field strength or infrared ray without mechanical contact. Hence, the proximity sensor 141 has greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, or other type of known proximity sensor. The touchscreen may include an electrostatic capacity proximity sensor configured to detect the proximity of a pointer using a variation of electric field according to the proximity of the pointer and can be classified as the proximity sensor 141.

In the following description, for clarity, an action in which a pointer approaches without contacting the touchscreen, yet is recognized as being located on the touchscreen, is named 'proximity touch'. An action in which a pointer actually touches the touchscreen is named 'contact touch'. The position on the touchscreen proximity-touched by the pointer refers to the position of the pointer that vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be displayed on the touchscreen.

Figure 2:
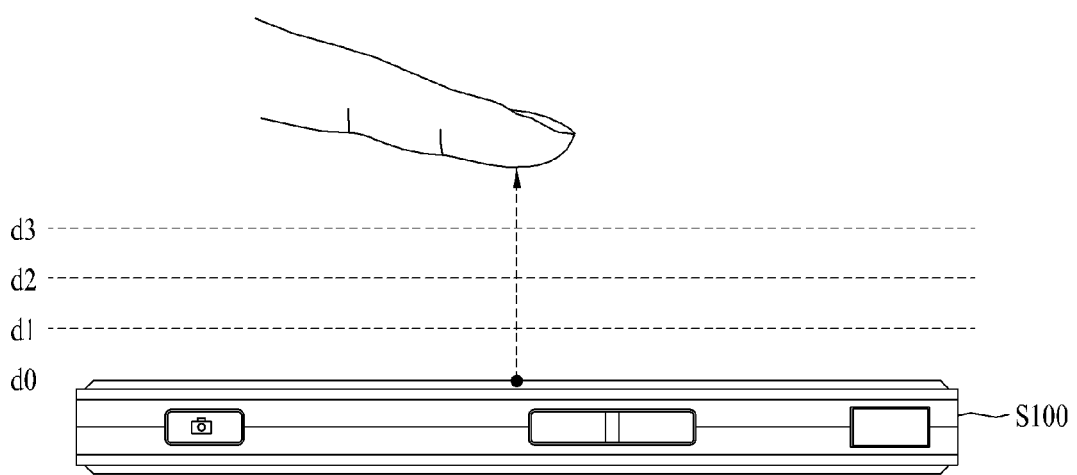
FIG. 2 is a diagram to explain the concept of proximity depth of a proximity sensor.

The proximity sensor 141 described with reference to FIG. 1 is explained in detail with reference to FIG. 2 as follows. FIG. 2 is a conceptual diagram for explaining a proximity depth of the proximity sensor 141. Referring to FIG. 2, when a pointer, such as a user's finger or a pen, for example, approaches the touchscreen, the proximity sensor 141 provided within or in the vicinity of the touchscreen detects the approach of the pointer and outputs a proximity signal in response. The proximity sensor 141 can be configured to output a different proximity signal according to a distance between the pointer and the proximity-touched touchscreen (hereinafter named 'proximity depth').

FIG. 2 illustrates a cross-section of the touchscreen is shown provided with a proximity sensor 141 capable of detecting three proximity depths. It is understood that a proximity sensor capable of detecting more or fewer proximity depths is possible.

If the pointer fully contacts the touchscreen (d0), it is recognized as a contact touch. If the pointer is positioned a distance from the touchscreen that is smaller than d1, it is recognized as a proximity touch to a first proximity depth. If the pointer is positioned a distance from the touchscreen equal to or greater than d1 and less than d2, it is recognized as a proximity touch to a second proximity depth. If the pointer is positioned a distance from the touchscreen smaller than d3 and equal to or greater than d2, it is recognized as a proximity touch to a third proximity depth. If the pointer is positioned a distance from the touchscreen equal to or greater than d3, no proximity touch is recognized.

The controller 180 recognizes the proximity touch as one of various input signals according to the proximity depth and position of the pointer. The controller 180 performs various operation controls according to the various input signals.

Figure 3A:
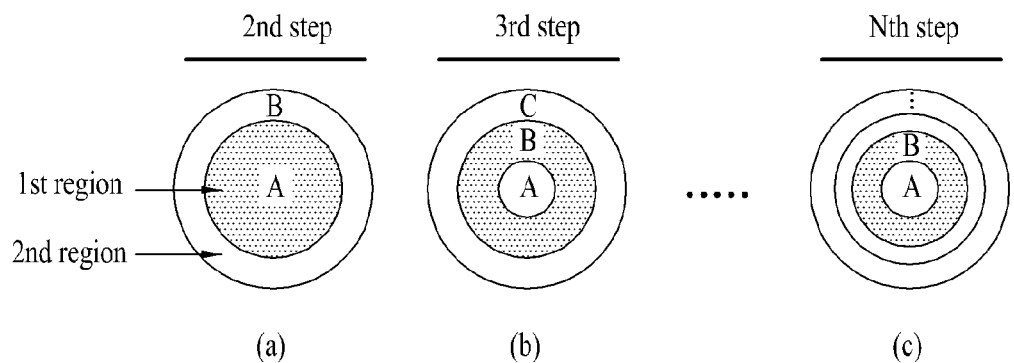
FIG. 3A is a diagram to explain the concept of a proximity touch recognizing area for detecting a proximity signal according to the present invention.
Figure 3B:
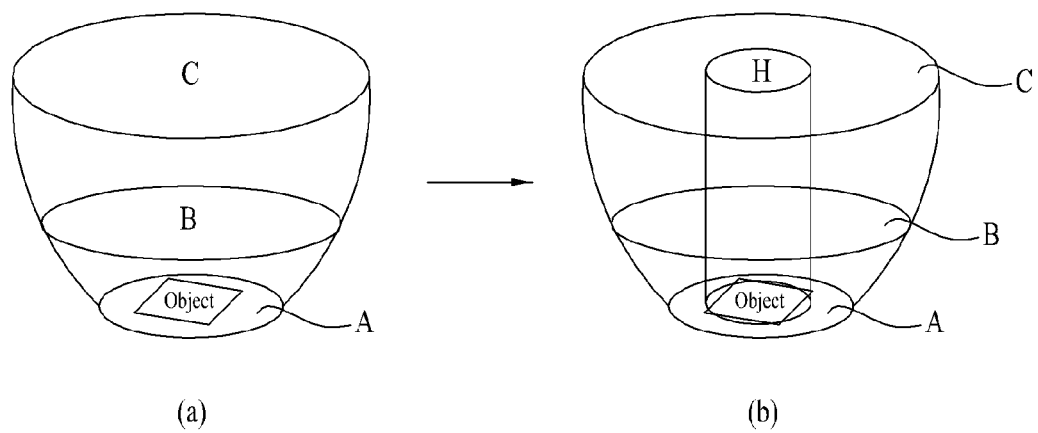
FIG. 3B is a diagram to explain the concept of a haptic area for generating a tactile effect according to an embodiment of the present invention.

FIGS. 3A and 3B are diagrams relating to a proximity touch recognition area and a tactile effect generation region. FIG. 3A represents an object such as an icon or a menu item in a circle type for ease of description.

As shown in FIG. 3A(a), a region for displaying an object on the display unit 151 may be divided into a first region A at a central part and a second region B that encloses or surrounds the first region A. The first and second regions A and B may be configured to generate tactile effects, such as strength or pattern, which differ from each other. For example, the first and second regions A and B may be configured to generate 2-step vibrations by outputting a first vibration when the second region B is touched or outputting a second vibration greater than the first vibration when the first region A is touched.

If both the proximity touch recognition region and the haptic region are simultaneously set in the region displaying the object therein, the haptic region may be set for generating the tactile effect that is different from the proximity touch recognition region for detecting the proximity signal. In particular, the haptic region may be narrower or wider than the proximity touch recognition region.

For example, in FIG. 3A(a), the proximity touch recognition region may be set to the area including both the first and second regions A and B. The haptic region may be set to the first region A.

As shown in FIG. 3A(b), the region having the object displayed therein may be divided into three regions A, B and C. Alternatively, the region having the object displayed therein may be divided into N regions (N>4) as shown in FIG. 3A(c). Each of the divided regions may generate a tactile effect having a different strength or pattern. If a region having a single object represented therein is divided into at least three regions, the haptic region and the proximity touch recognition region may be set to differ from each other according to a use environment.

A size of the proximity touch recognition region of the display 151 may be set to vary according to proximity depth. For example, FIG. 3B(a) shows the proximity touch recognition region is configured to decrease by C→B→A according to the proximity depth for the display 151. The proximity touch recognition region may also be configured to increase by C→B→A according to the proximity depth for the display 151. The haptic region may be set to have a predetermined size, such as the region 'H' in FIG. 3B(b), regardless of the proximity depth for the display 151.

When dividing the object-displayed region for setting of the haptic region or the proximity touch recognition region, one of various schemes of horizontal/vertical division, radial division and/or combinations thereof may be used as well as the concentric circle type division shown in FIG. 3A.

Referring again to FIG. 1, the audio output module 152 functions in various modes including a call-receiving mode, a call-placing mode, a recording mode, a voice recognition mode, or a broadcast reception mode to output audio data that is received from the wireless communication unit 110 or is stored in the memory 160. During operation, the audio output module 152 outputs audio data relating to a particular function (e.g., call received, message received). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event.

The alarm unit 153 outputs a signal for announcing the event occurrence via vibration as well as a video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative tactile effect generated by the haptic module 154. Strength and pattern of the vibration generated by the haptic module 154 are controllable. For example, different vibrations can be output by being synthesized together or can be output in sequence.

The haptic module 154 may generate various tactile effects in addition to vibration. For example, the haptic module 154 may generate an effect of the arrangement of pins vertically moving against a contact skin surface, an effect of injection/suction power of air though an injection/suction hole, an effect of skimming over a skin surface, an effect of contact with an electrode, an effect of electrostatic force, an effect of a hot/cold sense using an endothermic or exothermic device, or other known tactile effects.

The haptic module 154 can be implemented to enable a user to sense the tactile effect through a muscle sense of finger or arm as well as to transfer the tactile effect through direct contact. Optionally, at least two haptic modules 154 can be provided in the mobile terminal 100 in accordance with the corresponding configuration type of the mobile terminal 100.

The projector module 155 is an element for performing an image projector function using the mobile terminal 100. The projector module 155 displays an image, which is identical to or partially different from an image displayed on the display unit 151, on an external screen or wall according to a control signal of the controller 180.

The projector module 155 can include a light source (not shown) generating light (e.g., laser) for projecting an image externally, an image producing means (not shown) for producing an image to output externally using the light generated from the light source, and a lens (not shown) for enlarging the image output externally at a predetermined focus distance. The projector module 155 can further include a device for adjusting a direction of the projected image by mechanically moving the lens or the entire projector module.

The projector module 155 can be classified as a CRT (cathode ray tube) module, an LCD (liquid crystal display) module, a DLP (digital light processing) module or other type of known projector module according to a type of the display means. In particular, the DLP module is operated by a mechanism for enabling the light generated from the light source to reflect on a DMD (digital micro-mirror device) chip and can be advantageous for limiting the size of the projector module 151.

Preferably, the projector module 155 can be provided in a lengthwise direction of a lateral side, front side or back side of the mobile terminal 100. It is understood that the projector module 155 can be provided on any portion of the mobile terminal 100 according to necessity.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, and moving pictures. A recent use history or a cumulative use frequency of each data (e.g., use frequency for each phonebook, each message or each multimedia) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. The mobile terminal 100 may operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or other known port types.

The identity module is the chip for storing various types of information for authenticating a use authority of the mobile terminal 100 and can include a User Identify Module (UIM), a Subscriber Identify Module (SIM) and/or a Universal Subscriber Identity Module (USIM). A device having the identity module (hereinafter called an 'identity device') can be manufactured as a smart card. Therefore, the identity device is connectible to the mobile terminal 100 via the corresponding port.

When the mobile terminal 100 is connected to an external cradle, the interface unit 170 provides a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications and video calls. The controller 180 may include a multimedia module 181 that provides multimedia playback. The multimedia module 181 may be configured as part of the controller 180 or implemented as a separate component. The controller 180 may also perform a pattern recognizing process for recognizing a writing input and a picture drawing input performed on the touchscreen as characters or images.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in the memory 160, and executed by the controller 180.

Figure 4A:
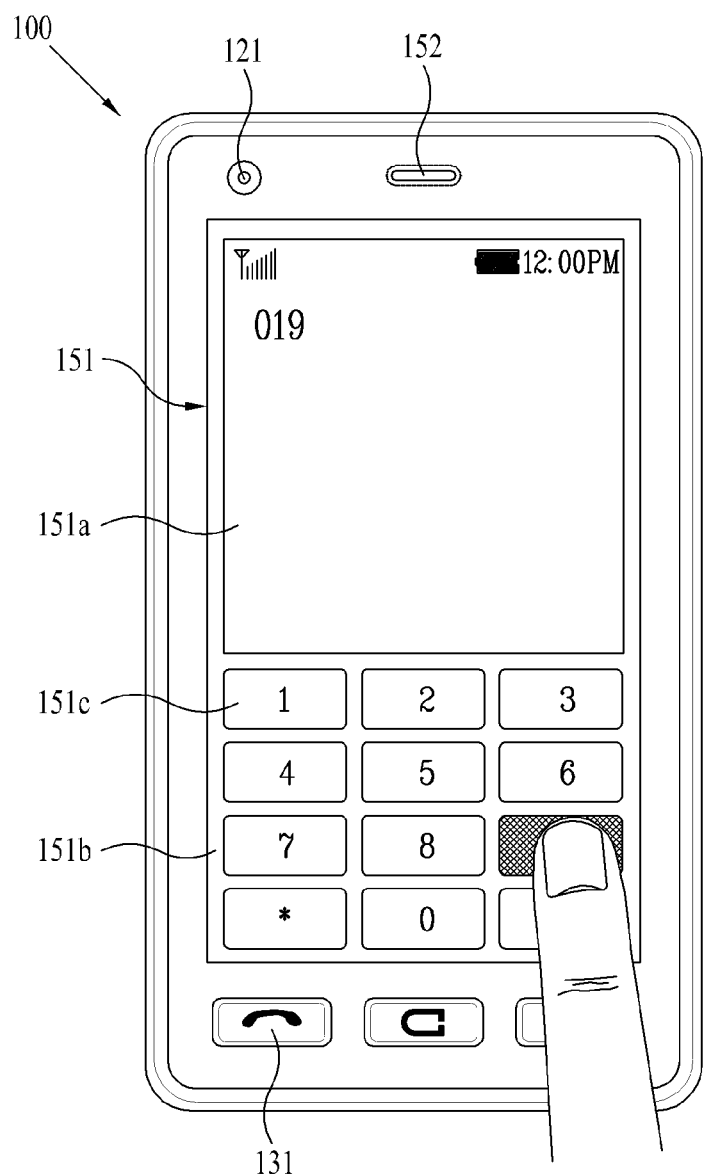

Interconnected operational mechanism between the display unit 151 and a touchpad are explained with reference to FIGS. 4A and 4B. FIGS. 4A and 4B are front-view diagrams of a terminal for explaining an operational state according to one embodiment of the present invention.

Various types of visual information can be displayed on the display unit 151. The information can be displayed as characters, numerals, symbols, graphics and/or icons.

In order to input the information, at least one of the characters, numerals, symbols, graphics and icons is represented as a single predetermined array to be implemented in a keypad formation. This keypad formation can be so-called 'soft keys'. FIG. 4A depicts a touch applied to a soft key input through a front face of a terminal body.

The display unit 151 is operable through an entire area or by being divided into a plurality of regions. In the latter case, a plurality of the regions can be interoperable.

For example, an output window 151*a* and an input window 151*b* are displayed on the display unit 151. A soft key 151*c* representing a digit for inputting a phone number or other information is displayed on the input window 151*b*. If the soft key 151*c* is touched, a digit corresponding to the touched soft key is displayed on the output window 151*a*. If a first manipulating unit 131 is manipulated, a call connection to the phone number displayed on the output window 151*a* is attempted.

FIG. 4B depicts a touch applied to a soft key through a rear face of a terminal body. FIG. 4A shows the terminal body arranged vertically (portrait), while FIG. 4B shows the terminal body arranged horizontally (landscape). The display unit 151 can be configured to change an output picture according to the arranged direction of the terminal body.

FIG. 4B shows a text input mode activated in the mobile terminal 100. An output window 151*a'* and an input window 151*b'* are displayed on the display unit 151. A plurality of soft keys 151*c'* representing at least characters, symbols or digits can be arranged in the input window 151*b'*. The soft keys 151*c'* can be arranged in a QWERTY key formation.

If the soft keys 151*c'* are touched through the touchpad, the characters, symbols and digits corresponding to the touched soft keys are displayed on the output window 151*a'*. The touch input via the touchpad is advantageous because blocking the soft keys 151*c'* by a finger during a touch can be prevented, as compared to a touch input via the display unit 151.

If the display unit 151 and the touchpad are configured as transparent, the user is able to visually see his/her fingers located at the back side of the terminal body. Hence, more accurate touch inputs are possible.

The display unit 151 or the touchpad can be configured to receive a touch input by scroll. A user scrolls the display unit 151 or the touchpad to shift a cursor or pointer located at an entity (e.g., an icon) displayed on the display unit 151. Furthermore, when a finger is shifted on the display unit 151 or the touchpad, a path of the shifted finger can be displayed visually on the display unit 151. This may be useful in editing an image displayed on the display unit 151.

When both the display unit (touchscreen) 151 and the touchpad are touched together within a predetermined time range, one function of the mobile terminal 100 can be executed. The simultaneous touch may occur when the terminal body is held by a user using a thumb and a first finger (clamping). The function can include activation or deactivation of the display unit 151 or the touchpad.

Mobile terminals described herein may include at least one of the elements shown in FIG. 1 and may also include a touchscreen for receiving a touch action that is input externally. In the following description, a method of extracting data in a mobile terminal 100 is explained in detail with reference to the accompanying drawings.

Figure 5:
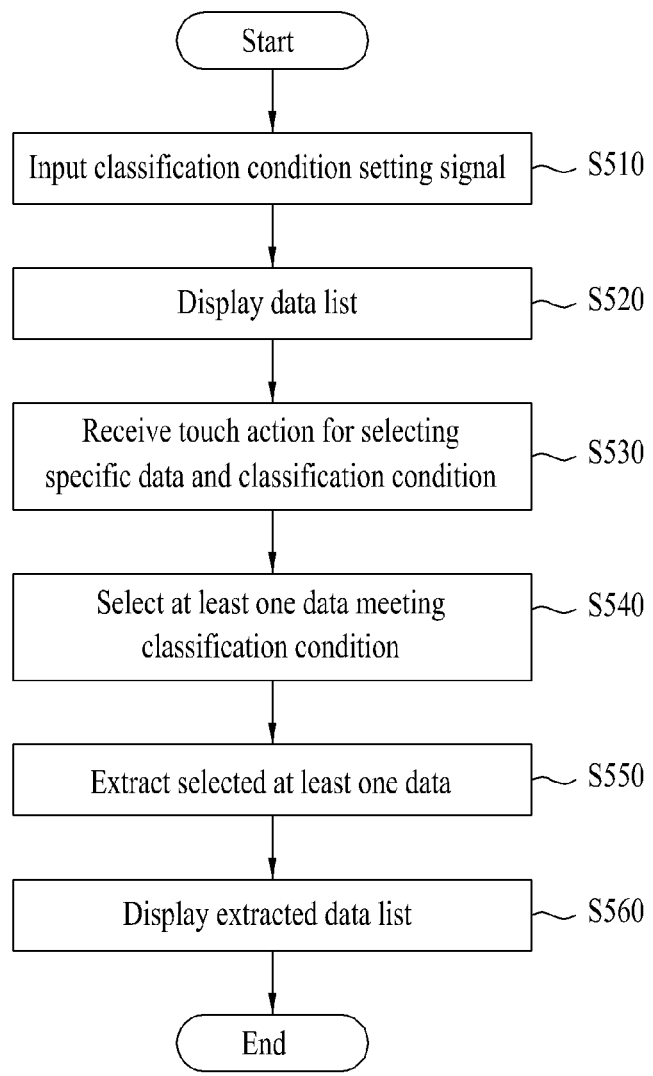
FIG. 5 is a flowchart for a method of extracting data in a mobile terminal according to one embodiment of the present invention.

FIG. 5 depicts a flowchart of a method for extracting data in a mobile terminal 100. Referring to FIG. 5, the mobile terminal 100 receives a signal to set a classification condition to be displayed as information on a data list including a plurality of data (S510). A user may input the setting signal using the user input unit 130 or the touchscreen.

The data list can include a message a list (including a list of received messages, a list of sent messages, and/or a list of messages being written), an audio file list (including an MP3 file list and/or a voice recording file list), a picture file list (including a downloaded picture list, a recorded broadcast list, and/or a photographed picture list), a contact number list (including a list of contact numbers registered in a phonebook, a list of recent incoming/outgoing contact numbers, a contact number list of outgoing/incoming calls, and/or a list of received/sent messages) or a schedule list. The picture file list can further include a still picture file list and a moving picture file list.

The classification condition may refer to a condition for classifying a specific one of a plurality of data included in the data list. Therefore, the control unit 180 sets a classification condition corresponding to the input setting signal as a classification condition to be displayed in the data list. Meanwhile, inputting setting signal (S510) is not mandatory for implementation of the present invention and can be omitted.

Figure 6A:
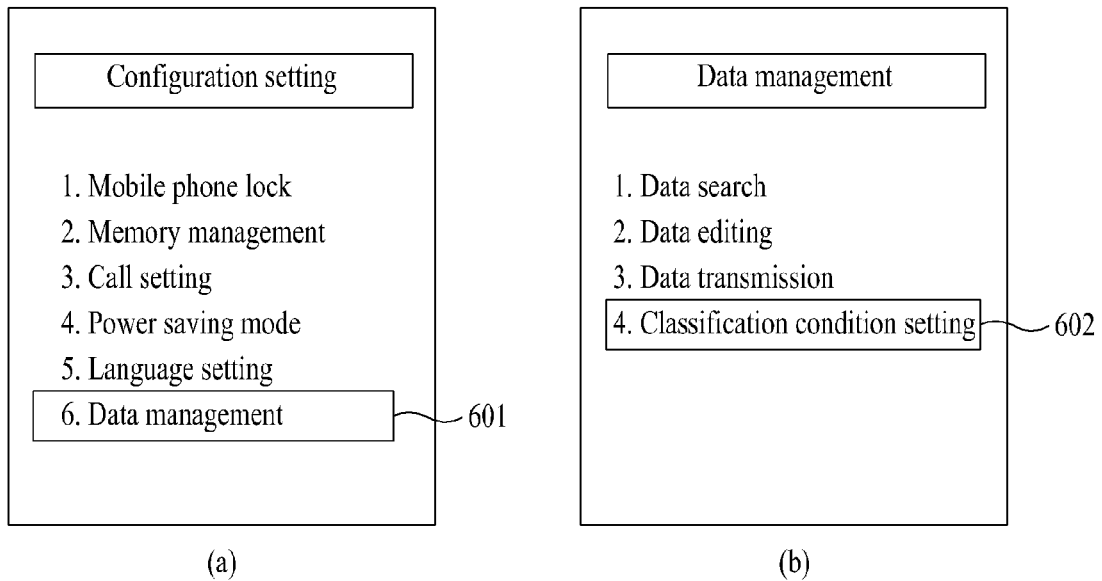
Figure 6B:
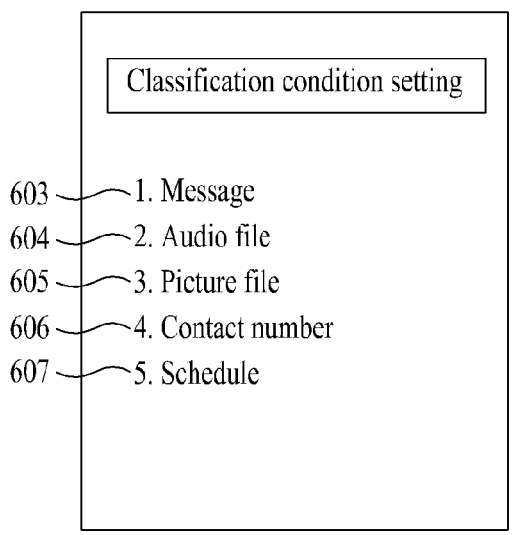

In the following description, a process for inputting a setting signal of a classification condition is explained in detail with reference to FIGS. 6A to 7E. Referring to FIG. 6A, if a menu item 601 ('Data management') is selected through a menu search, as illustrated in FIG. 6A (a), the mobile terminal 100 displays a list of menu items that belong to data management, as illustrated in FIG. 6A (b). Referring to FIG. 6B, if a menu item 602 ('classification condition setting') is selected in FIG. 6A (b), the mobile terminal 100 displays a data type list in order to enable a classification condition to be set for each data type.

For example, a data type such as a message, an audio file, a picture file, a contact number, or a schedule can be included in the data type list. Optionally, if a separate key or a separate key region corresponding to the classification condition setting is selected (not shown in the drawings), the mobile terminal is able to configure the image shown in FIG. 6B.

In the following description, a process for setting a classification condition according to data type is explained in detail. Referring to FIG. 7A, if 'Message' 603 is selected from the data type list shown in FIG. 6B, the mobile terminal 100 displays a classification condition list constructed with classification conditions settable for the message. For example, a recipient/originator, a date, a group to which a recipient/originator belongs, and a keyword can be included in the classification condition list. The mobile terminal receives inputs of setting signals of specific classification conditions 701 and 702 among a plurality of the classification conditions included in the classification condition list from a user.

Referring to FIG. 7B, if 'Audio file' 604 is selected from the data type list shown in FIG. 6B, the mobile terminal 100 displays a classification condition list constructed with classification conditions settable for the audio file. For example, a file name, an album, an artist (e.g., singer, composer, writer, or player), a created date, a keyword, and a genre can be included in the classification condition list. The mobile terminal 100 receives inputs of setting signals of specific classification conditions 711 and 712 among a plurality of the classification conditions included in the classification condition list from a user.

Referring to FIG. 7C, if 'Picture file' 605 is selected from the data type list shown in FIG. 6B, the mobile terminal 100 displays a classification condition list constructed with classification conditions settable for the picture file. For example, a created date, a file name, an object, and a location can be included in the classification condition list. The mobile terminal 100 receives inputs of setting signals of specific classification conditions 721 and 722 among a plurality of the classification conditions included in the classification condition list from a user.

Referring to FIG. 7D, if 'Contact number' 606 is selected from the data type list shown in FIG. 6B, the mobile terminal 100 displays a classification condition list constructed with classification conditions settable for the contact number. For example, a group to which a contact number belongs, a partial phone number, and a contact name can be included in the classification condition list. The mobile terminal 100 receives an input of a setting signal of a specific classification condition 731 among a plurality of the classification conditions included in the classification condition list from a user.

Figure 7E:
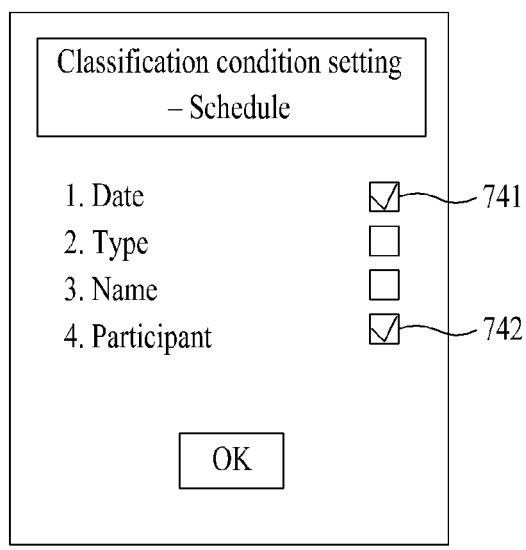

Referring to FIG. 7E, if 'Schedule' 607 is selected from the data type list shown in FIG. 6B, the mobile terminal 100 displays a classification condition list constructed with classification conditions settable for the schedule. For example, a date, a type, a name, and a participant can be included in the classification condition list. The mobile terminal 100 receives inputs of setting signals of specific classification conditions 741 and 742 among a plurality of the classification conditions included in the classification condition list from a user.

Referring again to FIG. 5, the mobile terminal 100 displays a data list including a plurality of data via the display unit 151 under the control of the controller 180 (S520). The classification condition, which was set according to the input setting signal, can be displayed on the data list. Alternatively, the mobile terminal 100 receives an input of a setting signal for a classification condition from a user while displaying the data list and displays the classification condition corresponding to the input setting signal on the data list.

For example, if the data list is a list of received messages and the set classification condition includes a recipient and a keyword (see FIG. 7A), the recipient and the corresponding keyword for each message can be displayed on the received message list. Displaying the data list (S520) can be performed in the course of a data search process, a data editing process, a data storing process or a data related application executing process.

The mobile terminal 100 receives an input via the touchscreen of a touch action for selecting specific data and a specific classification condition corresponding to the specific data using the displayed data list (S530). The mobile terminal 100 identifies a touch action (hereinafter called a first touch action) for commanding a specific data playback or display or identifies a touch action (hereinafter called a second touch) for selecting a corresponding specific classification condition according to a touch pattern.

In one example, the first touch action is a touch performed once and the second touch action is a touch performed two or more times, with reference to a touch count. In another example, the first touch action is a touch performed during a predetermined period of time and the second touch action is a touch performed during the predetermined period of time or later, with reference to a touch duration. In another example, the first touch action is a touch performed at a pressure lower than a predetermined pressure and the second touch action is a touch performed at a pressure equal to or higher than the predetermined pressure, with reference to a touch pressure. Moreover, in another example, if a separate key is selected before an input of the second touch action, the mobile terminal 100 recognizes a next touch action as the second touch action.

Subsequently, the mobile terminal 100 selects at least one data, which meets the selected specific classification condition, under the control of the controller 180 (S540). The specific data selected by the touch action input (S530) is included in the selected at least one data.

When receiving the touch action (S530), the touchscreen may receive an input of a touch action for a display region off the specific classification condition in the specific data. Therefore, when selecting the at least one data (S540), the mobile terminal 100 selects at least one data that meets the specific classification condition corresponding to the display region that is touched. Moreover, if a plurality of the data included in the data list is not displayed on one screen, the mobile terminal 100 selects data that is not currently displayed on the screen (S540) if the specific classification condition is met.

In the following description, receiving the touch action (S530) and selecting the at least one data (S540) are explained in detail with reference to FIGS. 8A to 12B.

FIGS. 8A to 8E are diagrams of screen configurations for selecting a specific message meeting a specific classification condition using a message list according to one embodiment of the present invention. In the following example, a received message list including first to fourth messages 801 to 804 is displayed on the screen.

Figure 8A:
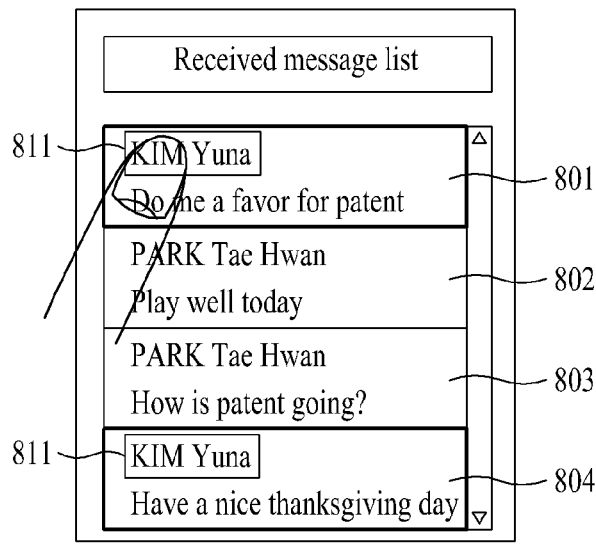
FIGS. 8A to 8E are diagrams of screen configurations for selecting a specific message meeting a specific classification condition using a message list according to an embodiment of the present invention.

Referring to FIG. 8A, if a display region of an originator 'KIM Yuna' 811 in the first message 801 is touched by a user, the mobile terminal 100 selects all messages 801, 804 that include 'KIM Yuna' 811 as the originator from the plurality of the messages 801, 804 included in the received message list.

Figure 8B:
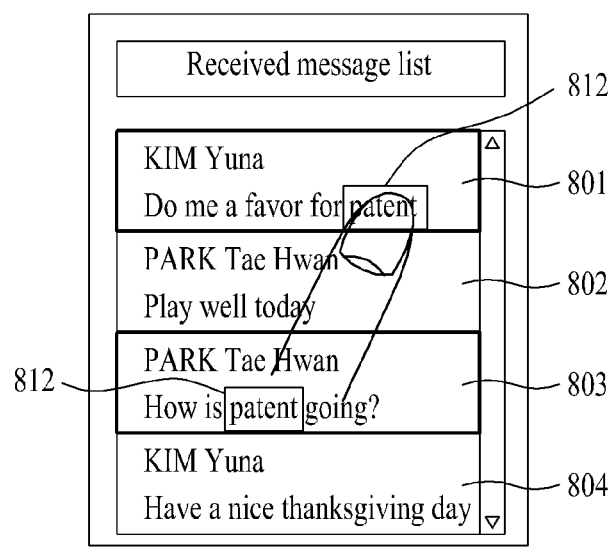

Referring to FIG. 8B, if a display region of a keyword 'patent' 812 in the first message 801 is touched by a user, the mobile terminal 100 selects all messages 801, 803 that include the text 'patent' 812, from the plurality of the messages included in the received message list.

Figure 8C:
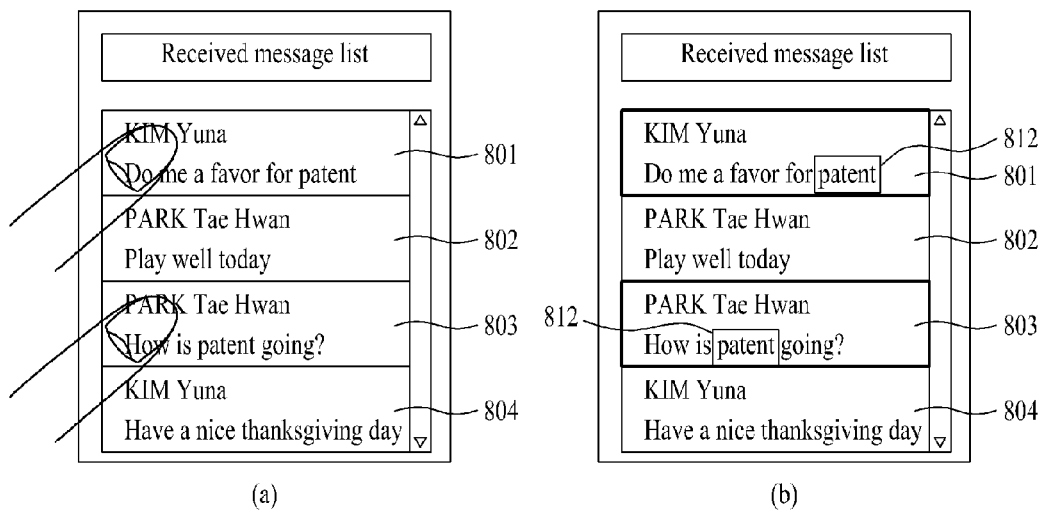

Referring to FIG. 8C (a), if the first message 801 and the third message 803 are touched by a user, the mobile terminal 100 checks a common classification condition of the first and third messages 801 and 803. If the checked common classification condition is the keyword 'patent' 812, the mobile terminal 100 selects all messages 801 and 803 including the text 'patent' 812 from the plurality of the messages included in the received message list, as illustrated in FIG. 8C (b).

Figure 8D:
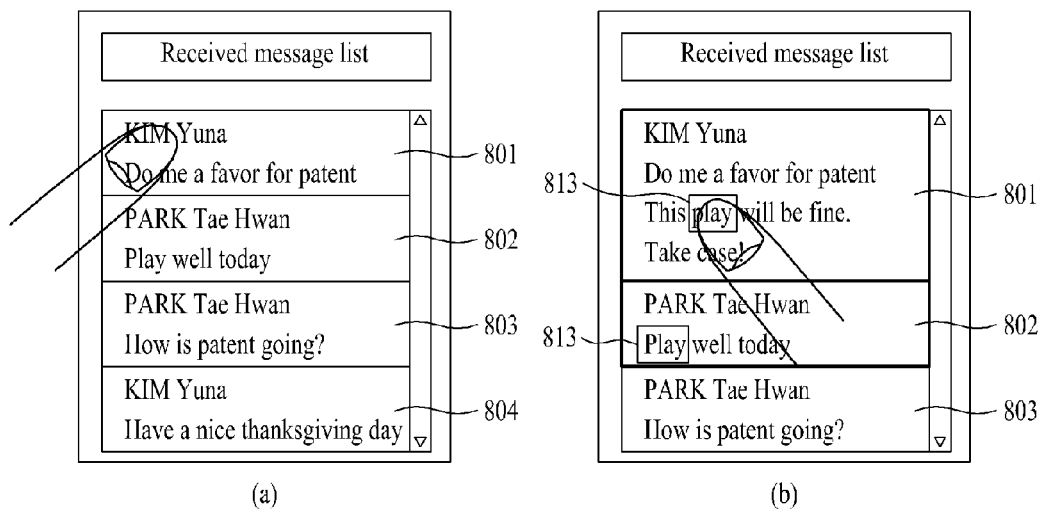

If the first message 801 is selected, as illustrated in FIG. 8D (a), the mobile terminal 100 displays an entire message content of the first message 801 on the received message list, as illustrated in FIG. 8D (b). If a display region of a keyword 'play' 813 is selected from the entire message content of the first message 801, the mobile terminal 100 selects all messages 801 and 802 including the text 'play' 813 from the plurality of the messages included in the received message list, as illustrated in FIG. 8D (b).

Figure 8E:
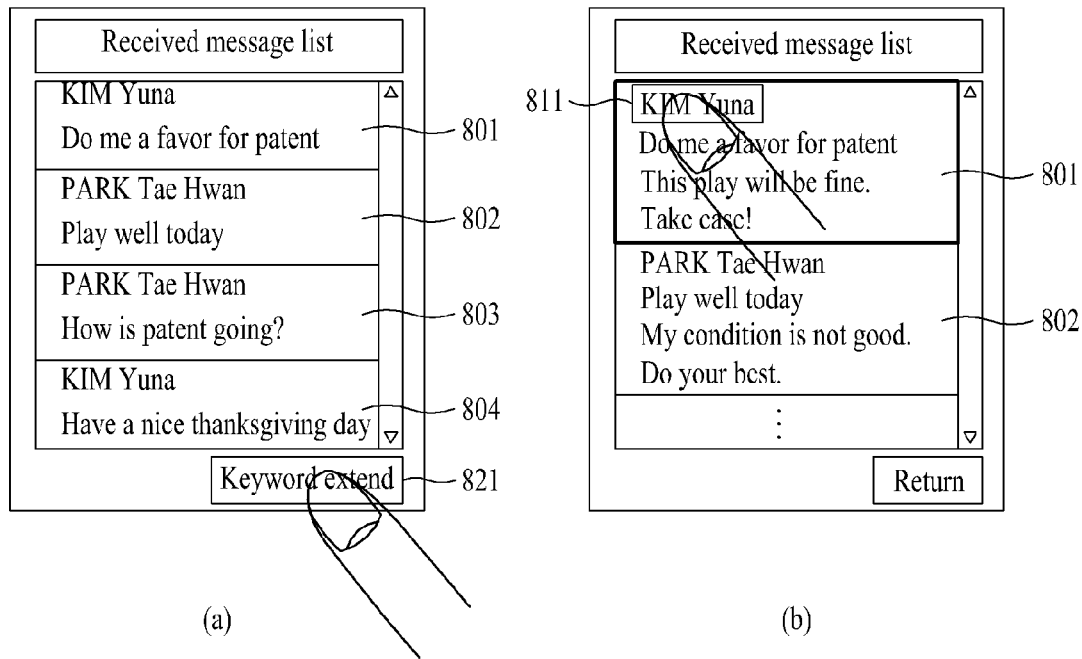

Referring to FIG. 8E (a), while the received message list is displayed, if a key region 821 corresponding to a keyword extension command is selected, the mobile terminal 100 receives an input of a keyword extension command signal. After receiving the input of the keyword extension command signal, the mobile terminal 100 displays the corresponding keyword(s) for each of the messages or the entire message contents including the corresponding keyword(s), as illustrated in FIG. 8E (b).

Figure 9A:
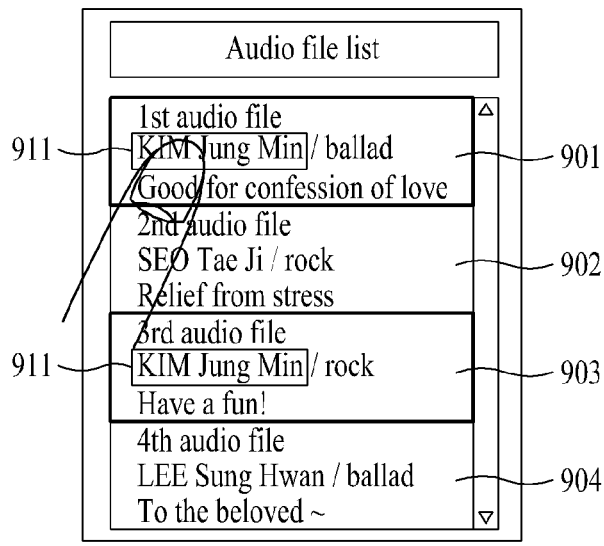
FIGS. 9A to 9C are diagrams of screen configurations for selecting a specific audio file meeting a specific classification condition using an audio file list according to an embodiment of the present invention.
Figure 9B:
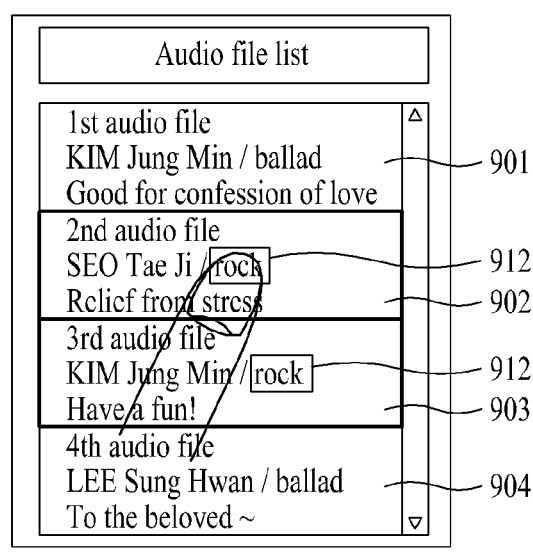
Figure 9C:
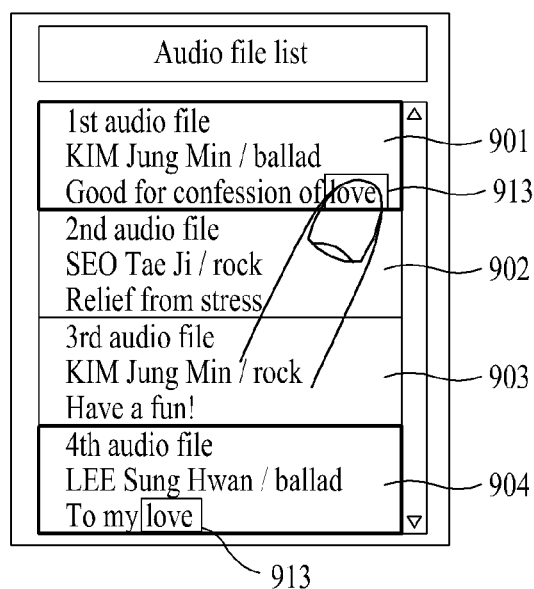

FIGS. 9A to 9C are diagrams of screen configurations for selecting a specific audio file meeting a specific classification condition using an audio file list according to one embodiment of the present invention. In the following example, first to fourth audio files 901 to 904 are included in an audio file list displayed on the screen.

Referring to FIG. 9A, if a display region of a singer name 'KIM Jung Min' 911 in the first audio file 901 is touched by a user, the mobile terminal 100 selects all audio files 901, 903 for which the singer name is the 'KIM Jung Min' 911 from the plurality of audio files included in the audio file list.

Referring to FIG. 9B, if a display region of a genre 'rock' 912 in the second audio file 902 is touched by a user, the mobile terminal 100 selects all audio files 902, 903 for which the genre is 'rock' 912 from the plurality of audio files included in the audio file list.

Referring to FIG. 9C, if a display region of a keyword 'love' 913 in the first audio file 901 is touched by a user, the mobile terminal 100 selects all audio files 901, 904 containing the word 'love' 913 from the plurality of audio files included in the audio file list.

Figure 10A:
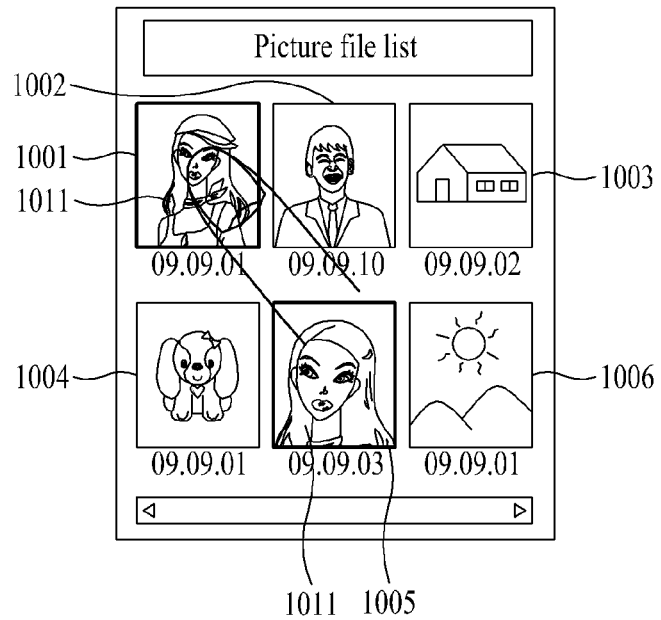
FIGS. 10A and 10B are diagrams of screen configurations for selecting a specific picture file meeting a specific classification condition using a picture file list according to an embodiment of the present invention.
Figure 10B:
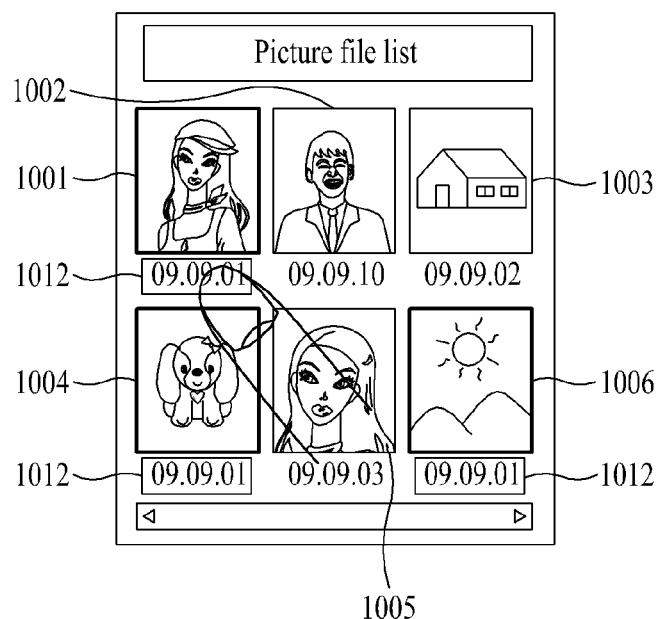

FIGS. 10A and 10B are diagrams of screen configurations for selecting a specific picture file meeting a specific classification condition using a picture file list according to one embodiment of the present invention. In the following example, a picture file list includes first to sixth pictures 1001 to 1006 represented as thumbnails.

Referring to FIG. 10A, if a specific object 1011 in the first picture 1001 is touched by a user, the mobile terminal 100 selects all picture files 1001, 1005 that include the specific object 1011 from the plurality of picture files included in the picture file list.

Referring to FIG. 10B, if a created date '09. 09. 01' 1012 of the first picture 1001 is touched by a user, the mobile terminal 100 selects all picture files 1001, 1004 for which the created date is '09. 09. 01' 1012 from the plurality of picture files included in the picture file list.

Figure 11A:
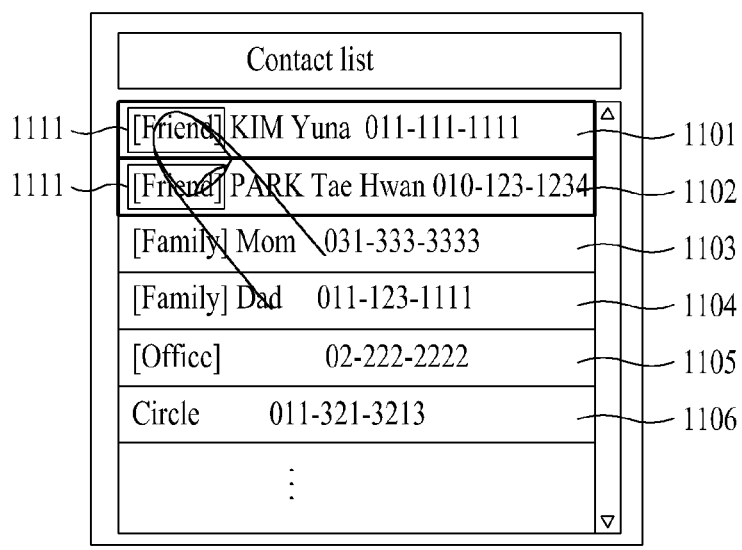
FIGS. 11A and 11B are diagrams of screen configurations for selecting a specific contact number meeting a specific classification condition using a contact number list according to an embodiment of the present invention.
Figure 11B:
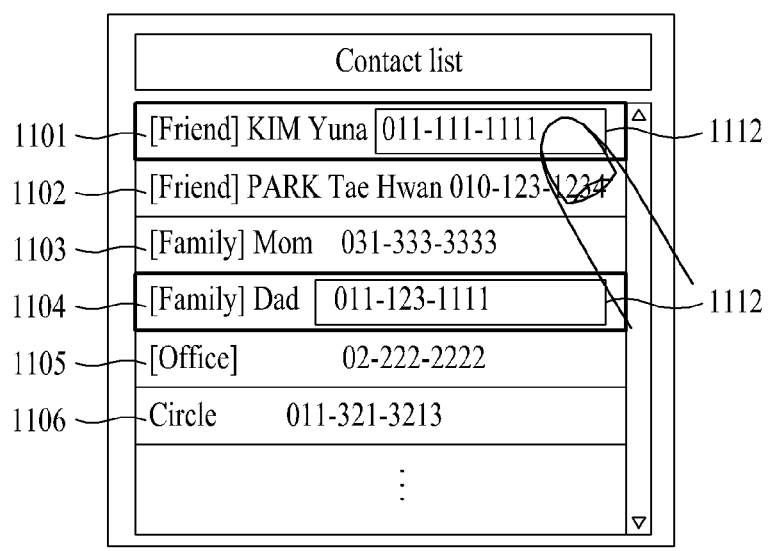

FIGS. 11A and 11B are diagrams of screen configurations for selecting a specific contact number meeting a specific classification condition using a contact number list according to one embodiment of the present invention. In the following example, first to sixth contact numbers 1101 to 1106 are included in a contact number list displayed on the screen.

Referring to FIG. 11A, if a display region of a group 'Friend' 1111 in the first contact number 1101 is touched by a user, the mobile terminal 100 selects all contact numbers 1101, 1102 belonging to the group 'Friend' 1111 from the plurality of the contact numbers included in the contact number list.

Referring to FIG. 11B, if a display region of a phone number 1112 in the first contact number 1101 is touched by a user, the mobile terminal 100 selects all contact numbers 1101, 1104 matching the phone number 1112 of the first contact number 1101 entirely or partially from the plurality of the contact numbers included in the contact number list.

Figure 12A:
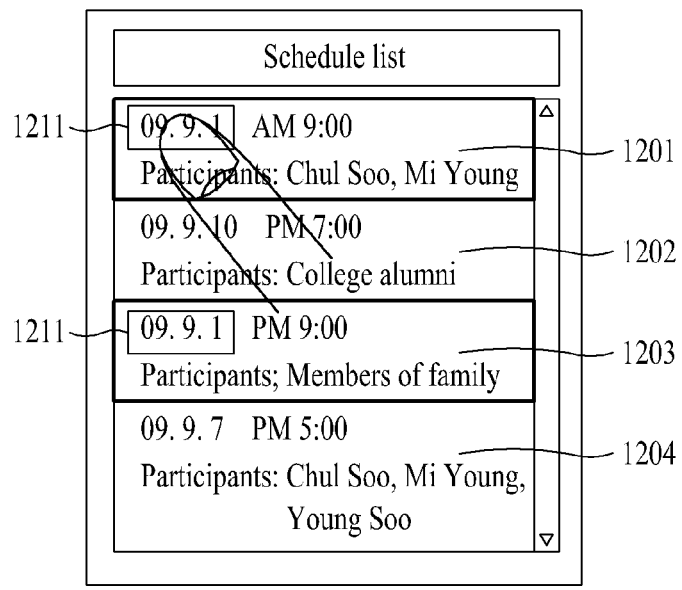
FIGS. 12A and 12B are diagrams of screen configurations for selecting a specific schedule meeting a specific classification condition using a schedule list according to an embodiment of the present invention.
Figure 12B:
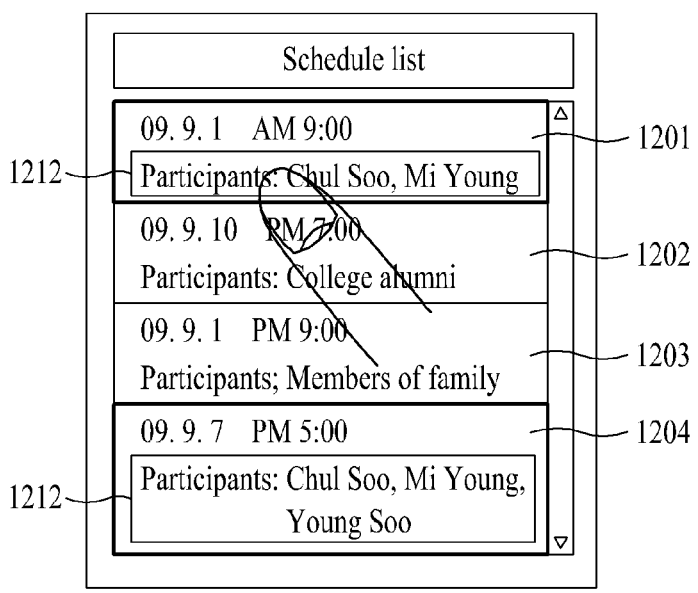

FIGS. 12A and 12B are diagrams of screen configurations for selecting a specific schedule meeting a specific classification condition using a schedule list according to one embodiment of the present invention. In the following example, first to fourth schedules 1201 to 1204 are included in a schedule list displayed on the screen.

Referring to FIG. 12A, if a display region of a date '09. 9. 1' 1211 in the first schedule 1201 is touched by a user, the mobile terminal 100 selects all schedules 1201, 1203 for which a date corresponds to the '09. 9. 1' 1211 from the plurality of the schedules included in the schedule list.

Referring to FIG. 12B, if a display region of a participant 1212 in the first schedule 1201 is touched by a user, the mobile terminal 100 selects all schedules 1201, 1204 for which a participant matches the participant 1212 of the first schedule 1201 entirely or partially from the plurality of the schedules included in the schedule list.

It is understood that the common classification condition selection shown in FIG. 8C, the entire content display of the specific message shown in FIG. 8D or the keyword extension shown in FIG. 8E can be applied to an audio file list, a picture file list, a contact number list or a schedule list as well.

Referring again to FIG. 5, the mobile terminal 100 extracts the selected at least one data under the control of the controller 180 (S550). The mobile terminal 100 extracts the selected at least one data (S550) in response to receiving an input of an extraction command signal externally.

For example, the controller 180 detects at least a touch and drag action in one direction from one of the selected at least one or more data, a tapping action in one direction, and/or an incline action in one direction. Upon detecting one of the above actions, the controller 180 receives the input of the extraction command signal.

The mobile terminal 100 separately creates a data storage region including the at least one extracted data. Therefore, the mobile terminal 100 displays an extracted data list constructed with the at least one data included in the created data storage region or outputs the at least one data included in the created data storage region in response to receiving an input of a search signal from a user. For example, the data storage region can include a folder.

Subsequently, the mobile terminal 100 displays the extracted data list including the at least one extracted data via the display unit 151 under the control of the controller 180 (S560). Alternatively, displaying the extracted data list (S560) can include displaying the entire data list, the remaining data list including the rest of the data except the extracted at least one data, or the extracted data list including the extracted at least one data. Furthermore, while the entire data list or the remaining data list is displayed, the mobile terminal 100 displays the extracted data list according to a user selection.

In the following description, extracting the selected at least one data (S550) and displaying the extracted data list (S560) are explained in detail with reference to FIGS. 13A to 17C. FIGS. 13A to 13G are diagrams of screen configurations for extracting a specific message meeting a specific classification condition using a message list according to one embodiment of the present invention. In the following example, a received message list is taken as an example of a data list.

Figure 13A:
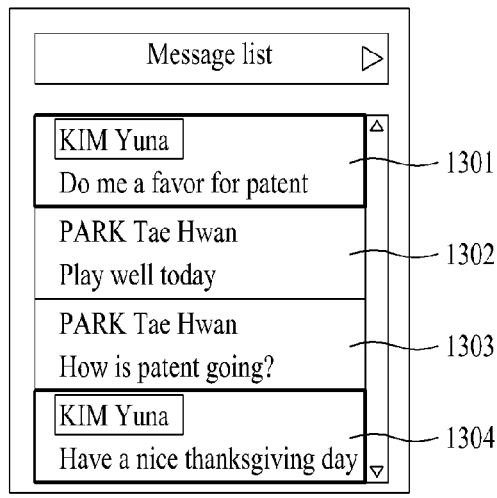
FIGS. 13A to 13G are diagrams of screen configurations for extracting a specific message meeting a specific classification condition using a message list according to an embodiment of the present invention.
Figure 13B:
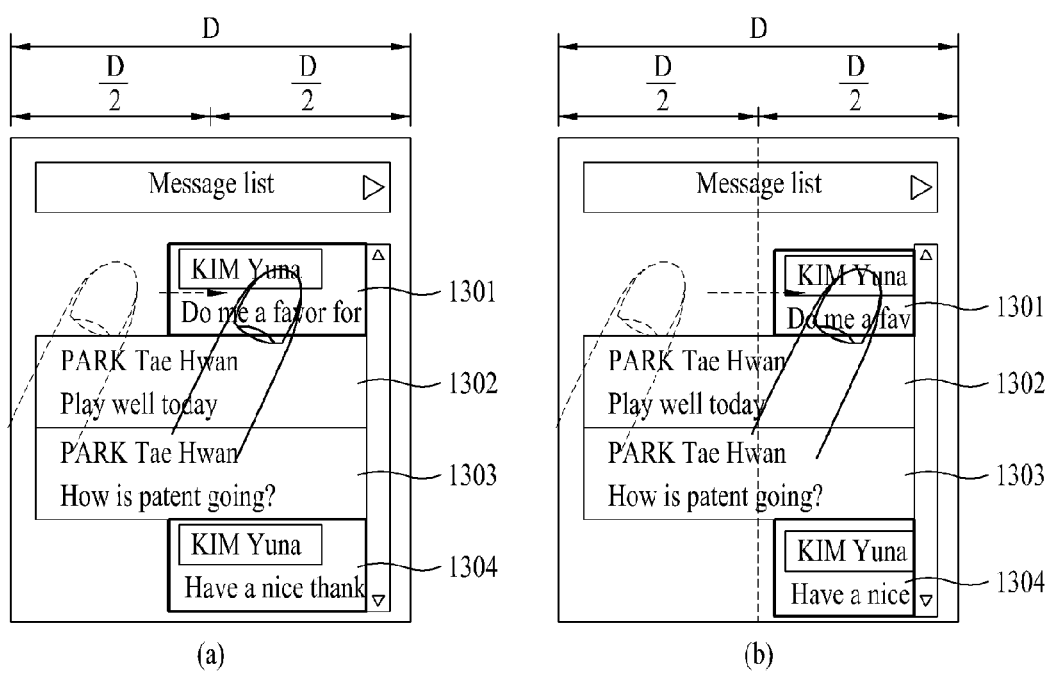

While the message(s) for which 'KIM Yuna' is the originator are selected from a plurality of the messages included in the received message list, as illustrated in FIG. 13A, the mobile terminal 100 receives an input of a touch and drag action in a first direction from a random point of a specific one 1301 of the selected message(s), as illustrated in FIG. 13B.

The mobile terminal 100 extracts the selected message(s) and shifts a position of the extracted message(s) in the first direction, as illustrated in FIG. 13B, in response to receiving an extraction command signal corresponding to the touch and drag action in the first direction.

Figure 13C:
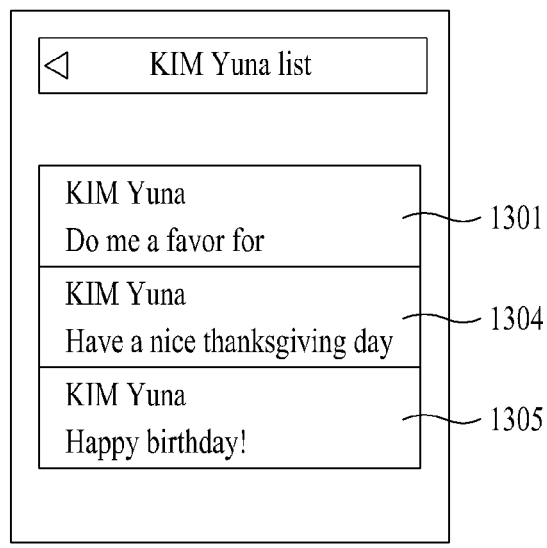

If the position of the extracted message(s) is shifted a predetermined distance (e.g., at least one half (D/2) of a horizontal length D of an entire display region) in the first direction, as illustrated in FIG. 13B (b), the mobile terminal 100 displays an extracted message list including the extracted messages 1301, 1304 and 1305 on the screen, as illustrated in FIG. 13C. The fifth message 1305 is included in the received message list but is not displayed on the screen displayed in FIG. 13A. As mentioned in the foregoing description, all data included in the data list are set as extraction target data even though they are not displayed on the screen.

Figure 13D:
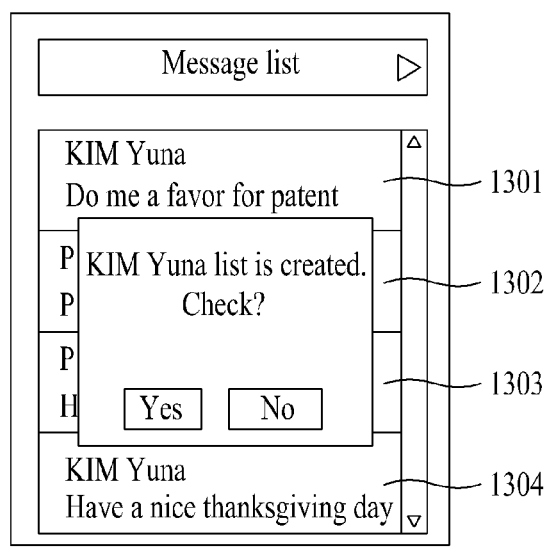

Alternatively, if the position of the extracted message(s) is shifted a predetermined distance or farther in the first direction, as illustrated in FIG. 13B (b), the mobile terminal 100 enables a user to select whether to check the extracted data list while the received message list is displayed, as illustrated in FIGS. 13A and 13D. If 'Yes' is selected by a user in FIG. 13D, the mobile terminal 100 displays the image shown in FIG. 13C.

Figure 13E:
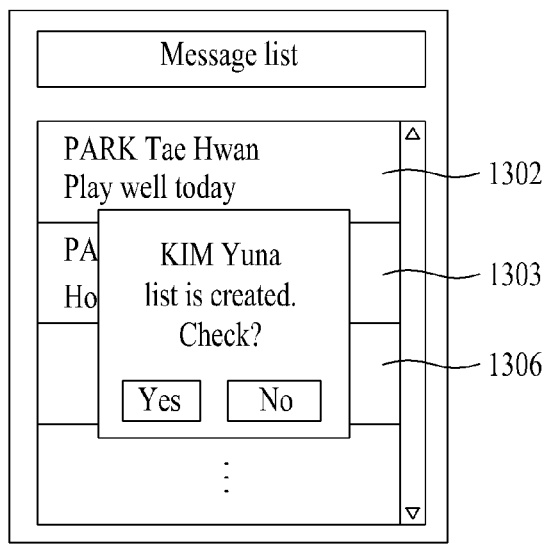

Alternatively, if the position of the extracted message(s) is shifted a predetermined distance or farther in the first direction, as illustrated in FIG. 13B (b), the mobile terminal 100 enables a user to select whether to check the extracted data list while the remaining message list including the rest of the messages except for the extracted message(s) is displayed, as illustrated in FIG. 13E. If 'Yes' is selected by a user in FIG. 13E, the mobile terminal 100 displays the image shown in FIG. 13C.

Figure 13F:
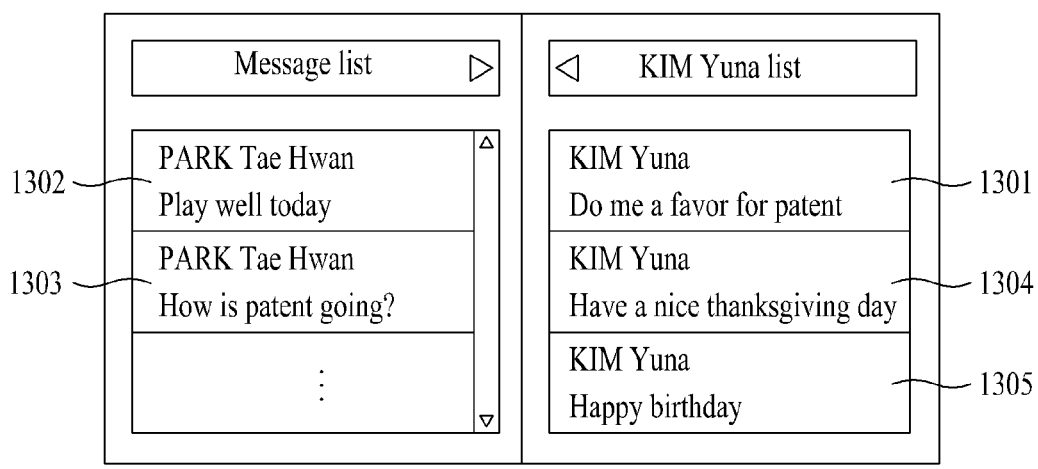

Alternatively, if the position of the extracted message(s) is shifted a predetermined distance or farther in the first direction, as illustrated in FIG. 13B (b), the mobile terminal 100 sets a horizontal view mode, divides the screen into a plurality of regions in a horizontal direction, and displays the remaining message list on the first region and the extracted message list on the second region, as illustrated in FIG. 13F.

Figure 13G:
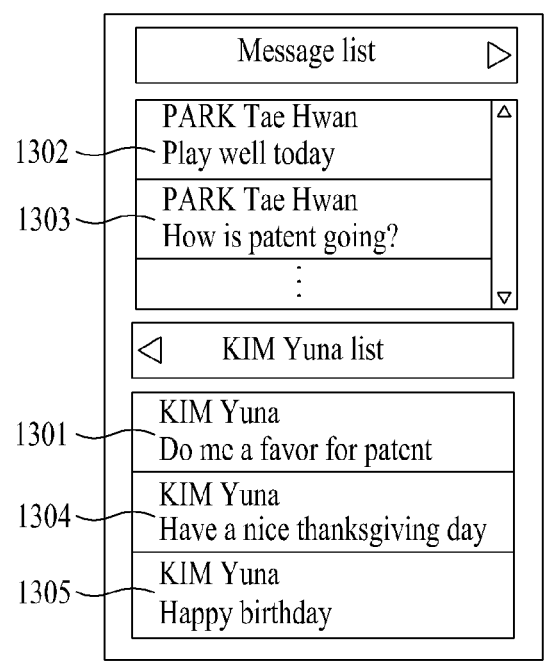

Alternatively, if the position of the extracted message(s) is shifted a predetermined distance or farther in the first direction, as illustrated in FIG. 13B (b), the mobile terminal 100 sets a vertical view mode, divides the screen into a plurality of regions in a vertical direction, and displays the remaining message list on the third region and the extracted message list on the fourth region, as illustrated in FIG. 13G.

The direction of the touch and drag action can include other directions other than the horizontal direction. It is not mandatory for the touch and drag action to be performed in the predetermined distance or farther. If the touch and drag action is completed, the above-described display operation is performed (not shown in the drawings).

The mobile terminal 100 is able to separately create an extracted message list by re-extracting data that meets a specific classification condition from the at least one or more data included in the extracted message list. For example, if a classification condition of the extracted message list is 'KIM Yuna', a message meeting a keyword 'patent' is re-extracted from the message(s) meeting the originator 'KIM Yuna' classification condition and a separately created extracted message list is then constructed with the message that meets both of the originator 'KIM Yuna' and the keyword 'patent' classification conditions.

Figure 14A:
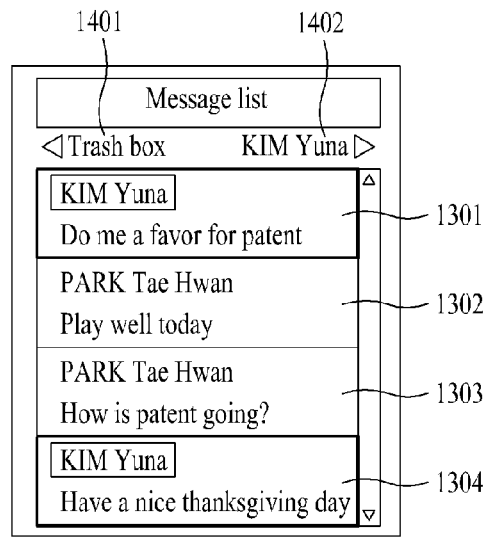
FIGS. 14A and 14B are diagrams of screen configurations for extracting a specific message using a data extraction guide according to the present invention.
Figure 14B:
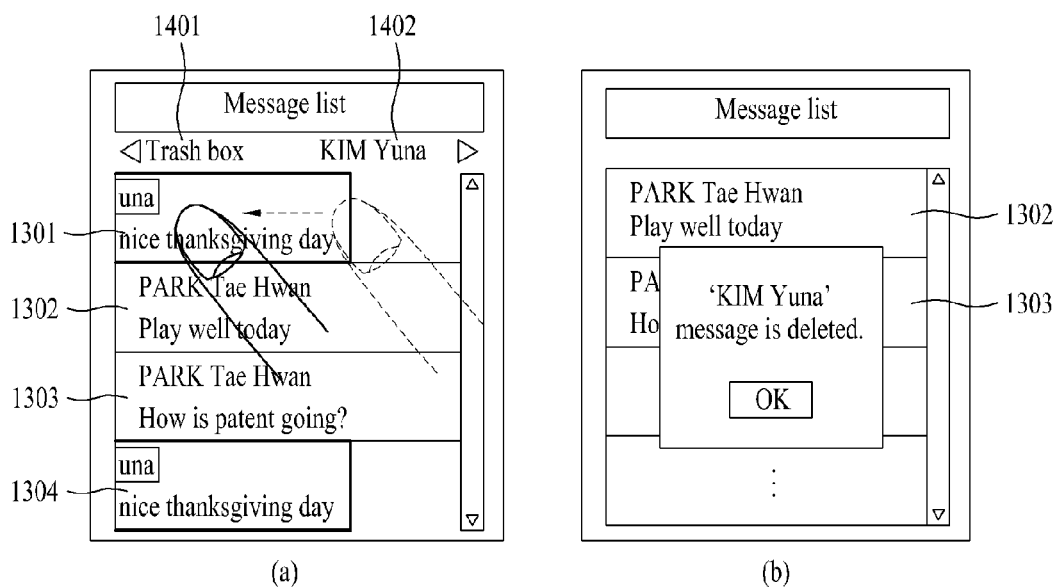

FIGS. 14A and 14B are diagrams of screen configurations for extracting a specific message using a data extraction guide according to one embodiment of the present invention. Referring to FIG. 14A, if messages including the originator 'KIM Yuna' as an example of a specific classification condition are selected, the mobile terminal 100 displays a first guide identifier 1401 and a second guide identifier 1402 to guide data extraction.

Referring to FIG. 14B, if an input of a touch and drag action in a left direction corresponding to the first guide identifier 1401 is received from a random point of a specific message 1301 among the selected messages, the mobile terminal 100 extracts the selected messages and shifts positions of the extracted messages in the left direction, as illustrated in FIG. 14B (a). If the touch and drag action is completed, the mobile terminal 100 outputs a text message indicating that the position-shifted messages are shifted to a trash box indicated by the first guide identifier 1401 and deleted, as illustrated in FIG. 14B (b).

Alternatively, if an input of a touch and drag action in a right direction corresponding to the second guide identifier 1402 is received from a random point of a specific message 1301 among the selected messages, the mobile terminal 100 extracts the selected messages and then shifts extracted messages in the right direction. If the touch and drag action is completed, the mobile terminal 100 stores the extracted messages in a storage region 'KIM Yuna' indicated by the second guide identifier 1402 (not shown in the drawings).

The guide identifiers can be arranged in a top-to-bottom direction or a diagonal direction, rather than the right-to-left direction. The user can select whether to display the guide identifiers (not shown in the drawings).

Figure 15A:
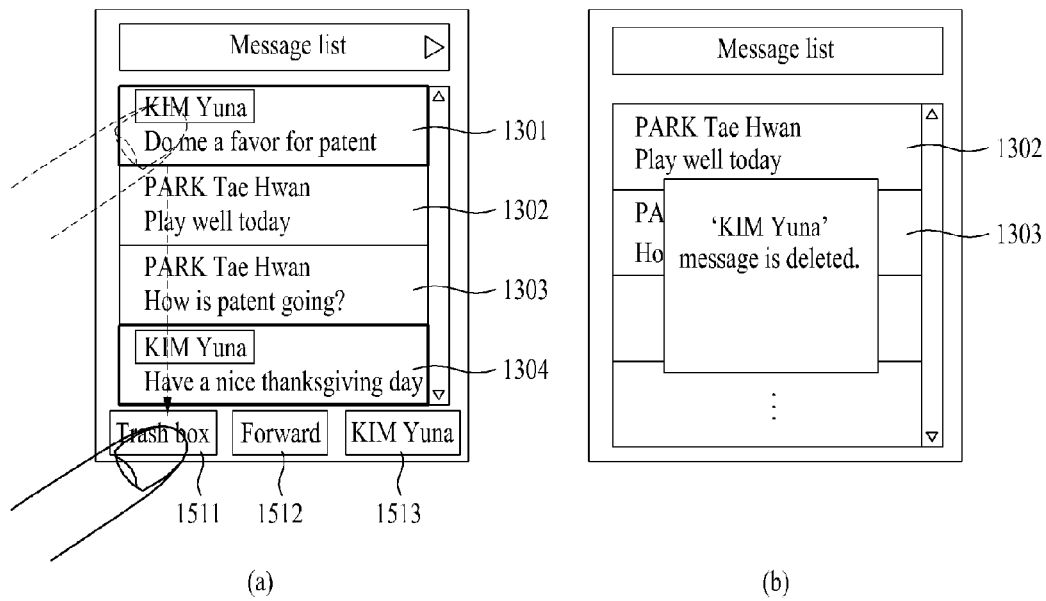
FIGS. 15A to 15C are diagrams of screen configurations for extracting a specific message using a data control icon according to an embodiment of the present invention.
Figure 15B:
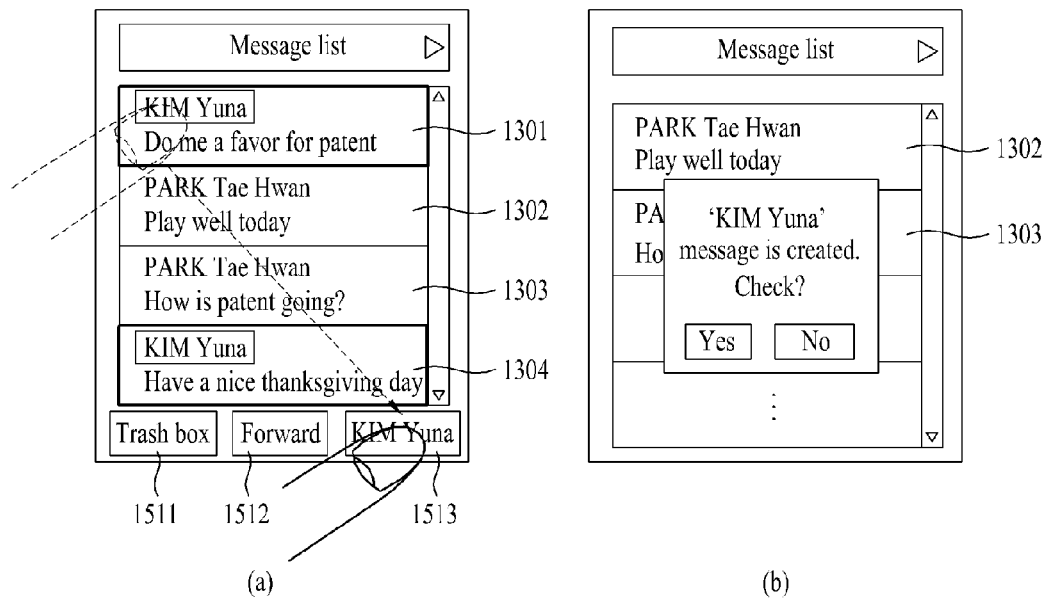
Figure 15C:
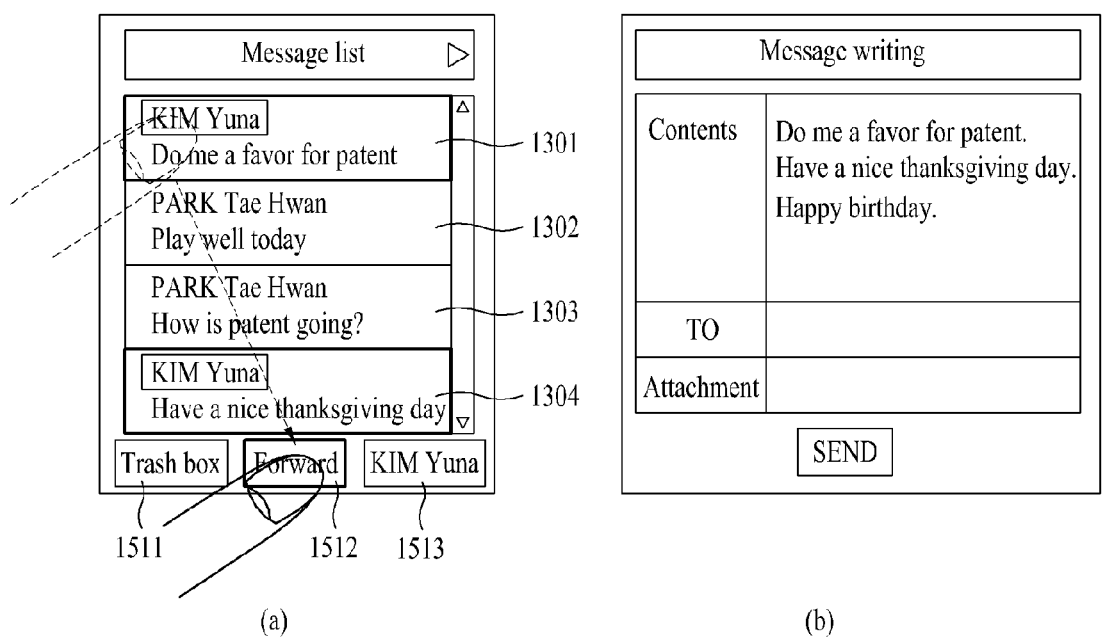

FIGS. 15A to 15C are diagrams of screen configurations for extracting a specific message using a data control icon according to one embodiment of the present invention. In the following example, a received message list is taken as an example of a data list with first to fourth messages 1301 to 1304 included in the received message list displayed on a screen.

For example, if messages including the originator 'KIM Yuna' are selected from the received message list, the mobile terminal 100 displays first to third data control icons 1511 to 1513 on one region of the screen, as illustrated in FIGS. 15A to 15C. In the following description, the first to third data control icons 1511 to 1513 are named a 'Trash box' icon, a 'Forward' icon and a 'KIM Yuna' icon, respectively.

Referring to FIG. 15A, if a touch and drag action to the 'Trash box' icon 1511 is received from a random point of the first message 1301 among the selected messages, as illustrated in FIG. 15A (a), the mobile terminal 100 extracts and shifts the selected messages to the trash box and indicates that the selected messages are deleted, as illustrated in FIG. 15A (b).

If a touch and drag action to the 'KIM Yuna' icon 1513 is received from a random point of the first message 1301 among the selected messages, as illustrated in FIG. 15B (a), the mobile terminal 100 creates a storage region 'KIM Yuna' by extracting the selected messages and displays a message list constructed with the extracted messages, as illustrated in FIG. 15B (b).

If a touch and drag action to the forward icon 1512 is received from a random point of the first message 1301 among the selected messages, as illustrated in FIG. 15C (a), the mobile terminal 100 extracts the selected messages and sets a writing state of a new message including content of each extracted message, as illustrated in FIG. 15C (b). Each of the extracted messages can be attached as an attachment file of the new message.

Alternatively, the data control icon is the icon indicating a control operation that can be performed on the data selected from the data list. The data control icon is not limited to the above described control operations (delete, deliver, shift to a storage region) and may include other various control operations.

Figure 16A:
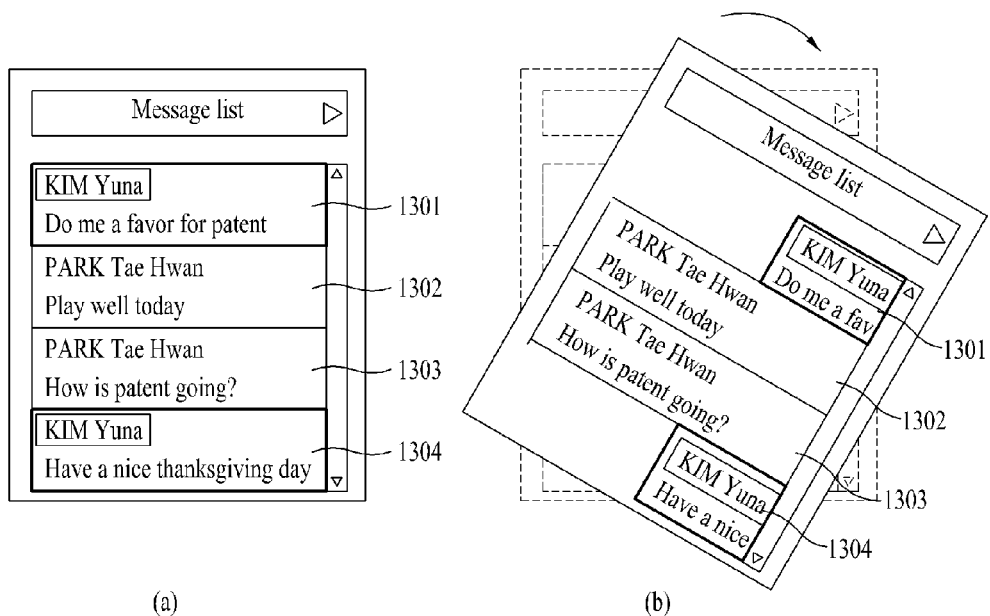
FIGS. 16A and 16B are diagrams for receiving an input of a specific message extracting command signal using a motion detection sensor according to an embodiment of the present invention.
Figure 16B:
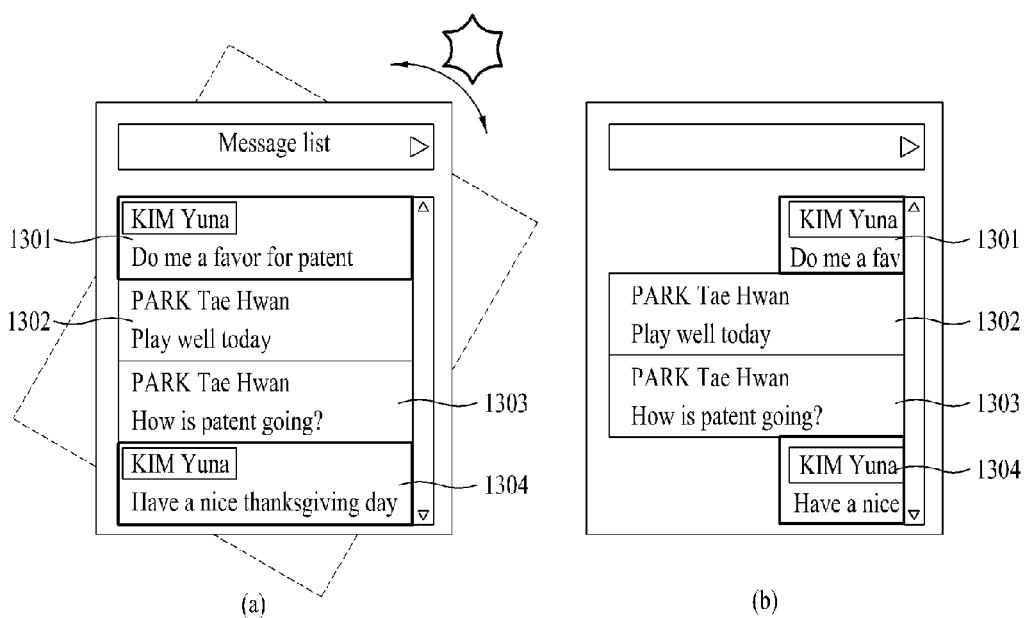

FIGS. 16A and 16B are diagrams for receiving an input of a specific message extracting command signal using a motion detection sensor 142 (FIG. 1) according to an embodiment of the present invention. In the following example, a received message list is taken as an example of a data list.

Referring to FIG. 16A, while messages including the originator 'KIM Yuna' are selected from the received message list, as illustrated in FIG. 16A (a), if the motion detection sensor 142 (FIG. 1) detects that the mobile terminal 100 is inclined in one direction, the mobile terminal 100 receives an input of an extraction command signal for the selected messages. When the extraction command signal is input, the mobile terminal 100 extracts the selected messages, shifts positions of the extracted messages in the inclined direction and adjusts shift distances of the extracted messages according to the degree of inclination.

Referring to FIG. 16B, while messages including the originator 'KIM Yuna' are selected from the received message list, as illustrated in FIG. 16B (a), if the motion detection sensor 142 (FIG. 1) detects a tapping action on the mobile terminal 100, the mobile terminal 100 receives an input of an extraction command signal for the selected messages. When the extraction command signal is input, the mobile terminal 100 extracts the selected messages and adjusts shift distances of the extracted messages according to a count or strength of the tapping action.

FIGS. 17A to 17C are diagrams of screen configurations for extracting a specific picture file meeting a specific classification condition using a picture file list according to one embodiment of the present invention. In the following example, a picture file list is taken as an example of a data list.

If a picture file list including a plurality of picture files is displayed as thumbnails, the mobile terminal 100 receives a touch and drag action in a first direction for the first picture file 1701 including one object (first object), as illustrated in FIG. 17A (a). The mobile terminal 100 selects and extracts picture files including the first object included in the first picture file 1701 and shifts positions of the extracted picture files in the first direction to correspond to the input touch and drag action in the first direction.

When the touch and drag action is completed, the mobile terminal 100 displays an extracted picture file list constructed with the position shifted picture files, as illustrated in FIG. 17A (b). The extracted picture files may not be included in the picture file list shown in FIG. 17A.

If the picture file list including a plurality of the picture files is displayed as thumbnails, the mobile terminal 100 receives an input of a touch and drag action in the first direction for a fourth picture file 1704 including a plurality of objects (second and third objects), as illustrated in FIG. 17B (a). The mobile terminal 100 selects and extracts the picture files including the second or third object included in the fourth picture file 1704 and shifts positions of the extracted picture files in the first direction to correspond to the input touch and drag action in the first direction.

When the touch and drag action is completed, the mobile terminal 100 displays an extracted picture file list constructed with the position shifted picture files (the second or third object included), as illustrated in FIG. 17B (b). The extracted picture files may not be included in the picture file list shown in FIG. 17A.

While a specific picture is displayed, if an input of a touch and drag action in the first direction for a specific object included in the specific picture is received, as illustrated in FIG. 17C (a), the mobile terminal 100 extracts picture files including the specific object and displays an extracted picture file list constructed with the extracted picture files, as illustrated in FIG. 17C (b).

According to the present invention, if data meeting a specific classification condition is selected from a plurality of data included in a data list, the mobile terminal 100 receives an input of a command signal for deleting the rest of the data except the selected data and deletes the rest of the data from the data list under the control of the controller 180.

In the following description, a process for receiving an input of a command signal for deleting data failing to meet a specific classification condition is explained with reference to FIGS. 18A to 18C. In the following example, a received message list is taken as an example of a data list. FIGS. 18A to 18C are diagrams for receiving an input of a command signal for deleting data failing to meet a specific classification condition according to one embodiment of the present invention.

While a received message list including a plurality of messages is displayed, if an input of a touch and drag action for a display region of an originator 'KIM Yuna' is received, the mobile terminal 100 selects the messages 1801, 1804 that include the originator 'KIM Yuna', as illustrated in FIG. 18A (a). Subsequently, if an input of a command action for holding the selected messages 1801, 1804 from a user is received, the mobile terminal 100 holds the selected messages 1801, 1804.

If the motion detection sensor 142 (FIG. 1) of the mobile terminal 100 detects an inclination of the mobile terminal 100, the mobile terminal 100 shifts positions of the rest of the messages except the held messages 1801, 1804 among a plurality of the messages in the inclined direction, as illustrated in FIG. 18A (b). The mobile terminal 100 displays a message list constructed with the held messages 1801 and 1804 only and deletes the position shifted remaining messages or stores the position shifted remaining messages in a separate storage region.

Referring to FIG. 18B, if an input of a command action for holding the selected messages 1801, 1804 is received, the mobile terminal 100 holds the selected messages 1801, 1804. If a wind is detected using a wind detecting sensor, such as the microphone 122, the mobile terminal 100 displays the rest of the messages except the held messages 1801 and 1804 among a plurality of the messages in a flying form, as illustrated in FIG. 18B (b). The wind may be produced by a user blowing into the microphone 122. The mobile terminal 100 displays a message list constructed with the held messages 1801, 1804 only and deletes the remaining messages displayed in the flying form or stores the remaining messages displayed in the flying form in a separate storage region.

Referring to FIG. 18C, if the messages 1801 and 1804 including the originator 'KIM Yuna' are selected from a plurality of the messages included in the received message list, the mobile terminal 100 moves the remaining unselected messages among a plurality of the messages backward so as to be depicted behind the selected messages 1801, 1804. Furthermore, if the touch of the remaining unselected messages continues, they are depicted to be moved further behind the selected messages 1801, 1804. If the remaining unselected messages are touched for more than a predetermined amount of time, the mobile terminal 100 displays a message list constructed with only the selected messages 1801, 1804.

According to one embodiment of the present invention, under the control of the controller 180, the mobile terminal 100 performs a control operation of data extracted according to a specific classification condition. This is explained in detail with reference to FIGS. 19A to 19D. In the following example, an extracted data list is an extracted message list.

Figure 19A:
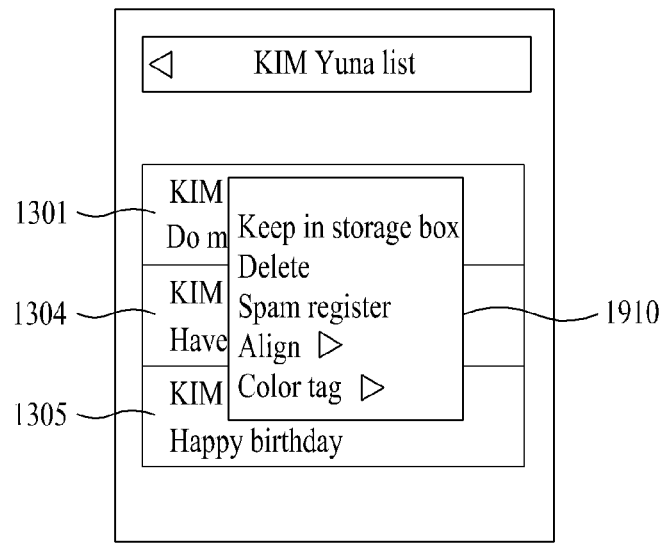
FIGS. 19A to 19D are diagrams for performing a control operation for data extracted by meeting a specific classification condition according to an embodiment of the present invention.
Figure 19B:
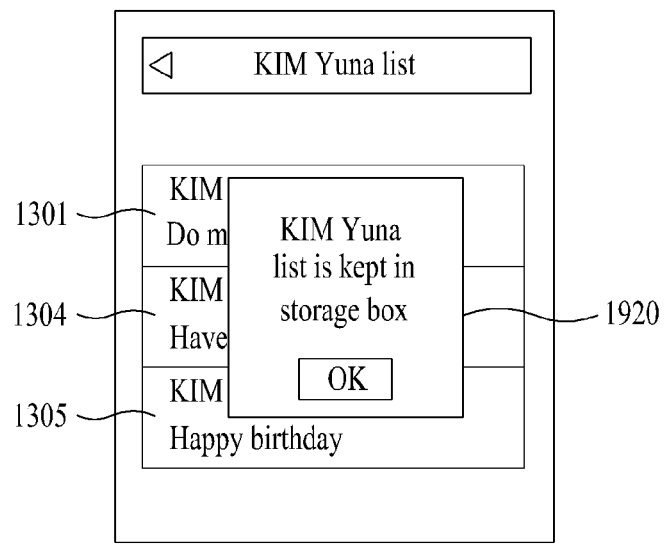

If an extracted message list is displayed, the mobile terminal 100 displays a control operation list 1910 that is executable on the messages configuring the extracted message list, as illustrated in FIG. 19A. Referring to FIG. 19B, if a 'Keep in storage box' icon is selected from the control operation list 1910 of FIG. 19A, the mobile terminal 100 stores the extracted message list and the messages configuring the extracted message list in the storage box.

Figure 19C:
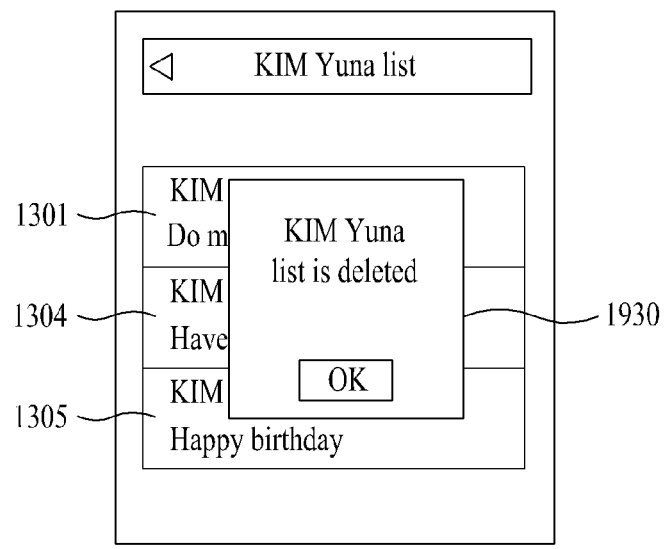

Referring to FIG. 19C, if 'Delete' is selected from the control operation list 1910 of FIG. 19A, the mobile terminal 100 deletes the messages configuring the extracted message list.

Figure 19D:
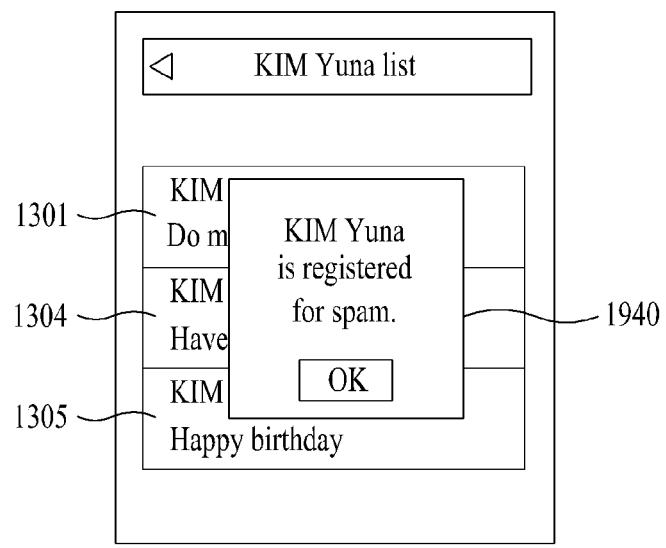

Referring to FIG. 19D, if 'Spam register' is selected from the control operation list 1910 of FIG. 19A, the mobile terminal 100 registers the message list for the originator 'KIM Yuna', which is the classification condition of the extracted message list, as spam.

In the following description, a method of displaying a 3D image in a mobile terminal and a display unit for the same, to which embodiments of the present invention are applicable, are explained.

First of all, 3D images implemented on the display unit 151 of the mobile terminal 100 can be mainly classified into two kinds of categories. In this case, the reference for this classification is attributed to whether different images are provided to both eyes, respectively.

The first 3D image category is described as follows.

First of all, the first category is a monoscopic type, which provides the same image to both eyes, and is advantageous in that it can be implemented with a general display unit. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151.

Secondly, the second category is a stereoscopic type, which provides different images to both eyes, respectively, and uses the principle that a user can sense a 3D effect in looking at an object with eyes of his own. In particular, human eyes are configured to see different 2D images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the 3D effect despite that there is an individual difference of the binocular disparity more or less. Therefore, the binocular disparity becomes the most important factor of the second category. The binocular disparity is explained in detail with reference to FIG. 20 as follows.

Figure 20:
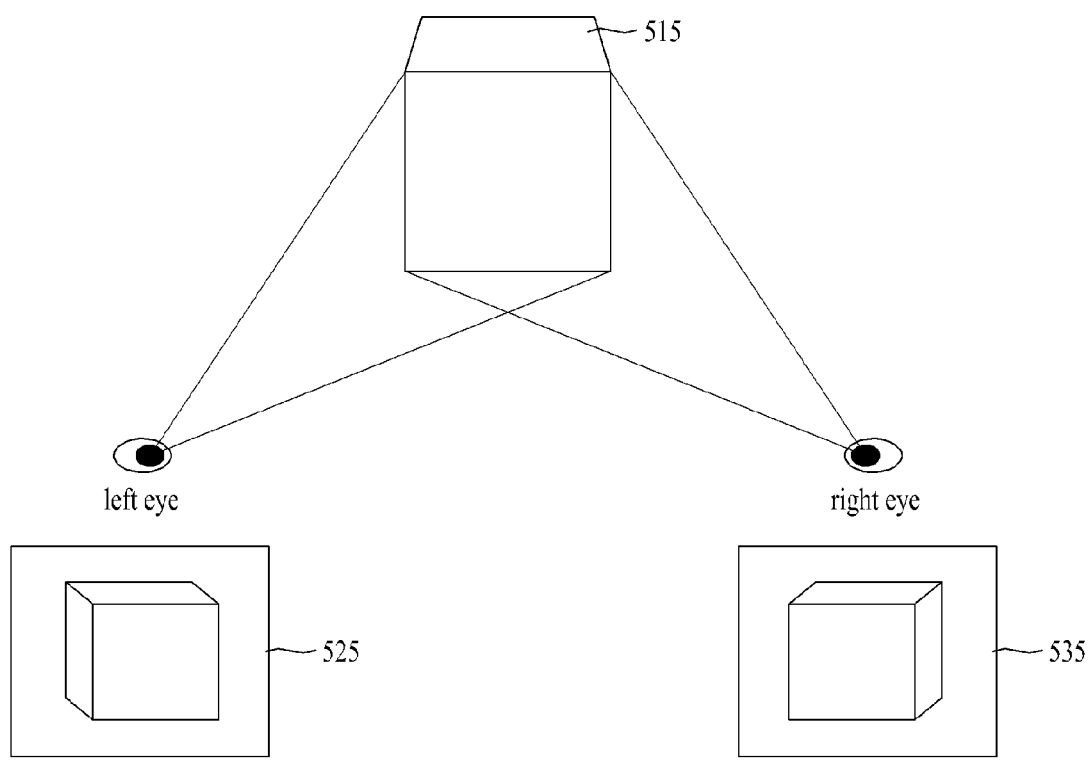
FIG. 20 is a diagram for the concept to describe the principle of binocular disparity.

FIG. 20 is a diagram for explaining the principle of binocular disparity.

Referring to FIG. 20, assume a situation that a hexahedron 515 is positioned as a subject in front below an eye's height to be seen through human eyes. In this case, a left eye is able to see a left eye 2D image 525 revealing three facets including a top side, a front side and a left lateral side of the hexahedron 515 only. And, a right eye is able to see a right eye 2D image 535 revealing three facets including the top side, the front side and a right lateral side of the hexahedron 515 only.

Even if a real thing is not actually positioned in front of both eyes of a user, if the left eye 2D image 525 and the right eye 2D image 535 are set to arrive at the left eye and the right eye, respectively, a user is able to substantially sense the hexahedron 515 as if looking at the hexahedron 31 actually.

Thus, in order to implement the 3D image belonging to the second category in the mobile terminal 100, images of the same object should arrive at both eyes in a manner of being discriminated from each other for the left and right eye images of the same object.

In order to discriminate the above-mentioned two categories from each other in this disclosure, a 3D image belonging to the first category shall be named 'monoscopic 3D image' and a 3D image belonging to the second category shall be named 'stereoscopic 3D image'.

A method of implementing a stereoscopic 3D image is described as follows.

First of all, as mentioned in the following description, in order to implement a stereoscopic 3D image, an image for a right eye and an image for a left eye need to arrive at both eyes in a manner of being discriminated from each other. This mechanism may be implemented by one of a parallax barrier scheme, a lenticular lens scheme, a polarizing glasses scheme, an active shutter scheme and the like, which are described in detail as follows.

The parallax barrier scheme enables different images arrive at both eyes in a manner of controlling a propagating direction of light by electronically driving a cutoff device provided between a general display and both eyes.

A structure of a parallax barrier type display unit 151 for displaying a stereoscopic 3D image can be configured in a manner that a general display device is combined with a switch LC (liquid crystals). A propagating direction of light is controlled by activating an optical parallax barrier using the switch LC, whereby the light is separated into two different lights to arrive at left and right eyes, respectively. Thus, when an image generated from combining an image for the right eye and an image for the left eye together is displayed on the display device, a user sees the images corresponding to the eyes, respectively, thereby feeling the 3D or stereoscopic effect.

Alternatively, the parallax barrier is electrically controlled to enable entire light to be transmitted therethrough, whereby the light separation due to the parallax barrier is avoided. Therefore, the same image can be seen through left and right eyes. In this case, the same function of a conventional display unit is available.

Meanwhile, a parallax barrier normally performs parallel translation in one axial direction to provide a stereoscopic 3D image. Yet, it may be able to use a parallax barrier that enables parallel translation in at least two axial directions according to a control signal from the controller 180.

The lenticular lens scheme relates to a method of using a lenticular screen provided between a display and both eyes. In particular, a propagating direction of light is refracted via lens on the lenticular screen, whereby different images arrive at both eyes, respectively.

According to the polarizing glasses scheme, polarizing directions are set different from each other to provide different images to both eyes, respectively, using a pair of polarizing glasses.

The active shutter scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

In the following description, embodiments of a controlling method implemented in the above-configured mobile terminal are explained with reference to the accompanying drawings.

In case that the display module 151 includes a touchscreen, implementation of the following embodiments may be further facilitated. Therefore, the following description is made on the assumption that the display module 151 includes a touchscreen. And, a reference number of a display screen of the touchscreen 151 shall be set to 400.

The touchscreen may be able to operate in '3D mode' or '2D mode'. While the touchscreen is operating in 3D mode only, a 3D produced image can be displayed in 3D. While the touchscreen is operating in 2D, a 3D produced image is displayable in 2D.

Figure 21:
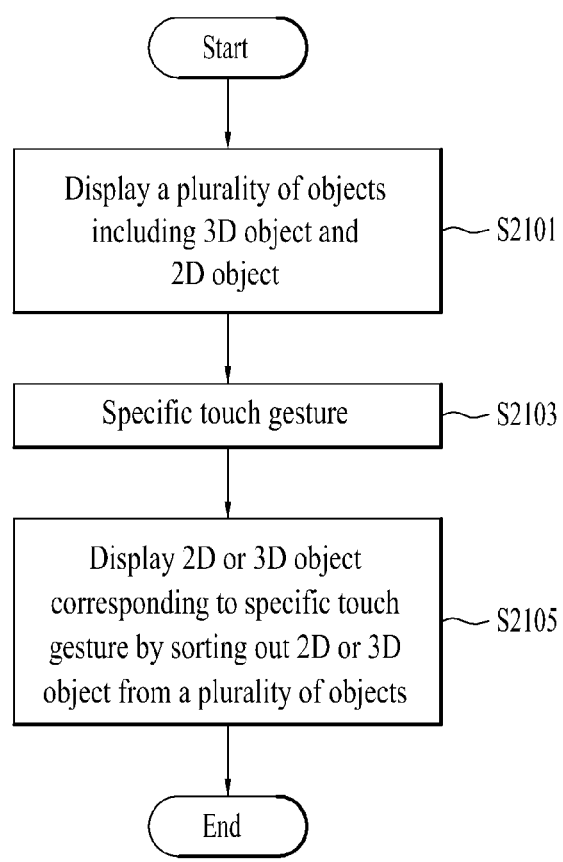
FIG. 21 is a flowchart of a method for controlling a mobile terminal according to an embodiment of the present invention.
Figure 22:
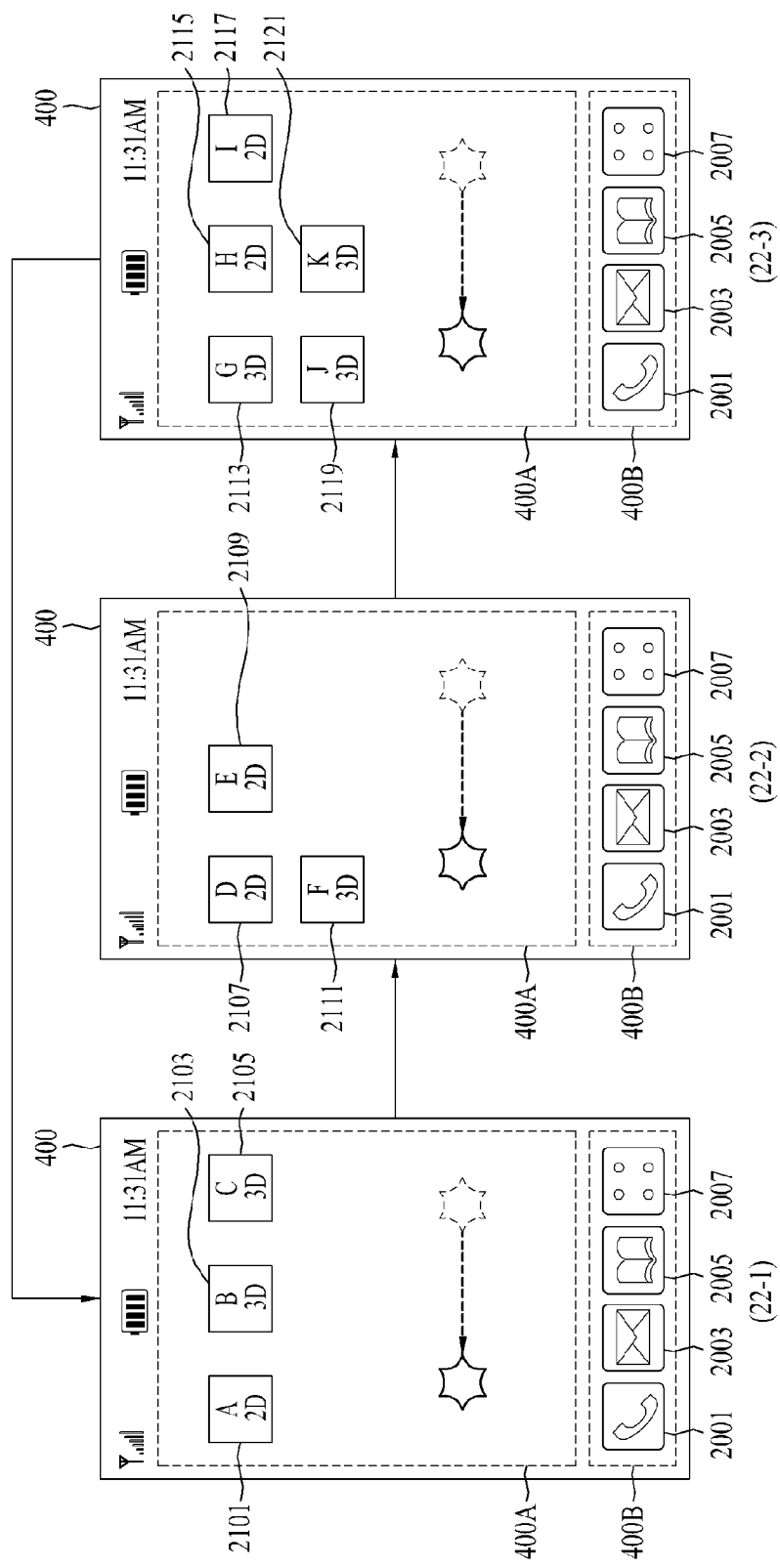
FIGS. 22 to 27 are diagrams of display screen configurations of implementing a method for controlling a mobile terminal according to an embodiment of the present invention.
Figure 23:
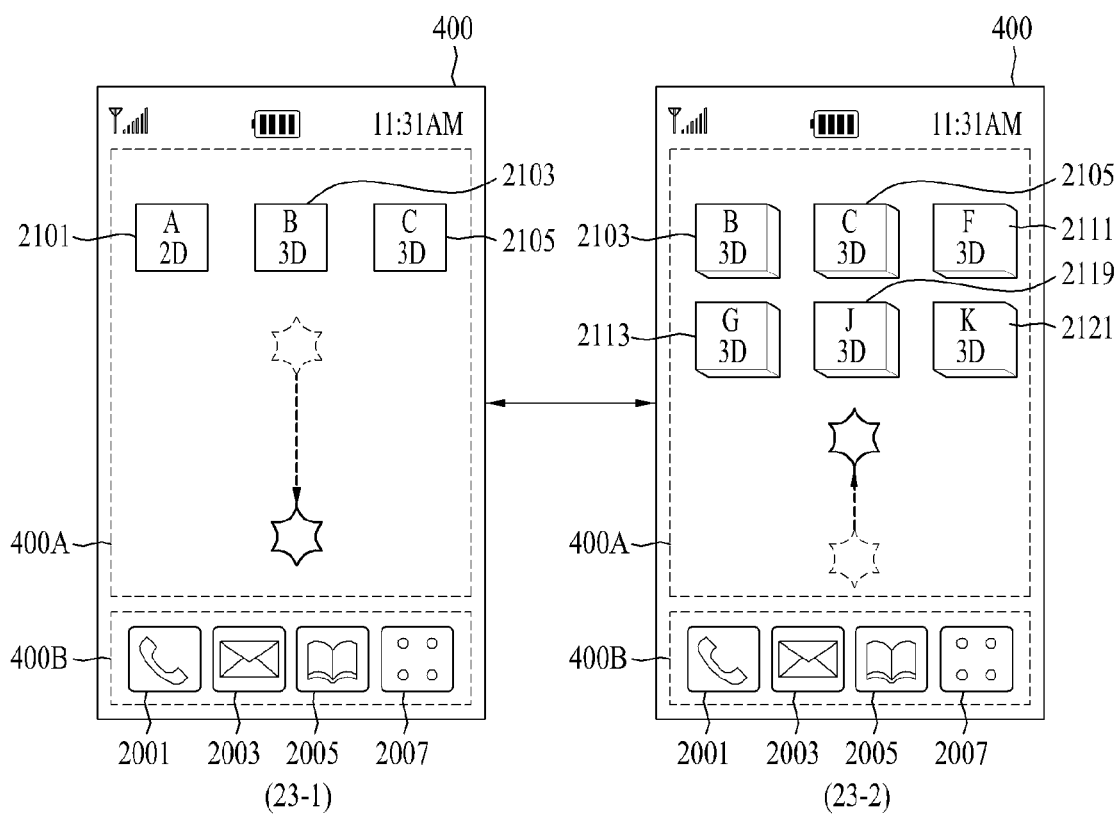
Figure 24:
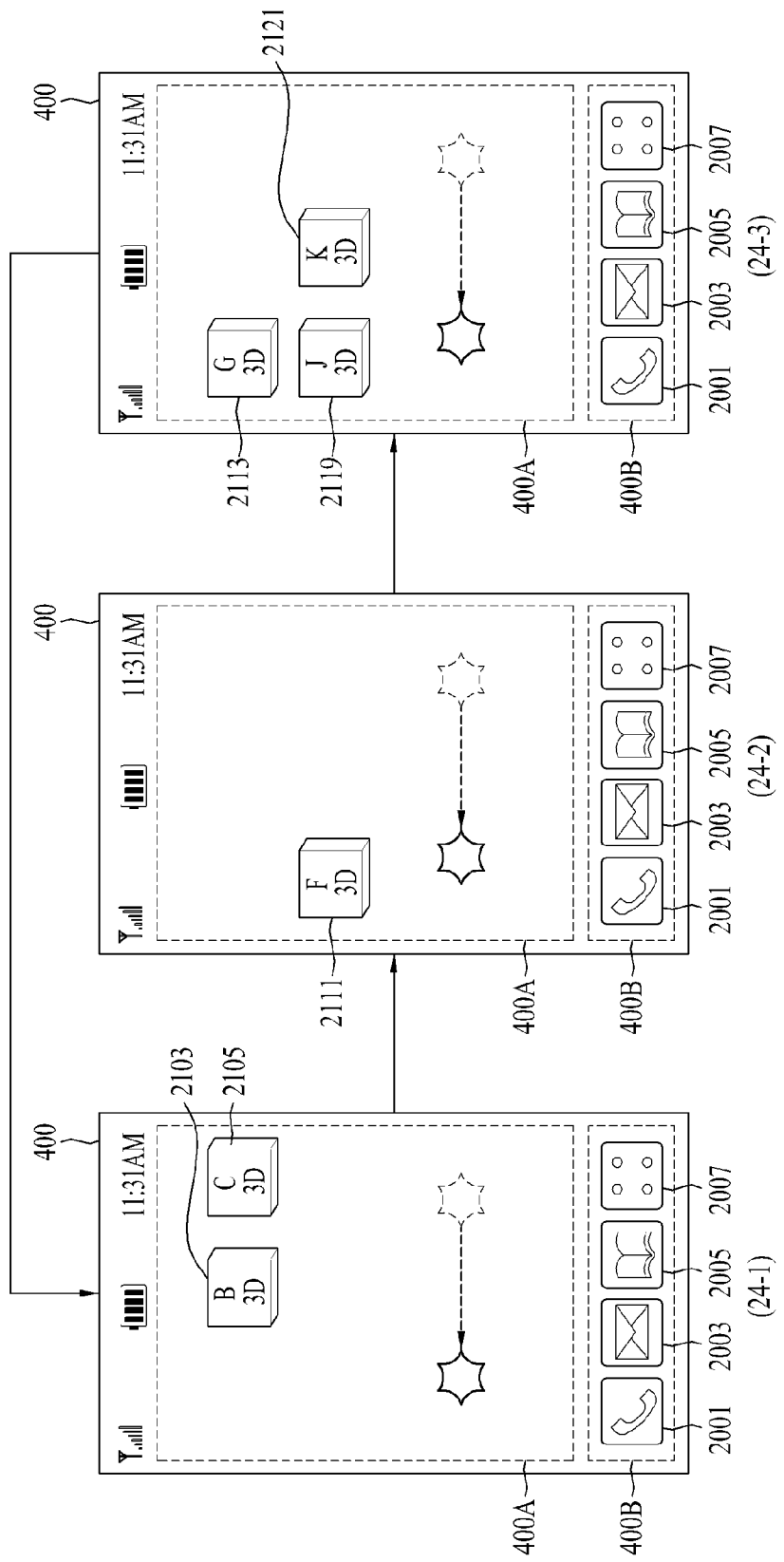

FIG. 21 is a flowchart of a method for controlling a mobile terminal according to an embodiment of the present invention. FIGS. 22 to 24 are diagrams of display screen configurations of implementing a method for controlling a mobile terminal according to an embodiment of the present invention.

Referring to FIG. 22 (22-1), one of at least two home screens previously prepared in the mobile terminal 100 may be displayed on a $1^{st}$ region 400A of the touchscreen 400 [S2101]. And, an icon tray may be displayed on a $2^{nd}$ region 400B of the touchscreen 400 to gather and arrange at least one or more icons frequently used by a user. In particular, FIG. 22 (22-1) shows one example that a phone call icon 2001, an address book icon 2003, a message icon 2005 and a menu icon 2007 are arranged on the icon tray.

In the following description, the home screen is further explained.

First of all, the home screen may be generally defined as a screen that is displayed on the touchscreen in the first place when a locked state of the touchscreen is cancelled. On the home screen, at least one icon or widget for activating an application or an internal function may be displayed. At least one or more home screens may be displayable on the touchscreen. In this case, if a prescribed touch gesture is performed on the touchscreen, the at least two or more home screens can be displayed on the touchscreen in order. And, the home screens may differ from each other in icons or widgets displayed thereon. In the present specification, 'touch gesture' may conceptionally include at least one of a simple touch to the touchscreen, a double-touch to the touchscreen, a long touch to the touchscreen, a multi-touch to the touchscreen, a touch & drag onto the touchscreen, a touch flicking on the touchscreen and the like.

For clarity of the following description, assume that 3 home screens (e.g., $1^{st}$ to $3^{rd}$ home screens) are prepared in advance and that the $1^{st}$ home screen among the $1^{st}$ to $3^{rd}$ home screens is displayed in FIG. 22 (22-1).

Each time a touch & drag is performed on the touchscreen 400 in left direction for example, referring to FIGS. 22 (22-1) to 22 (22-3), the controller 180 may control the home screens to be sequentially displayed on the touchscreen 400 in order of the $1^{st}$ home screen [FIG. 22 (22-1)]→the $2^{nd}$ home screen [FIG. 22 (22-2)]→the $3^{rd}$ home screen [FIG. 22 (22-3)]→ . . . . Moreover, each time a touch & drag is performed on the touchscreen 400 in right direction, the controller 180 may control the home screens to be sequentially displayed on the touchscreen 400 in order of the $1^{st}$ home screen [FIG. 22 (22-1)] the 3$^{rd}$ home screen [FIG. 22 (22-3)]→ the 2$^{nd}$ home screen [FIG. 22 (22-2)]→the 1$^{st}$ home screen [FIG. 22 (2-1)]→ . . . [not shown in the drawing].

As mentioned in the foregoing description, at least one icon or widget may be displayed on each of the home screens. In particular, the icon may include an application icon to activate a corresponding application in case of being touched. The widget may include an application widget to activate a partially restricted function of a corresponding application on the corresponding home screen all the time. Each of the icon and the widget may be commonly called 'object'.

Objects displayable on the touchscreen may be classified in accordance with various classification criteria. For instance, the objects may be classified as 3D objects or 2D objects depending on whether to have 3D attribute or 2D attribute. Alternatively, the objects may be classified as news objects, game objects, education objects and the like in accordance with a category (e.g., news, game, education, etc.) of a corresponding application.

For clarity of the following description, assume that the objects are classified as 3D objects (indicated as 3D in the drawing) or 2D objects (indicated as 2D in the drawing). That is, assume that the objects may include at least one 3D object and at least one 2D object. Yet, it should be noted that the present embodiment may be performed on objects differently classified in accordance with different classification criteria.

Meanwhile, when the 3D object and the 2D object are displayed together on the touchscreen 400, the controller 180 controls the touchscreen 400 to operate in 2D mode, thereby controlling the 3D object and the 2D object to be displayed in 2D, as shown in FIGS. 22 (22-1) to 22 (2-3).

Referring to FIG. 23 (23-1), when one home screen is displayed on the touchscreen 400, a specific touch gesture (e.g., a touch & drag in bottom direction) [S2103]. FIG. 23 (23-1) shows that the touch & drag in the bottom direction is performed when the 1$^{st}$ home screen is displayed, by which the present embodiment may be non-limited. The touch & drag may be performed in the bottom direction when the 2$^{nd}$ or 3$^{rd}$ home screen is displayed.

In response to the touch & drag in the bottom direction, the controller 180 may control 3D objects 2103, 2105, 2111, 2113, 2119 and 2121 to be displayed on the touchscreen 400 together by being sorted out from the objects within the 1$^{st}$ to 3$^{rd}$ home screens in a manner of switching the home screen to the screen shown in FIG. 23 (23-2) [S2105].

In response to the touch & drag in the bottom direction, the controller 180 may control the touchscreen to switch to a 3D mode from a 2D mode and may also control the sorted 3D objects to be displayed in 3D on the touchscreen 400.

If the number of the sorted objects is too big to have the sorted objects displayed within one screen, the sorted objects may be divided to be displayed on at least two screens [not shown in the drawing]. Each time the aforementioned touch & drag in the left or right direction is performed, the at least two screens can be sequentially displayed.

Meanwhile, referring to FIG. 23 (23-2), when the 3D objects are sorted and displayed, the icon tray is displayed in 2D, by which the present embodiment may be non-limited. Alternatively, when the 3D objects are sorted and displayed, the icon tray may be displayed in 3D or may not be displayed.

Meanwhile, when the 3D objects are sorted and displayed, a touch & drag may be performed in top direction on the touchscreen.

In response to the touch & drag in the top direction, the controller 180 may control the home screen, which was displayed before the touch & drag in the bottom direction is performed, i.e., the 1$^{st}$ home screen to be displayed again on the touchscreen.

In doing so, the controller 180 controls all the objects within the 1$^{st}$ home screen to be displayed in 2D in a manner of controlling the touchscreen to enter the 2D mode from the 3D mode.

In the above description, the 3D objects within the 1$^{st}$ to 3$^{rd}$ home screens are sorted and displayed together, by which the present embodiment may be non-limited. The following description is further made with reference to FIG. 24.

As mentioned in the foregoing description, when one home screen (e.g., the 1$^{st}$ home screen) is displayed on the touchscreen 400, a touch & drag may be performed in a bottom direction.

In response to the touch & drag in the bottom direction, the controller 180 controls 2D objects 2101, 2017, 2109, 2115 and 2117 to disappear among the objects of the 1$^{st}$ to 3$^{rd}$ home screens and controls 3D objects 2103, 2105, 2111, 2113, 2119 and 2121 to remain within the 1$^{st}$ to 3$^{rd}$ home screens (i.e., the corresponding home screens) by being sorted out.

Thus, referring to FIG. 24 (24-1), the controller 180 may control the corresponding 2D object 2101 to disappear from the 1$^{st}$ home screen, on which the touch & drag in the bottom direction has been performed, and control the corresponding 3D objects 2103 and 2105 to be displayed on the 1$^{st}$ home screen only.

Each time a touch & drag in a left direction is performed on the touchscreen 400, referring to FIG. 24 (24-2) and FIG. 24 (24-3), the controller 180 may control the 2$^{nd}$ home screen and the 3$^{rd}$ home screen to be sequentially displayed, control the corresponding 2D object(s) to disappear from each of the home screens, and control the corresponding 3D object(s) to be displayed on each of the home screens.

When the 3D objects are displayed on the 1$^{st}$ to 3$^{rd}$ home screens by being sorted and remaining on the corresponding home screens, as mentioned in the foregoing description, the controller 180 controls the touchscreen to operate in the 3D mode to enable the sorted and remaining 3D objects to be displayed in 3D.

Referring to FIGS. 24 (24-1) to 24 (24-3), when the 3D objects are sorted and displayed, the icon tray is displayed in 2D, by which the present embodiment may be non-limited. Alternatively, the icon tray may be displayed in 3D or may not be displayed at all.

Meanwhile, when the corresponding 3D object 2111 of the 2$^{nd}$ home screen is sorted and displayed on the touchscreen, another specific gesture (e.g., a touch & drag performed in top direction on the touchscreen) may be performed on the touchscreen.

In response to the touch & drag in the top direction, the controller 180 may control the 2D objects to be reconstructed on the 1$^{st}$ to 3$^{rd}$ home screens and control the corresponding 2D objects 2017 and 2109 to be displayed again on the 2$^{nd}$ home screen. In doing so, as mentioned in the foregoing description, the controller 180 may control the objects within the 2$^{nd}$ home screen to be displayed in 2D by switching the touchscreen to the 2D mode from the 3D mode.

According to the above description, when a touch & drag in a bottom direction is performed on the touchscreen, 3D objects within the 1$^{st}$ to 3$^{rd}$ home screens are sorted out. If another touch & drag is performed in direction (e.g., a top direction) opposite to that of the former touch & drag, the 3D objects within the 1$^{st}$ to 3$^{rd}$ home screens are released from the sorting so that the 2D objects and the 3D objects are displayed together on the 1$^{st}$ to 3$^{rd}$ home screens. Yet, the present embodiment may be non-limited by this description.

For instance, when a prescribed 3D object within the touchscreen is touched and dragged (or flicked) in a bottom direction, 3D objects within the $1^{st}$ to $3^{rd}$ home screens are sorted and displayed only. If the sorted prescribed 3D object is touched and dragged in a direction (e.g., a top direction) opposite to that of the former touch & drag, the 3D objects within the $1^{st}$ to $3^{rd}$ home screens are released from the sorting so that the 2D objects and the 3D objects are displayed together on the $1^{st}$ to $3^{rd}$ home screens.

For another instance, when a prescribed 3D object within the touchscreen is touched and dragged (or flicked) in a bottom direction, 3D objects within the $1^{st}$ to $3^{rd}$ home screens are sorted out and disappear only and the 2D objects may remain and be displayed only.

According to the above description, the 3D object(s) may be sorted out from the objects within the $1^{st}$ to $3^{rd}$ home screens only. In the following description, a method of sorting the 2D object(s) among the objects within the $1^{st}$ to $3^{rd}$ home screens is explained in detail with reference to FIG. 25 and FIG. 26.

Figure 25:
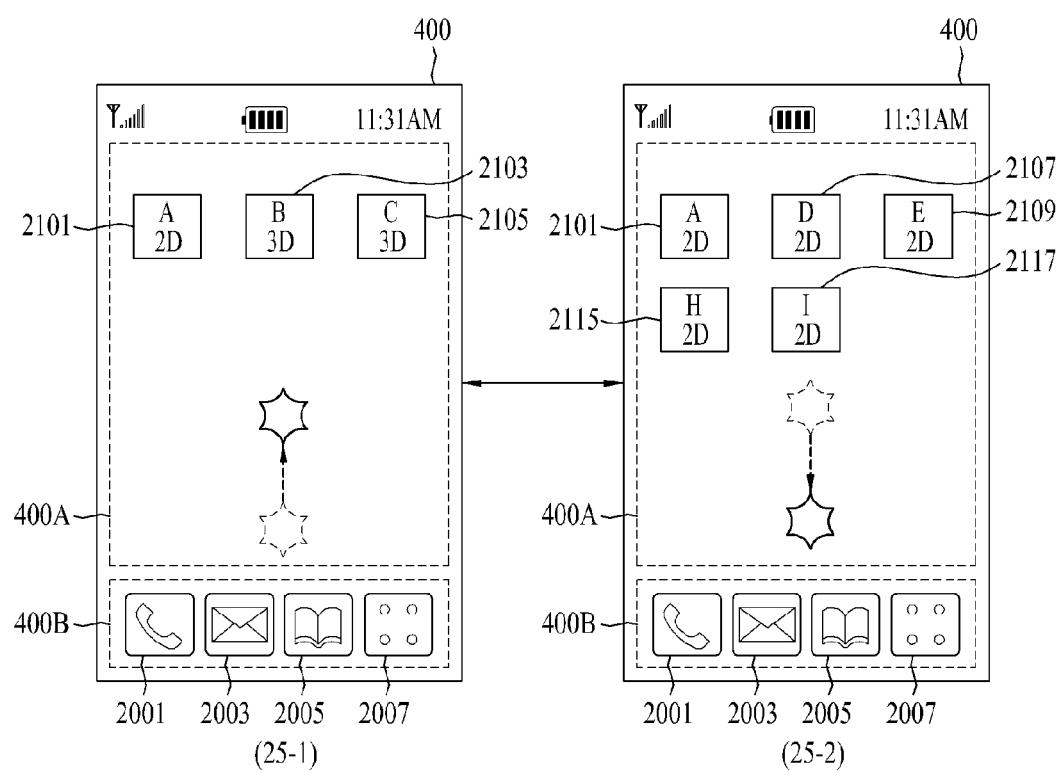
Figure 26:
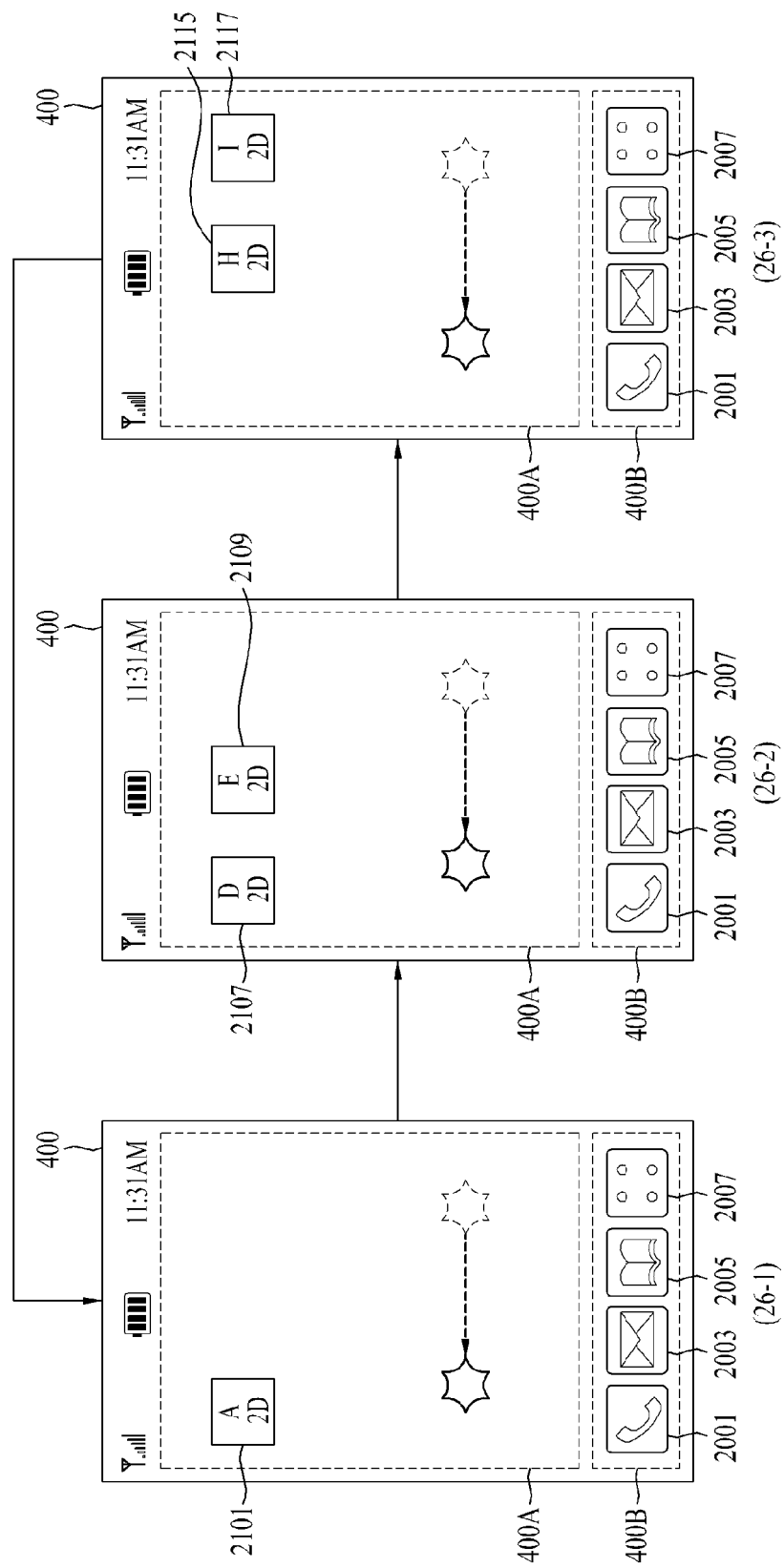

FIG. 25 and FIG. 26 are diagrams of display screen configurations for implementing a method of controlling a mobile terminal according to an embodiment of the present invention.

Referring to FIG. 25 (25-1), while one home screen is displayed on the touchscreen 400, a touch & drag in a top direction [e.g., a direction opposite to the bottom direction described with reference to FIG. 23 (23-1)] may be performed on the touchscreen 400 [S2103]. FIG. 25 (25-1) shows that the touch & drag in the top direction is performed when the $1^{st}$ home screen is displayed, by which the present embodiment may be non-limited. The touch & drag may be performed in the top direction when the $2^{nd}$ or $3^{rd}$ home screen is displayed.

In response to the touch & drag in the top direction, referring to FIG. 25 (25-2), the controller 180 may control 2D objects 2101, 2107, 2109, 2115 and 2117 to be displayed on the touchscreen 400 together by being sorted out from the objects within the $1^{st}$ to $3^{rd}$ home screens [S2105].

Even if the touch & drag in the top direction is performed, the controller 180 may control the touchscreen to stay in the 2D mode and control the sorted 2D objects to be displayed in 2D on the touchscreen 400.

If the number of the sorted objects is too big to have the sorted objects displayed within one screen, the sorted objects may be divided to be displayed on at least two screens [not shown in the drawing]. Each time the aforementioned touch & drag in the left or right direction is performed, the at least two screens can be sequentially displayed.

Meanwhile, referring to FIG. 25 (25-2), when the 2D objects are sorted out and displayed, the icon tray is displayed in 2D, by which the present embodiment may be non-limited. Alternatively, when the 2D objects are sorted out and displayed, the icon tray may be displayed in 3D or may not be displayed.

Meanwhile, when the 2D objects are sorted out and displayed, a touch & drag may be performed in bottom direction on the touchscreen.

In response to the touch & drag in the bottom direction, the controller 180 may control the home screen, which was displayed before the touch & drag in the top direction is performed, i.e., the $1^{st}$ home screen to be displayed again on the touchscreen.

In doing so, the controller 180 controls all the objects within the $1^{st}$ home screen to be displayed in 2D in a manner of controlling the touchscreen to keep staying in the 2D mode.

In the above description, the 2D objects within the $1^{st}$ to $3^{rd}$ home screens are sorted out and displayed together, by which the present embodiment may be non-limited. The following description is further made with reference to FIG. 26.

As mentioned in the foregoing description, when one home screen (e.g., the $1^{st}$ home screen) is displayed on the touchscreen 400, a touch & drag may be performed in a top direction.

In response to the touch & drag in the top direction, the controller 180 controls 3D objects 2103, 2105, 2111, 2113, 2119 and 2121 to disappear among the objects of the $1^{st}$ to $3^{rd}$ home screens and controls 2D objects 2101, 2107, 2109, 2115 and 2117 to remain within the $1^{st}$ to $3^{rd}$ home screens (i.e., the corresponding home screens) by being sorted out.

Thus, referring to FIG. 26 (26-1), the controller 180 may control the corresponding 3D objects 2103 and 2105 to disappear from the $1^{st}$ home screen, on which the touch & drag in the top direction has been performed, and control the corresponding 2D object 2101 to be displayed on the $1^{st}$ home screen only.

Each time a touch & drag in a left direction is performed on the touchscreen 400 for example, referring to FIG. 26 (26-2) and FIG. 26 (26-3), the controller 180 may control the $2^{nd}$ home screen and the $3^{rd}$ home screen to be sequentially displayed, control the corresponding 3D object(s) to disappear from each of the home screens, and control the corresponding 2D object(s) to be displayed on each of the home screens.

When the 2D objects are displayed on the $1^{st}$ to $3^{rd}$ home screens by being sorted out and remaining on the corresponding home screens, as mentioned in the foregoing description, the controller 180 controls the touchscreen to operate in the 2D mode to enable the sorted and remaining 2D objects to be displayed in 2D.

Referring to FIGS. 26 (26-1) to 26 (26-3), when the 2D objects are sorted out and displayed, the icon tray is displayed in 2D, by which the present embodiment may be non-limited. Alternatively, the icon tray may be displayed in 3D or may not be displayed at all.

Meanwhile, when the corresponding 2D objects 2107 and 2109 of the $2^{nd}$ home screen are sorted out and displayed on the touchscreen, a touch & drag performed in bottom direction may be performed on the touchscreen.

In response to the touch & drag in the bottom direction, the controller 180 may control the 3D objects to be reconstructed on the $1^{st}$ to $3^{rd}$ home screens and control the corresponding 2D objects 2017 and 2109 and the 3D object 2111 to be displayed again on the $2^{nd}$ home screen as shown in FIG. 22 (22-2). In doing so, as mentioned in the foregoing description, the controller 180 may control the objects within the $2^{nd}$ home screen to be displayed in 2D by keeping the touchscreen stay in the 2D mode.

According to the above description, when a touch & drag in a top direction is performed on the touchscreen, 2D objects within the $1^{st}$ to $3^{rd}$ home screens are sorted out. If another touch & drag is performed in direction (e.g., a bottom direction) opposite to that of the former touch & drag, the 2D objects within the $1^{st}$ to $3^{rd}$ home screens are released from the sorting so that the 2D objects and the 3D objects are displayed together on the $1^{st}$ to $3^{rd}$ home screens.

Yet, the present embodiment may be non-limited by this description. For instance, when a prescribed 2D object within the touchscreen is touched and dragged (or flicked) in a top direction, 2D objects within the $1^{st}$ to $3^{rd}$ home screens are sorted out and displayed only. If the sorted prescribed 2D object is touched and dragged in a direction (e.g., a bottom direction) opposite to that of the former touch & drag, the 2D objects within the $1^{st}$ to $3^{rd}$ home screens are released from the sorting so that the 2D objects and the 3D objects are displayed together on the $1^{st}$ to $3^{rd}$ home screens.

For another instance, when a prescribed 2D object within the touchscreen is touched and dragged (or flicked) in a top direction, 2D objects within the $1^{st}$ to $3^{rd}$ home screens are sorted out and disappear only and the 3D objects may remain and be displayed only.

According to the above description, when the 3D and 2D objects are displayed together on the touchscreen, the touch screen operates in the 2D mode, whereby the 3D and 2D objects are displayed in 2D, by which the present embodiment may be non-limited. This is described in detail with reference to FIG. 27 as follows.

Figure 27:
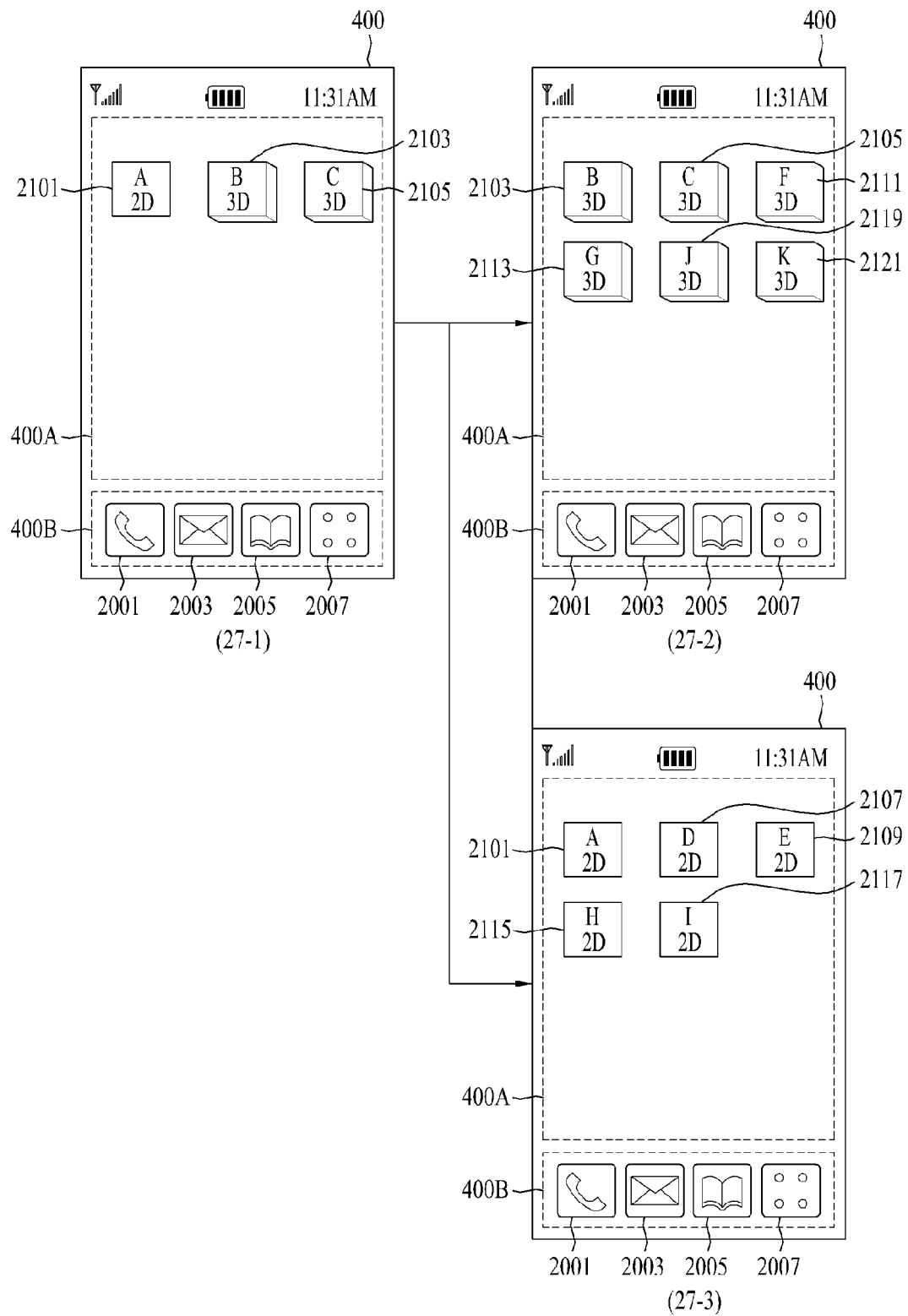

FIG. 27 is a diagram of display screen configuration for implementing a method for controlling a mobile terminal according to an embodiment of the present invention.

Referring to FIG. 27 (27-1), assume that a random one of the $1^{st}$ to $3^{rd}$ home screens (e.g., $1^{st}$ home screen) is being displayed on the touchscreen 400 and that the 3D objects 2103 and 2105 and the 2D object 2101 are displayed together on the $1^{st}$ home screen.

Considering that the 3D objects 2103 and 2105 are currently displayed, the controller 180 may control the touchscreen 400 to operate in the 3D mode, control the 3D objects to be displayed in 3D, and control the 2D object to be displayed in 2D.

As the current home screen is switched to a prescribed one of the home screens, if the prescribed home screen containing none of 3D objects is displayed on the touchscreen 400, the controller 180 may control the touchscreen 400 to enter the 2D mode from the 3D mode automatically. As the current home screen is switched to another prescribed home screen, if the prescribed home screen containing 3D object(s) is displayed on the touchscreen 400, the controller 180 may control the touchscreen 400 to enter the 3D mode from the 2D mode automatically.

When the $1^{st}$ home screen containing the 3D objects 2103 and 2105 and the 2D object 2101 is displayed on the touchscreen 400, a touch gesture (hereinafter called a $1^{st}$ touch gesture) may be performed to sort out the 3D objects. The touch gesture for sorting out the 3D objects is already explained in the foregoing description and its details shall be omitted for clarity of this specification.

In response to the $1^{st}$ touch gesture, referring to FIG. 27 (27-2), the controller 180 may control the touchscreen 400 to continue operating in the 3D mode and control the 3D objects to be sorted out and displayed on the touchscreen 400 in 3D. The method of sorting out and displaying the 3D objects is already described with reference to FIG. 23 and FIG. 24 and its details shall be omitted for clarity of this specification.

On the other hand, when the $1^{st}$ home screen containing the 3D objects 2103 and 2105 and the 2D object 2101 is displayed on the touchscreen 400, a touch gesture (hereinafter called a $2^{nd}$ touch gesture) may be performed to sort out the 2D object (s). The touch gesture for sorting out the 2D object(s) is already explained in the foregoing description and its details shall be omitted for clarity of this specification.

In response to the $2^{nd}$ touch gesture, referring to FIG. 27 (27-3), the controller 180 may control the touchscreen 400 to switch to and operate in the 2D mode and control the 2D objects to be sorted out and displayed on the touchscreen 400 in 2D. The method of sorting out and displaying the 2D objects is already described with reference to FIG. 25 and FIG. 26 and its details shall be omitted for clarity of this specification.

According to the above description, how to sort out and display 3D objects is explained. When the 3D objects are sorted out and displayed, they may be displayed in a manner of differing from each other in 3D depth (or height) in accordance with a different classification criterion. This shall be described in detail with reference to FIG. 28 and FIG. 29 as follows.

Figure 28:
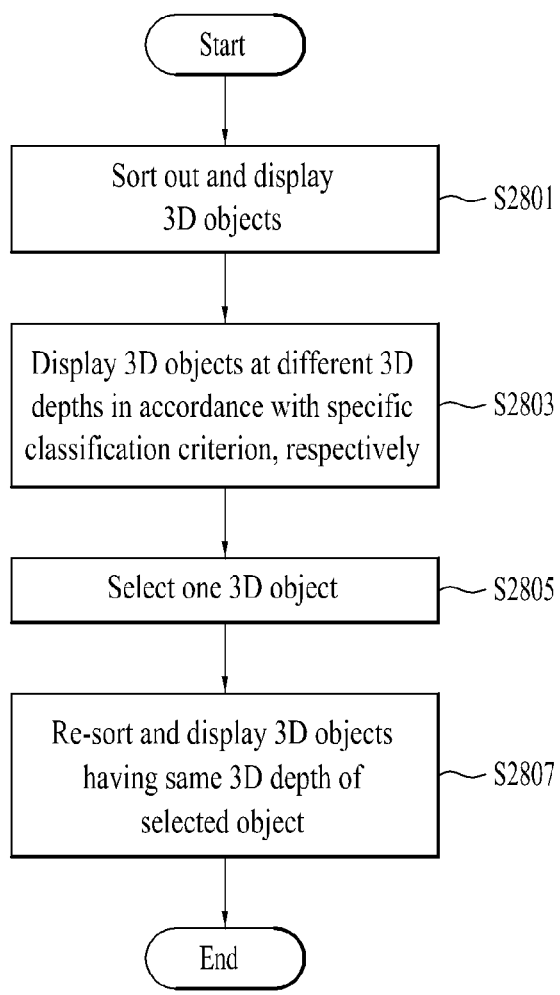
FIG. 28 is a flowchart of a method for controlling a mobile terminal according to an embodiment of the present invention.

FIG. 28 is a flowchart of a method for controlling a mobile terminal according to an embodiment of the present invention. And, FIG. 29 is a diagram of display screen configuration for implementing a method for controlling a mobile terminal according to an embodiment of the present invention.

Figure 29:
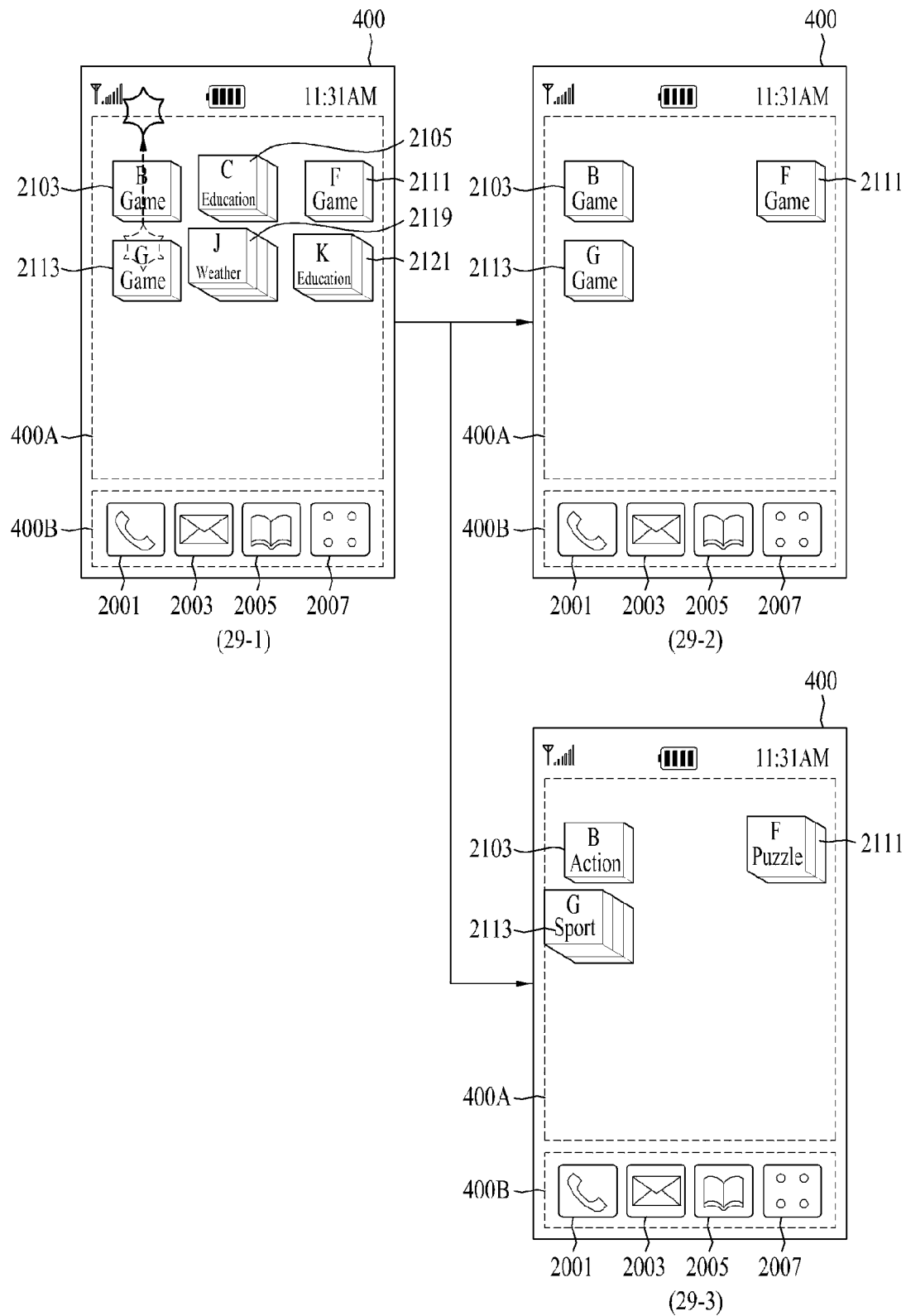
FIGS. 29 to 33 are diagrams of display screen configurations of implementing a method for controlling a mobile terminal according to an embodiment of the present invention.

Referring to FIG. 28 and FIG. 29, the touchscreen 400 is operating in the 3D mode and the sorted 3D objects can be entirely displayed in 3D on the touchscreen 400 [FIG. 29 (29-1)] [S2801]. This is already described with reference to FIG. 23 and its details shall be omitted from the following description. For clarity of the following description, the sorted 3D objects shall be named primarily sorted 3D objects.

The primarily sorted 3D objects may be displayed at different 3D depths (or heights) in accordance with categories of the corresponding applications, respectively [S2803]. For instance, referring to FIG. 29 (29-1), an object B 2103, an object F 2111 and an object G 2113, each of which corresponds to a game category, are displayed at the $1^{st}$ depth. An object C 2105 and an object K 2121, which correspond to an education category, are displayed at the $2^{nd}$ depth. And, an object J 2117 corresponding to a weather category is displayed at the $3^{rd}$ depth.

In doing so, a desired object (e.g., the object G 2113) among the primarily sorted 3D objects is touched and dragged (or flicked) in top direction [S2805].

In response to the top-direction touch & drag performed on the desired object, referring to FIG. 29 (29-2) and FIG. 29 (29-3), the desired object (e.g., the object G 2113) and the rest of the 3D objects (e.g., the object B 2103 and the object F 2111) having the same 3D depth of the desired object are further sorted out and displayed together by the controller 180 [S2807].

In particular, as all the objects corresponding to the game category are sorted out and can be then displayed together on the touchscreen 400. In the following description, the sorted objects corresponding to the game category shall be named secondarily sorted 3D objects.

FIG. 29 (29-2) shows one example that each of the secondarily sorted 3D objects is displayed at the $1^{st}$ depth, by which the present embodiment may be non-limited.

For instance, referring to FIG. 29 (29-3), the objects (i.e., the secondarily sorted 3D objects) are further classified in sub-categories (e.g., action, puzzle, sports, etc.) and then displayed at different 3D depths. In particular, referring to FIG. 29 (29-3), the object 2103 corresponding to an action game category may be displayed at a $1^{st}$ depth, the object F 2111 corresponding to a puzzle game category may be displayed at a $2^{nd}$ depth, and the object G 2113 corresponding to a sports game category may be displayed at a $3^{rd}$ depth.

While the objects corresponding to the game category are secondarily sorted out and displayed, one (e.g., the object F) may be touched & dragged in a top direction one more time [not shown in the drawing]. If so, the controller 180 may control the 3D object(s) corresponding to the puzzle game category to be tertiarily sorted out and displayed.

Meanwhile, while the objects corresponding to the game category are secondarily sorted out and displayed, one (e.g., the object F) may be touched & dragged in a bottom direction opposite to the top direction.

If so, referring to FIG. 29 (29-1), the controller 180 may control all the primarily sorted 3D objects to be displayed.

According to the above description with reference to FIG. 29, the primarily sorted 3D objects are displayed in the manner explained with reference to FIG. 23 (23-2). Alternatively, the primarily sorted 3D objects may be displayed at different 3D depths in accordance with categories of the corresponding applications in a manner of being divided into the corresponding home screens, respectively, as shown in FIG. 24. This may be easily understood based on the former description and its details shall be omitted for clarity of the following description.

According to the description with reference to FIG. 29, when a desired object is selected from the primarily sorted 3D objects, the desired object and all the 3D objects having the same 3D depth of the desired object are further sorted, by which the present embodiment may be non-limited. For instance, the desired object and every 3D object having either the same 3D depth of the desired object or the 3D depth deeper than that of the desired object. For another instance, the desired object and every 3D object having either the same 3D depth of the desired object or the 3D depth shallower than that of the desired object.

According to the above description, the object is assumed as an application icon or widget, by which the object may be non-limited. For instance, the object may include a message (e.g., SMS message, MMS message, email message, etc.). This is described in detail with reference to FIG. 30 and FIG. 31 as follows.

Figure 30:
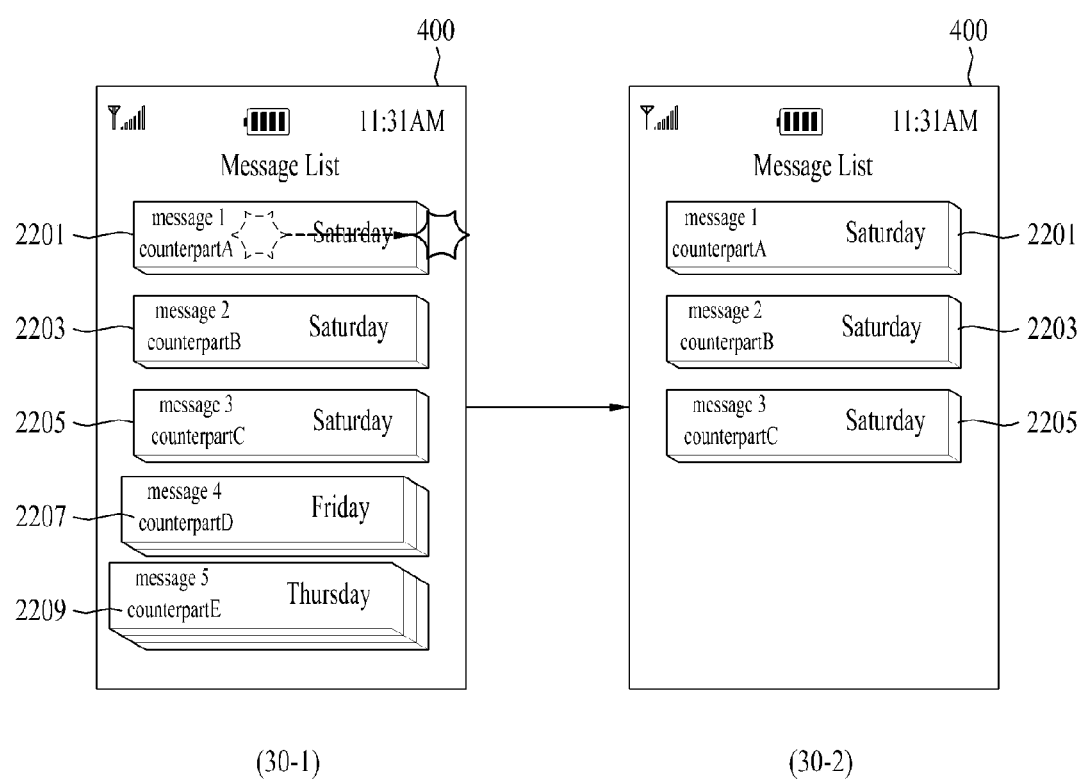
Figure 31:
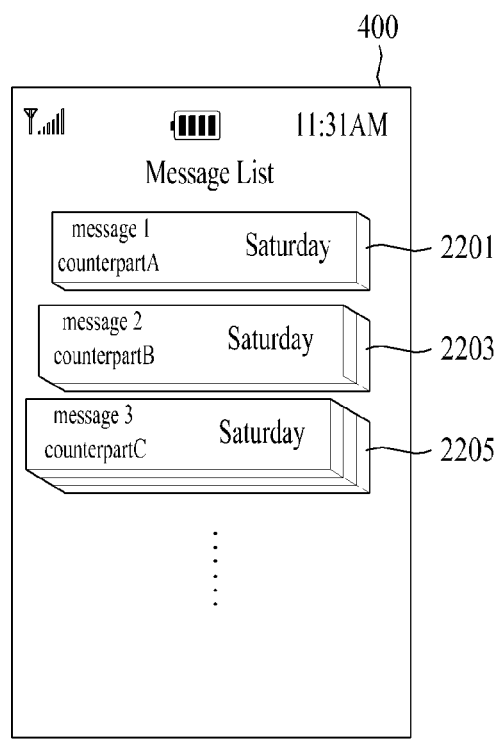

FIG. 30 and FIG. 31 are diagrams of display screen configurations for implementing a method for controlling a mobile terminal according to an embodiment of the present invention.

Referring to FIG. 30 (30-1), the transmitted or received messages saved in the memory 160 may be displayed on the touchscreen 400. In FIG. 30 (30-1), the messages can be displayed at different 3D depths in accordance with classification criteria, respectively. In particular, no limitation is put on the classification criteria. For instance, the classification criteria may include at least one of a message counterpart (e.g., a sender, a recipient, etc.), a message sent date (or hour), a presence or non-presence of attachment file, a presence or non-presence of a specific search word, a presence or non-presence of a phone number and the like. FIG. 30 (30-1) shows one example that the message sent date is the classification criterion. In particular, $1^{st}$ to $3^{rd}$ messages 2201, 2203 and 2205 sent on Saturday are displayed at a $1^{st}$ depth, a $4^{th}$ message 2207 sent on Friday is displayed at a $2^{nd}$ depth, and a $5^{th}$ message sent on Thursday is displayed at a $3^{rd}$ depth.

In doing so, a touch gesture may be performed on the touchscreen 400 to select the $1^{st}$ message 201. FIG. 30 (30-1) shows one example that the touch gesture for selecting the $1^{st}$ message includes a touch & drag performed in right direction on the $1^{st}$ message, by which the present embodiment may be non-limited.

In response to the touch gesture for selecting the $1^{st}$ message, referring to FIG. 30 (30-2), the controller 180 controls the 1st message 2201 and all the message 2203 and 2205, each of which has the same 3D depth of the $1^{st}$ message 2201, within the message list to be sorted out and displayed. FIG. 30 (30-2) shows one example that the $1^{st}$ to $3^{rd}$ messages are sorted out and displayed. Yet, if another message having the same 3D depth of the $1^{st}$ message 2201 exists in the message list despite not being displayed on the touchscreen 400 in FIG. 30 (30-1), it may be sorted out and displayed together with other messages.

It may be unnecessary for the message, which has the same 3D depth of the $1^{st}$ message 2201, to be sorted out only [not shown in the drawing]. For instance, a message having either the same 3D depth of the $1^{st}$ message 2201 or a depth deeper than that of the $1^{st}$ message 201 may be sorted out. For another instance, a message having either the same 3D depth of the $1^{st}$ message 2201 or a depth shallower than that of the $1^{st}$ message 2201 may be sorted out.

Meanwhile, when the $1^{st}$ to $3^{rd}$ messages are sorted out, referring to FIG. 30 (30-2), they may continue being displayed at the $1^{st}$ depth.

Alternatively, the sorted $1^{st}$ to $3^{rd}$ messages (i.e., the $1^{st}$ to $3^{rd}$ messages sorted out primarily) may be displayed at different 3D depths in accordance with another classification criterion (e.g., message counterpart). Of course, the primarily sorted $1^{st}$ to $3^{rd}$ messages displayed at the different depths in accordance with the corresponding classification criterion (e.g., message counterpart) may be secondarily sorted out in accordance with a selection made by a user. This is mentioned in the foregoing description and its details shall be omitted for clarity of the following description.

According to the descriptions with reference to FIG. 30 and FIG. 31, the messages on the message list are displayed at different depths in accordance with the corresponding classification criteria and a message at a desired 3D depth is sorted out from the displayed messages. In the following description, how to display messages transmitted to and/or received from a specific counterpart at different 3D depths in accordance with classification criteria and how to sort out the received/transmitted message at a desired 3D depth from the displayed messages will be explained in detail with reference to FIG. 32 and FIG. 33.

Figure 32:
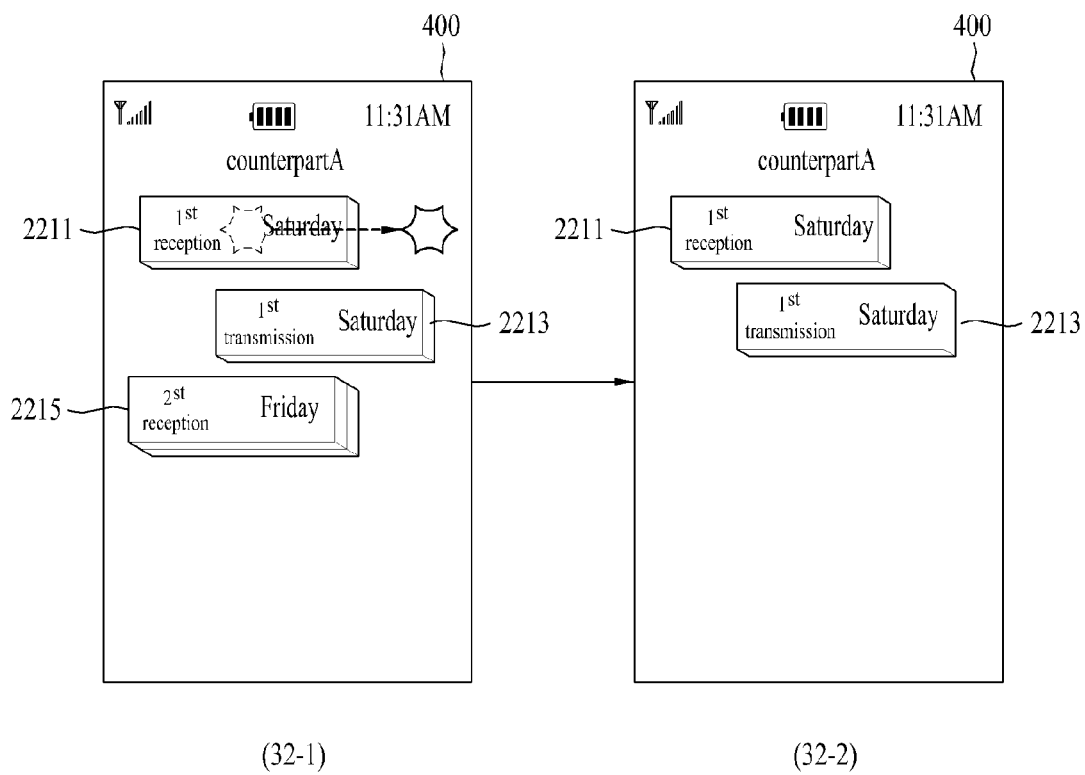
Figure 33:
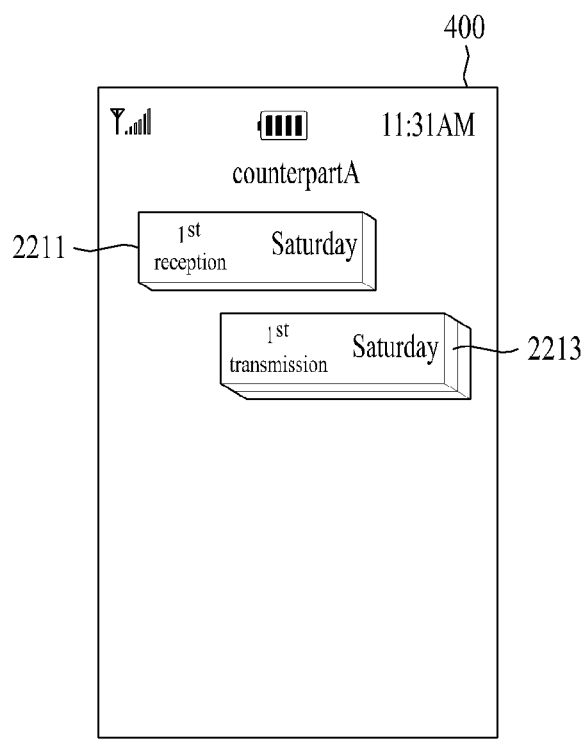

FIG. 32 and FIG. 33 are diagrams of display screen configurations for implementing a method for controlling a mobile terminal according to an embodiment of the present invention.

Referring to FIG. 32, transmitted and received messages (e.g., a $1^{st}$ received message 2211, a $1^{st}$ transmitted message 2213, a $2^{nd}$ received message 2215, etc.), which have been received from or transmitted to a specific counterpart (e.g., a counterpart A), saved in the memory 160 may be displayed on the touchscreen 400. For instance, a $1^{st}$ message, which is the latest message among the messages exchanged with the counterpart A, on the message list shown in FIG. 30 (30-1) is touched and selected, whereby the transmitted and received messages can be displayed as shown in FIG. 32 (32-1).

In FIG. 32 (32-1), the transmitted message and the received messages are classified in transmitted/received dates. For example, the $1^{st}$ received message 2211 and the $1^{st}$ transmitted message 2213, which are transmitted on Saturday, are displayed at a $1^{st}$ depth and the $2^{nd}$ received message 215 transmitted on Friday is displayed at $2^{nd}$ depth.

In doing so, a touch gesture for selecting the $1^{st}$ received message may be performed on the touchscreen 400. FIG. 32 (32-1) shows one example that the touch gesture for selecting the $1^{st}$ received message is performed in a manner of touching & dragging the $1^{st}$ received message in right direction, by which the present embodiment may be non-limited.

In response to the touch gesture for selecting the $1^{st}$ received message, referring to FIG. 32 (32-2), the controller 180 may control the $1^{st}$ received message 2211 and every message 2213, which has the same 3D depth of the $1^{st}$ received message 2211 on the message list, to be sorted out and displayed. FIG. 32 (32-2) shows that the $1^{st}$ received message 2211 and the $1^{st}$ transmitted message 2213 are sorted out and displayed. Yet, in FIG. 32 (32-1), if another message having the same 3D depth of the $1^{st}$ received message exists despite not being displayed on the touchscreen 400, it may be sorted out and displayed as well.

The above-mentioned message sorting is quite similar to the former description with reference to FIG. 30 and its details shall be omitted for clarity of the specification.

Meanwhile, when the $1^{st}$ received message and the $1^{st}$ transmitted message are sorted out, referring to FIG. 32 (32-2), they may continue being displayed at the $1^{st}$ depth.

Alternatively, referring to FIG. 33, the sorted $1^{st}$ received message 2211 and the sorted $1^{st}$ transmitted message 2213 (i.e., the primarily sorted messages) may be displayed at different 3D depths in accordance with a different classification criterion (e.g., a presence or non-presence of attachment file). Of course, the primarily sorted $1^{st}$ received and transmitted messages, which are displayed at the different 3D depths in accordance with the different classification criterion, can be secondarily sorted out in accordance with a selection made by a user. This is mentioned in the foregoing description and its details shall be omitted for clarity of the following description.

According to the above description, such objects as icons, widgets, messages and the like are displayed at different 3D depths in accordance with their attributes, by which the present embodiment may be non-limited. For instance, a folder may be displayed at a different 3D depth in accordance with its attribute. This is described in detail with reference to FIG. 34 and FIG. 35 as follows.

Figure 34:
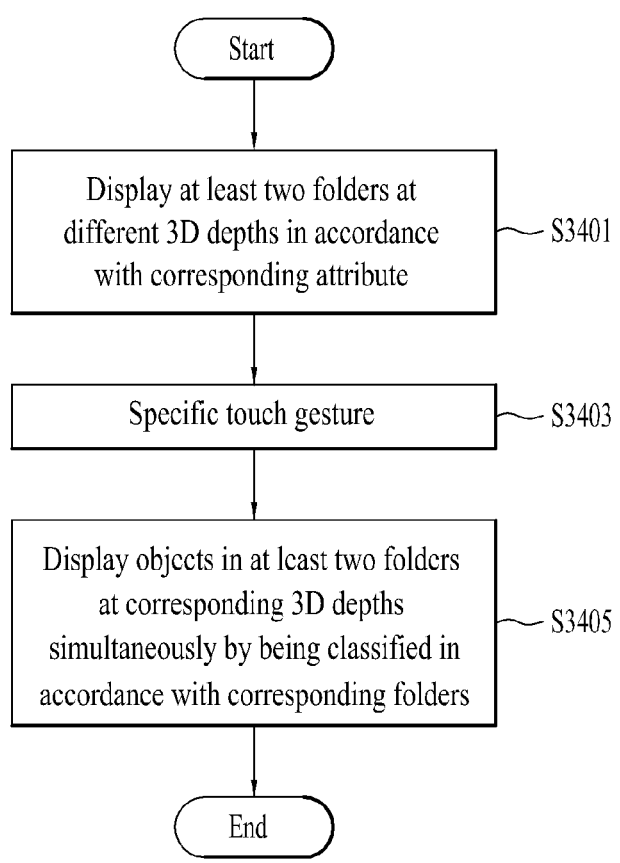
FIG. 34 is a flowchart of a method for controlling a mobile terminal according to an embodiment of the present invention.

FIG. 34 is a flowchart of a method for controlling a mobile terminal according to an embodiment of the present invention. And, FIG. 35 is a diagram of display screen configuration for implementing a method for controlling a mobile terminal according to an embodiment of the present invention.

Figure 35:
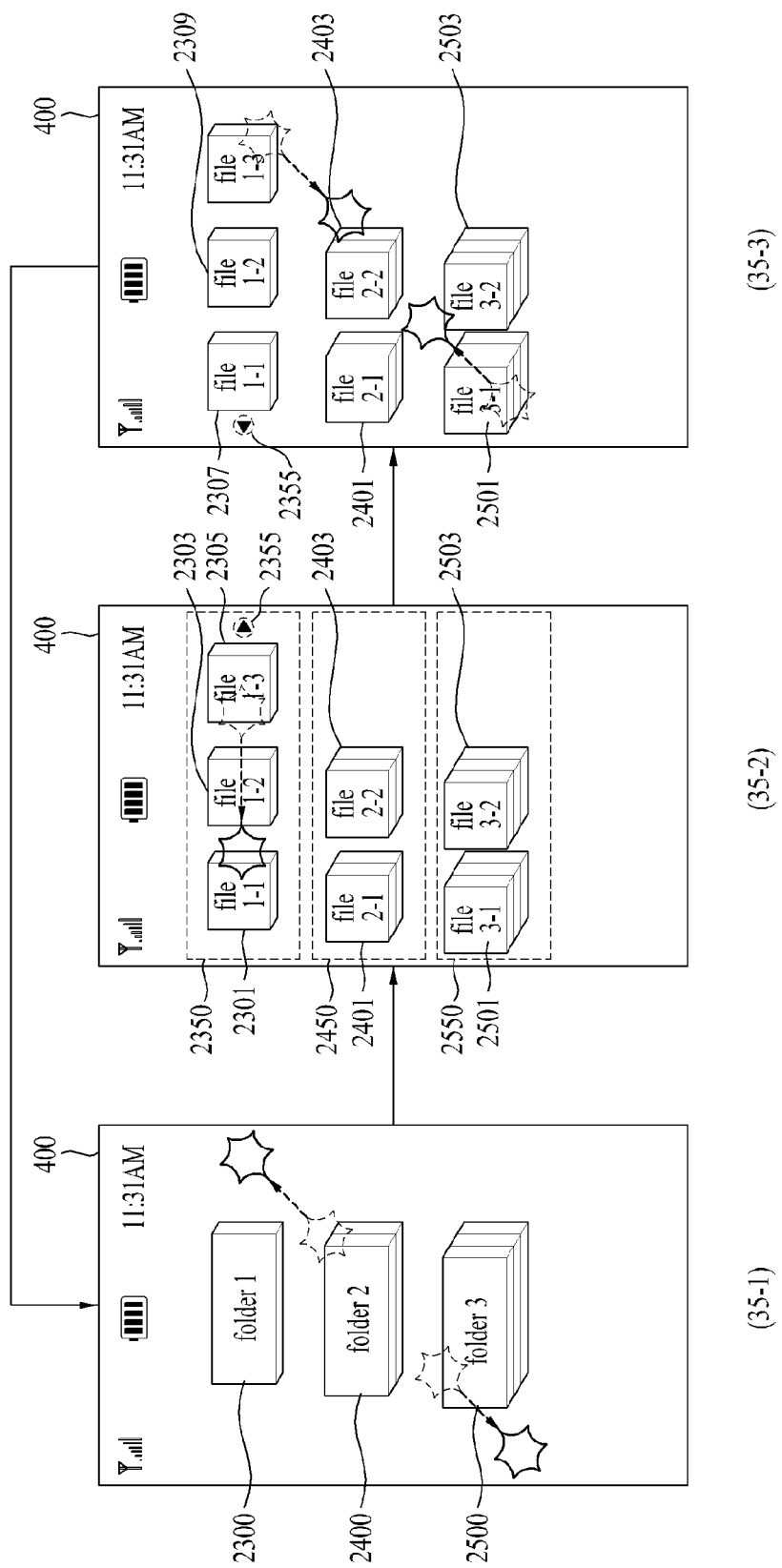

Referring to FIG. 34 and FIG. 35, at least two or more folders may be displayed on the touchscreen 400 [FIG. 35 (35-1)] [S3401]. In particular, the folders may be displayed at different 3D depths in accordance with a classification criterion. In more particular, no restriction is put on the classification criterion. For instance, the classification criterion may include at least one of a folder created date, a recently-used folder order, a most-frequently-used folder order, a folder category and the like. If the folder category is taken as an example, a music category folder may be displayed at a $1^{st}$ depth, a photo category folder may be displayed at a $2^{nd}$ depth, and a movie category folder may be displayed at a $3^{rd}$ depth.

FIG. 35 (35-1) shows one example that a $1^{st}$ folder 2300, a $2^{nd}$ folder 2400 and a $3^{rd}$ folder 2500 are displayed at a $1^{st}$ depth, a $2^{nd}$ depth and a $3^{rd}$ depth, respectively.

In doing so, a $1^{st}$ touch gesture for opening a plurality of the folders simultaneously may be performed on the touchscreen 400 [S3403]. In particular, the $1^{st}$ touch gesture may be performed in a manner of simultaneously touching two points on the touchscreen 400 with two pointers (e.g., fingers) and then dragging the two points away from each other by maintaining the touches, by which the present embodiment may be non-limited.

In response to the $1^{st}$ touch gesture, referring to FIG. 35 (35-2), the controller 180 may control a plurality of the folders to disappear and control objects (e.g., files, icons, widgets, etc.) in the respective folders to be displayed on the touchscreen 400 by being classified according to their corresponding folders, respectively [S3405]. In the following description, assume that the objects in the folders are files, respectively.

FIG. 35 (35-2) shows one example that the files in the folders are discriminated from each other in a manner of being displayed per folder in different regions. For instance, the controller 180 controls $1^{st}$ files 2301, 2303 and 2305 belonging to a $1^{st}$ folder 2300 to be displayed on a $1^{st}$ region 2350 corresponding to a region where the $1^{st}$ folder was located, controls $2^{nd}$ files 2401 and 2403 belonging to a $2^{nd}$ folder 2400 to be displayed on a $2^{nd}$ region 2450 corresponding to a region where the $2^{nd}$ folder was located, and controls $3^{rd}$ files 2501 and 2503 belonging to a $3^{rd}$ folder 2500 to be displayed on a $3^{rd}$ region 2550 corresponding to a region where the $3^{rd}$ folder was located. In particular, it is a matter of course that the files in the folders may be identifiably displayed per folder in a manner that the folders differ from each other in color, size and/or the like.

Moreover, the controller 180 may control all the $1^{st}$ files to be displayed at the $1^{st}$ depth like the $1^{st}$ folder 2300, control all the $2^{nd}$ files to be displayed at the $2^{nd}$ depth like the $2^{nd}$ folder 2400, and control all the $3^{rd}$ files to be displayed at the $3^{rd}$ depth like the $3^{rd}$ folder 2500. In this case, since the folder corresponding to each of the files is identifiable owing to the 3D stereoscopic depth, the $1^{st}$ to $3^{rd}$ files can be displayed by being mixed together.

Meanwhile, if the number of the files in the $1^{st}$ folder 2300 is excessive, the $1^{st}$ files may not be fully displayable on the $1^{st}$ region 2350. If so, the controller 180 may control an indicator 2355 to be displayed to indicate that there may exist the $1^{st}$ file(s) failing to be displayed. That is, when a touch & drag in left or right direction is performed on the $1^{st}$ region 2350, referring to FIG. 35 (35-3), a user may be able to control the $1^{st}$ file(s), which fails to be displayed, to be newly displayed on the $1^{st}$ region 2350 by scrolling the $1^{st}$ files.

One of the displayed files may be selected and activated. If one of the displayed files is touched and selected, the controller 180 may control the selected file to be activated after the selected file has been displayed at a previously set 3D depth (e.g., a $4^{th}$ depth). This is to provide a user with feedback information indicating that the selected file has been correctly selected.

Meanwhile, when the files in the respective folders are displayed per folder, a $2^{nd}$ touch gesture may be performed to enable a plurality of the folders to be displayed again. In particular, the $2^{nd}$ touch gesture may be performed in a manner of simultaneously touching two points on the touchscreen 400 with two pointers (e.g., fingers) and then dragging the two points closer to each other by maintaining the touches, by which the present embodiment may be non-limited.

In response to the $2^{nd}$ touch gesture, referring to FIG. 35 (35-1), the controller 180 may control the files to disappear and control the $1^{st}$ to $3^{rd}$ folders to be displayed again.

According to the above description with reference to FIG. 35, when the $1^{st}$ touch gesture is performed, the $1^{st}$ to $3^{rd}$ folders are fully opened, by which the present embodiment may be non-limited. For instance, when the $1^{st}$ touch gesture is performed, one of the $1^{st}$ to $3^{rd}$ folders may be selectively opened. This is described in detail with reference to FIG. 36 as follows.

Figure 36:
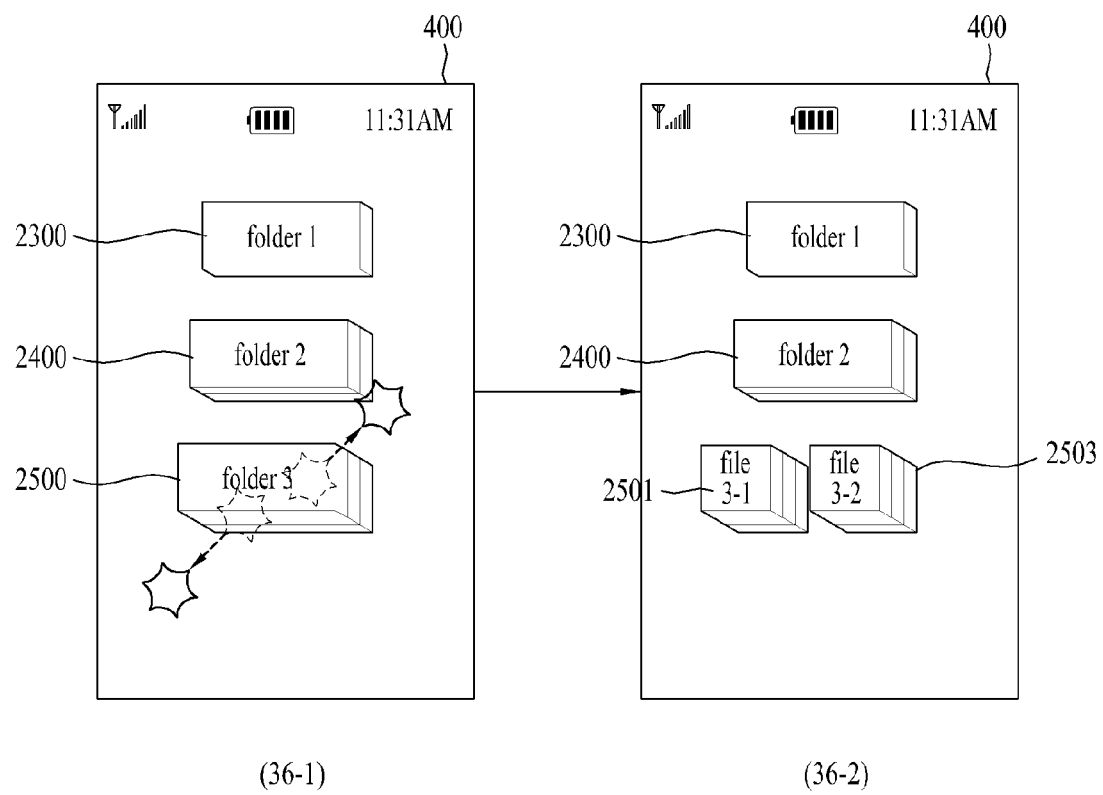

FIG. 36 is a diagram of display screen configuration for implementing a method for controlling a mobile terminal according to an embodiment of the present invention.

Referring to FIG. 36 (36-1), at least two or more folders may be displayed on the touchscreen 40. As mentioned in the foregoing description, a $1^{st}$ folder 2300, a $2^{nd}$ folder 2400 and a $3^{rd}$ folder 2500 may be displayed at a $1^{st}$ depth, a $2^{nd}$ depth and a $3^{rd}$ depth, respectively.

In doing so, a $1^{st}$ touch gesture may be performed on a desired one (e.g., the $3^{rd}$ folder (2500)) of a plurality of the folders on the touchscreen 400.

In response to the $1^{st}$ touch gesture performed on the $3^{rd}$ folder 2500, referring to FIG. 36 (36-2), the controller 180 may control the $3^{rd}$ folder 2500 to disappear on maintaining the $1^{st}$ folder 2300 and the $2^{nd}$ folder 2400, and control the $3^{rd}$ files 2501 and 2503, which belong to the $3^{rd}$ folder, to be displayed on a $3^{rd}$ region corresponding to a position where the $3^{rd}$ folder was located. And, the controller 180 may control all the $3^{rd}$ files to be displayed at the $3^{rd}$ depth like the $3^{rd}$ folder.

Meanwhile, a $2^{nd}$ touch gesture may be performed on the $3^{rd}$ region on which the $3^{rd}$ folders are displayed.

In response to the $2^{nd}$ touch gesture, referring to FIG. 36 (36-1), the controller 180 may control the $3^{rd}$ files 2501, 2503 to disappear and control the $3^{rd}$ folder 2500 to be re-displayed instead.

According to the above descriptions with reference to FIGS. 34 to 36, a folder and its inner files are displayed at 3D depth, by which the present invention may be non-limited. For instance, a menu in the mobile terminal 100 and its submenus may be displayed in the manners described with reference to FIGS. 34 to 36. In particular, the menu of the mobile terminal 100 may correspond to the folder and the submenus may correspond to the inner files, respectively. This is easily conceivable from the aforementioned description and its details shall be omitted for clarity of the present specification.

According to the above descriptions with reference to FIGS. 34 to 36, files within a folder are displayed at the same 3D depth of the corresponding folder, by which the present embodiment may be non-limited. For instance, files within a folder (or files in several folders) may be displayable at different 3D stereoscopic depths in accordance with classification criteria. This is described in detail with reference to FIG. 37 as follows.

Figure 37:
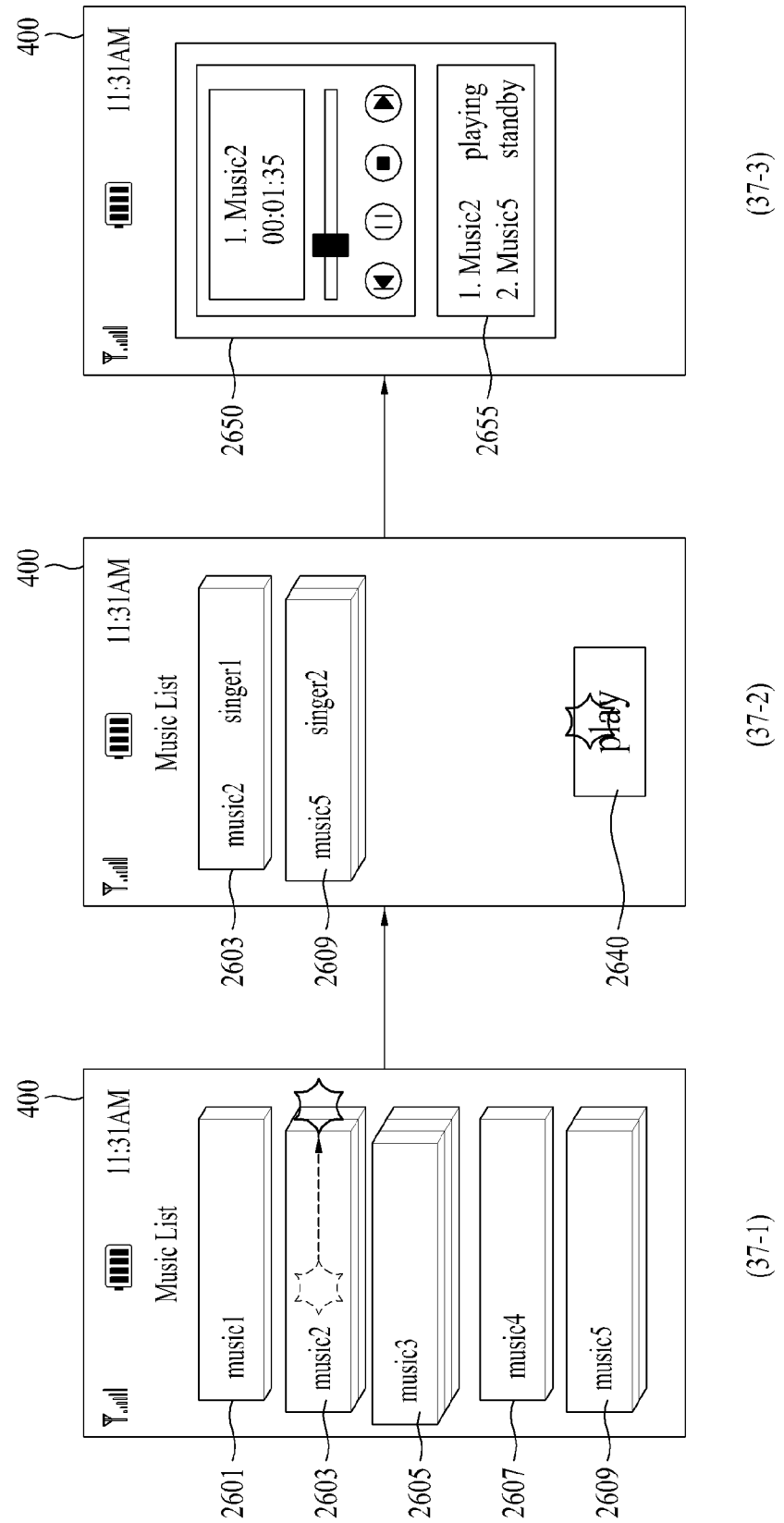

FIG. 37 is a diagram of display screen configuration for implementing a method for controlling a mobile terminal according to an embodiment of the present invention.

Referring to FIG. 37 (37-1), files saved in the memory 160 may be displayed on the touchscreen 400. In particular, the files may include multimedia files (e.g., music files, photo files, video files, etc.) and document files. In the following description, assume that the file includes the music file and the saved music files are displayed as a music list. The music list may include a list of music files saved in a music folder or a music play list loaded in a specific music play application.

In FIG. 37 (37-1), the music files are displayable at a different 3D depth in accordance with a classification criterion. No restriction is put on the classification criterion. For instance, the classification criterion may include one of a download date, a recently used order, a most frequently used order, an artist, a genre and the like. If the genre is taken as an example of the classification criterion, $1^{st}$ and $4^{th}$ musics 2601 and 2607 corresponding to a genre 'Jazz' may be displayed at a $1^{st}$ depth, $2^{nd}$ musics 2603 and 2609 corresponding to a genre 'Rock' may be displayed at a $2^{nd}$ depth, and a $3^{rd}$ music 2605 corresponding to a genre 'Classics' may be displayed at a $3^{rd}$ depth. If the mostly used frequency is taken as an example of the classification criterion, the $1^{st}$ and $4^{th}$ musics 2601 and 2607 failing to be played within two weeks recently may be displayed at a $1^{st}$ depth, the $2^{nd}$ musics 2603 and 2609 played within one or two weeks recently (that is, played within two weeks recently but not played within one week recently) may be displayed at a $2^{nd}$ depth, and the $3^{rd}$ music 2605 played within a week recently may be displayed at a $3^{rd}$ depth.

In doing so, a touch gesture for selecting the $2^{nd}$ music 2603 may be performed on the touchscreen 400. FIG. 37 (37-1) shows one example that the touch gesture for selecting the $2^{nd}$ music 2603 includes a touch & drag performed on the $2^{nd}$ music 2603 in right direction, by which the present embodiment may be non-limited.

In response to the touch gesture for selecting the $2^{nd}$ music, referring to FIG. 37 (37-2), the controller 180 may control the $2^{nd}$ music and another music 2609, which has the same 3D depth of the $2^{nd}$ music, to be sorted out and displayed. FIG. 37 (37-2) shows that the $2^{nd}$ music 2603 and the $5^{th}$ music 2609 are sorted out and displayed. Yet, in FIG. 37 (37-2), if another music having the same 3D depth of the $2^{nd}$ music exists in the music list despite not being displayed on the touchscreen 400, it may be sorted out and displayed as well.

It may be unnecessary for the music, which has the same 3D depth of the $2^{nd}$ music, to be sorted out only [not shown in the drawing]. For instance, the $2^{nd}$ music, a music having the same 3D depth of the $2^{nd}$ music and a music having a 3D depth deeper than that of the $2^{nd}$ music may be sorted out [not shown in the drawing]. For another instance, the $2^{nd}$ music, a music having the same 3D depth of the $2^{nd}$ music and a music having a 3D depth shallower than that of the $2^{nd}$ music may be sorted out [not shown in the drawing].

The sorted $2^{nd}$ and $5^{th}$ musics may continue being displayed at the $2^{nd}$ depth [not shown in the drawing].

Alternatively, referring to FIG. 37 (37-2), the sorted $2^{nd}$ and $5^{th}$ musics (i.e., the primarily sorted $2^{nd}$ and $5^{th}$ musics) may be displayable at a different 3D depth in accordance with a different classification criterion. Of course, the $2^{nd}$ and $5^{th}$ musics displayed at the different depth in accordance with the different classification criterion can be secondarily sorted out by a selection made by a user. This is mentioned in the foregoing description and its details shall be omitted for clarity of the present specification.

Referring to FIG. 37 (37-2), a play icon 2640 displayed on the touchscreen 400 may be touched and selected.

In response to the touch to the play icon 2640, referring to FIG. 37) 37-3), the controller 180 activates a music play application 2650, controls the sorted $2^{nd}$ and $5^{th}$ musics to be included in a play list 2655 of the music play application 2650, and controls the sorted $2^{nd}$ and $5^{th}$ musics to be sequentially played back.

When a touch gesture for selecting the $2^{nd}$ music from the music list is performed in FIG. 37 (37-1), the controller 180 may control the screen shown in FIG. 37 (37-2) not to be displayed but control the sorted $2^{nd}$ and $5^{th}$ musics to be sequentially played on displaying the screen shown in FIG. 37 (37-3).

According to the descriptions with reference to FIG. 36 and FIG. 37, when a music file is selected, the selected music file and other music files having the same 3D depth of the selected music file are sorted out and displayed, by which the present embodiment may be non-limited. For instance, the selected music file and other music files having the same 3D depth of the selected music file are sorted out and disappear from the music list and the rest of music files may be displayed on the music list.

In the following description, when an object list is displayed, a method of scrolling objects on the object list is explained with reference to FIG. 38 and FIG. 39. In particular, assume that the object list includes the music list, by which the present embodiment may be non-limited.

Figure 38:
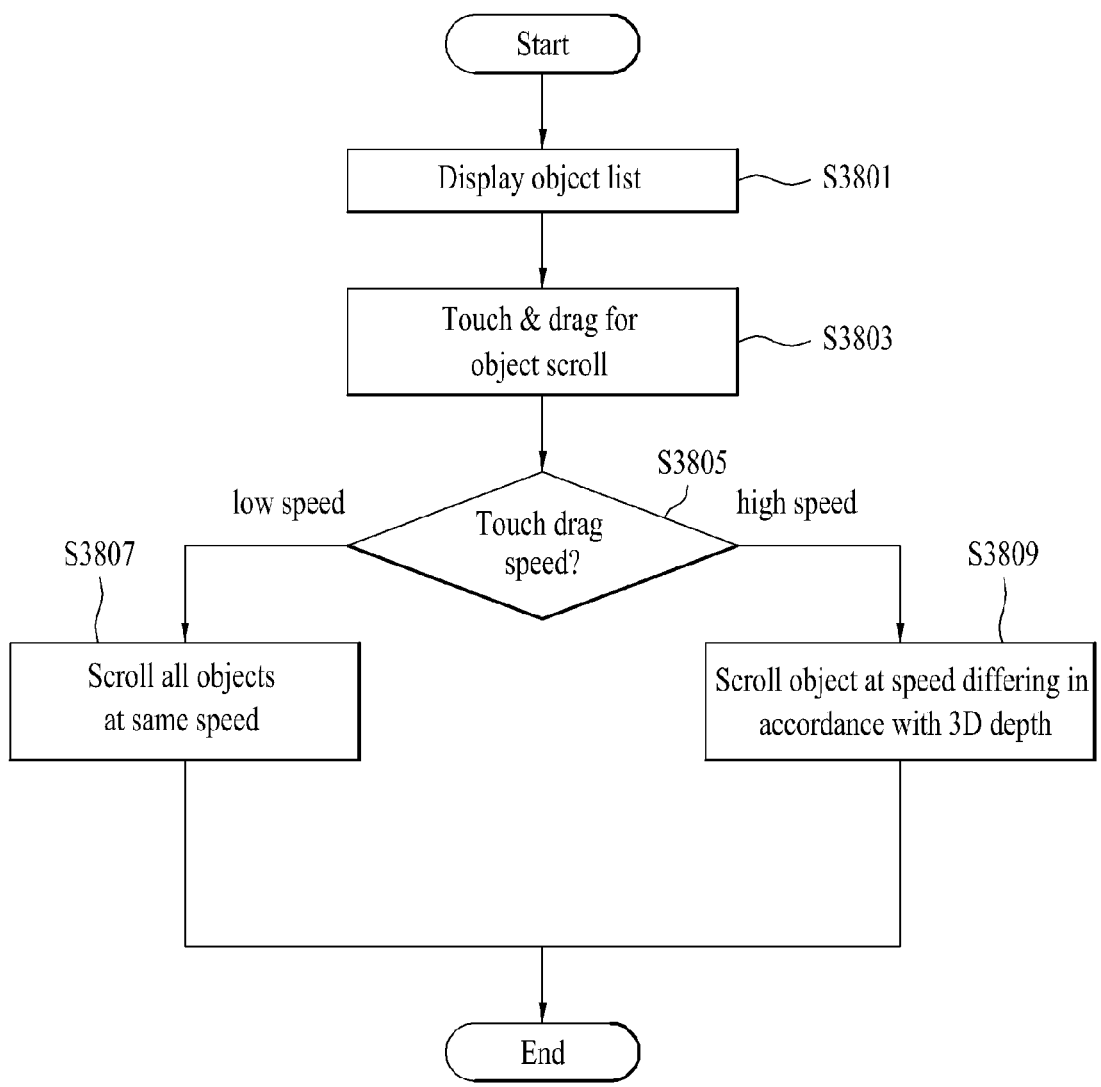

FIG. 38 is a flowchart of a method for controlling a mobile terminal according to an embodiment of the present invention. And, FIG. 39 is a diagram of display screen configuration for implementing a method for controlling a mobile terminal according to an embodiment of the present invention.

Referring to FIG. 38 and FIG. 39, the music list may be displayed on the touchscreen 400 [FIG. 39 (39-1)] [S3801]. This is mentioned in the foregoing description and its details shall be omitted for clarity of the present specification.

A touch gesture (e.g., a touch & drag in top direction, etc.) may be performed on the touch screen 400 to scroll musics on the list [S3803].

In response to the touch gesture, the controller 180 may be able to determine a speed of the touch & drag [S3805].

As a result of the determination [S3805], if the speed of the touch & drag is lower than a preset speed, referring to FIG. 39 (39-2), the controller 180 may control all the musics on the list to be scrolled at the same speed [S3807]. In particular, when the touch & drag is performed, the controller 180 may control each of the musics to move in the same distance.

On the contrary, as a result of the determination [S3805], if the speed of the touch & drag is equal to or higher than the preset speed, referring to FIG. 39 (39-3), the controller 180 may controls each of the musics on the list to be scrolled at a different speed in accordance with its 3D depth. In particular, when the touch & drag is performed, the controller 180 may control each of the musics to move in a different distance in accordance with its 3D depth in response to the same touch & drag. [S3809].

For instance, referring to FIG. 39 (39-3), the $3^{rd}$ music 2605 displayed at the $3^{rd}$ depth may move in a $1^{st}$ distance d1 in response to the same touch & drag. Each of the $2^{nd}$ and $5^{th}$ musics 2603 and 2609 displayed at the $2^{nd}$ depth may move in a $2^{nd}$ distance d1 longer than the $1^{st}$ distance d1 in response to the same touch & drag. And, each of the 1st, $4^{th}$ and $8^{th}$ musics 2601, 2607 and 2615 displayed at the $1^{st}$ depth may move in a $3^{rd}$ distance d3 longer than the $2^{nd}$ distance d2 in response to the same touch & drag.

The $3^{rd}$ music 2605 displayed at the $3^{rd}$ depth may move in the $3^{rd}$ distance d3, each of the $2^{nd}$ and $5^{th}$ music 2603 and 2609 displayed at the $2^{nd}$ depth may move in the $2^{nd}$ distance d2, and each of the $1^{st}$, $4^{th}$ and $8^{th}$ musics 2601, 2607 and 2615 displayed at the $1^{st}$ depth may move in the $1^{st}$ distance d1 [not shown in the drawing].

Accordingly, the present invention may provide the following effects and/or features.

First of all, while a data list configured with a plurality of data is displayed, if the data meeting a specific classification criterion is selected, other data meting the specific classification criterion may be selected and extracted as well.

Secondly, while a data list configured with a plurality of data is displayed, if a simple action is inputted, the present invention selects and extracts data meeting a specific classification criterion quickly and conveniently without switching a screen.

The above-described data extracting methods can be implemented in a program recorded medium as computer-readable codes. The computer-readable media include all types of recording devices in which data readable by a computer system are stored. The computer-readable media include ROM, RAM, CD-ROM, magnetic tapes, floppy discs, optical data storage devices, to name a few, and also include carrier-wave type implementations (e.g., transmission via Internet).

The above-described mobile terminal and data extracting method can be configured in a manner of selectively combining the embodiments entirely or partially to enable various modifications instead of being limited to the configurations and methods of the above-described embodiments.

The present invention provides the following effects and/or advantages. The present invention selects data meeting a specific classification condition in the course of displaying a data list constructed with a plurality of data, thereby selecting and extracting other data meeting the specific classification condition together. The present invention enables data meeting a specific classification condition to be quickly and conveniently selected and extracted by a simple input action without an image change while a data list constructed with a plurality of data is displayed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and/or their equivalents.

What is claimed is:

1. A mobile terminal comprising:
a touchscreen configured to display a data list including a plurality of data items and to receive a first input for selecting a classification condition within a specific data item among the plurality of data items;
and
a controller configured to:
control the touchscreen to distinctively display the specific data item and distinctively display the classification condition within the specific data item, in response to the first input;
control the touchscreen to distinctively display at least one relevant data item of the plurality of data items from a remainder of the plurality of data items in response to the first input, the at least one relevant data item satisfying the same classification condition; and
control the touchscreen to display at least one other data item of the plurality of data items from the remainder of the plurality of data items in response to the first input, the at least one other data item not satisfying the classification condition, such that the at least one other data item is displayed in a second three-dimensional (3D) depth that is different from a first 3D depth of the displayed specific data item and at least one relevant data item.

2. The mobile terminal of claim 1, wherein the controller is further configured to:
control the touchscreen to switch between a 3D mode and a 2D mode;
control the touchscreen to enable the 3D mode and display the at least one 2D object in 2D and the at least one 3D object in 3D before the first touch action is received; and
control the touchscreen to switch from the 3D mode to the 2D mode and display only the at least one 2D object in 2D in response to the first touch action.

3. The mobile terminal of claim 2, wherein the controller is further configured to control the touchscreen in response to a second input received via the touchscreen to switch from the 2D mode to the 3D mode and again display the at least one 3D object in 3D together with the at least one 2D object in 2D.

4. The mobile terminal of claim 1, wherein the controller is further configured to:
control the touchscreen to enable a 3D mode only while the at least one 3D object is displayed.

5. The mobile terminal of claim 1, wherein the controller is further configured to:
control the touchscreen to sequentially display at least a first home screen and second home screen; and
control the touchscreen to display the plurality of data items such that the plurality of data items are distributed between the at least the first and second home screens.

6. The mobile terminal of claim 5, wherein the controller is further configured to control the touchscreen to no longer display the first home screen and display only the second home screen in response to a second input.

7. The mobile terminal of claim 5, wherein:
the plurality of data items include two or more 3D objects; and
the controller is further configured to control the touchscreen in response to the first input to display a first 3D object of the two or more 3D objects distributed to the first home screen together with a second 3D object of the two or more 3D objects distributed to the second home.

8. The mobile terminal of claim 1, wherein a degree of the second depth is changeable relative to the first depth.

9. The mobile terminal of claim 8, wherein the controller is further configured to control the touchscreen in response to a second input received within the at least one other data item to change the degree of the second depth.

10. A mobile terminal comprising:
a touchscreen configured to receive a touch action and to display information; and
a controller configured to:
control the touchscreen to display a plurality of objects at different three-dimensional (3D) depths according to respective categories of corresponding applications that are associated with the plurality of objects; and
control the touchscreen to:
sort out at least one object among the plurality of objects that has a specific 3D depth in response to a first touch action received via the touchscreen in a specific direction, the first touch action initiated from the at least one object; and
continue to display all of the at least one object in response to the first touch action while no longer displaying the rest of the plurality of objects that has a 3D depth that is different from the specific 3D depth.

11. The mobile terminal of claim 10, wherein the controller is further configured to control the touchscreen to:
display the at least one object at the specific 3D depth according to a first classification criterion before the first touch action; and
display the at least one object at a different 3D depth according to a second classification criterion after the first touch action.

12. The mobile terminal of claim 11, wherein:
the at least one object includes a first object and a second object, and
the first object and the second object are displayed at the specific 3D depth after the first touch action.

13. A method of controlling a mobile terminal comprising a touchscreen, the method comprising:
displaying, on the touchscreen, a data list including a plurality of data items;
receiving a first input for selecting a classification condition within a specific data item among the plurality of data items;
distinctively displaying the specific data item and distinctively displaying the classification condition within the specific data item, in response to the first input;
distinctively displaying at least one relevant data item of the plurality of data items from a remainder of the plurality of data items in response to the first input, the at least one relevant data item satisfying the same classification condition; and
displaying at least one other data item of the plurality of data items from the remainder of the plurality of data items in response to the first input, the at least one other data item not satisfying the classification condition, such that the at least one other data item is displayed in a second depth that is different from a first depth of the displayed specific data item and at least one relevant data item.

14. A method of controlling a mobile terminal comprising a touchscreen, the method comprising:
displaying a plurality of objects at different three-dimensional (3D) depths according to respective categories of corresponding applications that are associated with the plurality of objects;
sorting out at least one object among the plurality of objects that has a specific 3D depth in response to a first touch action received via the touchscreen in a specific direction, the first touch action initiated from the at least one object; and
continuing to display all of the at least one object in response to the first touch action while no longer displaying the rest of the plurality of objects that has a 3D depth that is different from the specific 3D depth.

* * * * *